(12) United States Patent
Singamaneni et al.

(10) Patent No.: US 11,911,999 B2
(45) Date of Patent: Feb. 27, 2024

(54) PLASMONIC PATCH AS A UNIVERSAL FLUORESCENCE ENHANCER

(71) Applicant: Washington University, St. Louis, MO (US)

(72) Inventors: Srikanth Singamaneni, St. Louis, MO (US); Jingyi Luan, St. Louis, MO (US); Jeremiah Morrissey, St. Louis, MO (US); Evan Kharasch, St. Louis, MO (US)

(73) Assignee: Washington University, St. Louis, MO (US)

( * ) Notice: Subject to any disclaimer, the term of this patent is extended or adjusted under 35 U.S.C. 154(b) by 37 days.

(21) Appl. No.: 17/662,293

(22) Filed: May 6, 2022

(65) Prior Publication Data
US 2022/0274381 A1 Sep. 1, 2022
US 2023/0249441 A9 Aug. 10, 2023

Related U.S. Application Data

(63) Continuation of application No. 16/765,441, filed as application No. PCT/US2018/062599 on Nov. 27, 2018, now Pat. No. 11,351,760.
(Continued)

(51) Int. Cl.
B32B 27/06 (2006.01)

(52) U.S. Cl.
CPC ........ *B32B 27/06* (2013.01); *B32B 2307/422* (2013.01)

(58) Field of Classification Search
CPC .......................... B32B 27/06; B32B 2307/422
(Continued)

(56) References Cited

U.S. PATENT DOCUMENTS 6,500,679 B2 12/2002 Akimoto et al.
7,612,349 B2 11/2009 Kimura
(Continued)

FOREIGN PATENT DOCUMENTS

CN 105067524 A 11/2015

OTHER PUBLICATIONS

Ganesh et al., "Enhanced fluorescence emission from quantum dots on a photonic crystal surface", Nature Nanotechnology, Aug. 2007, vol. 2, pp. 515-520.
(Continued)

*Primary Examiner* — Betelhem Shewareged
(74) *Attorney, Agent, or Firm* — Armstrong Teasdale LLP

(57) ABSTRACT

Fluorescence-based techniques are the cornerstone of modern biomedical optics with applications ranging from bioimaging at various scales (organelle to organism) to detection and quantification of a wide variety of biological species of interest. However, feeble fluorescence signal remains a persistent challenge in meeting the ever-increasing demand to image, detect and quantify biological species of low abundance. Disclosed herein are simple and universal methods based on a flexible and conformal elastomeric film adsorbed with plasmonic nanostructures, referred to as "plasmonic skin" or "plasmonic patch", that provide large and uniform enhancement of fluorescence on a variety of surfaces, through an "add-on-top" process. The novel fluorescence enhancement approach presented here represents a disease-, biomarker-, and application-agnostic ubiquitously-applicable fundamental and enabling technology to improve the sensitivity of existing analytical methodologies in an easy-to-handle and cost-effective manner, without changing and/or minimally altering the original procedures of the existing techniques.

18 Claims, 38 Drawing Sheets

Related U.S. Application Data

(60) Provisional application No. 62/590,877, filed on Nov. 27, 2017.

(58) Field of Classification Search
USPC .................................................. 428/195.1
See application file for complete search history.

(56) References Cited

U.S. PATENT DOCUMENTS

| | | |
|---|---|---|
| 7,869,032 B2 | 1/2011 | Zhang et al. |
| 8,182,878 B2 | 5/2012 | Geddes et al. |
| 8,759,110 B2 | 6/2014 | Geddes |
| 9,185,200 B2 | 11/2015 | Cunningham |
| 9,702,821 B2 | 7/2017 | Zhou et al. |
| 2008/0246961 A1 | 10/2008 | Zhang et al. |
| 2015/0104860 A1 | 4/2015 | Cunningham |
| 2020/0326282 A1 | 10/2020 | Singamaneni et al. |
| 2022/0274381 A1* | 9/2022 | Singamaneni .......... B32B 15/14 |

OTHER PUBLICATIONS

Gill et al., "Emission enhancement and lifetime modification of phosphorescence on silver nanoparticle aggregates", Phys. Chem. Chem. Phys., 2013, vol. 15, pp. 15734-15739.

Luan et al., "Ultrabright fluorescent nanoscale labels for the femtomolar detection of analytes with standard bioassays", Nature Biomedical Engineering, Apr. 20, 2020, vol. 4, pp. 518-530.

Nishi et al., "Fluorescense-Based Bioassays for the Detection and Evaluation of Food Materials", Sensors, 2015, vol. 15, pp. 25831-25867.

International Search Report and Written Opinion for International Application PCT/US2018/062599, dated Apr. 4, 2019 (9 pages).

* cited by examiner

NO SPACER

MODERATE SPACE THICKNESS

THICK SPACER

FIG. 16A
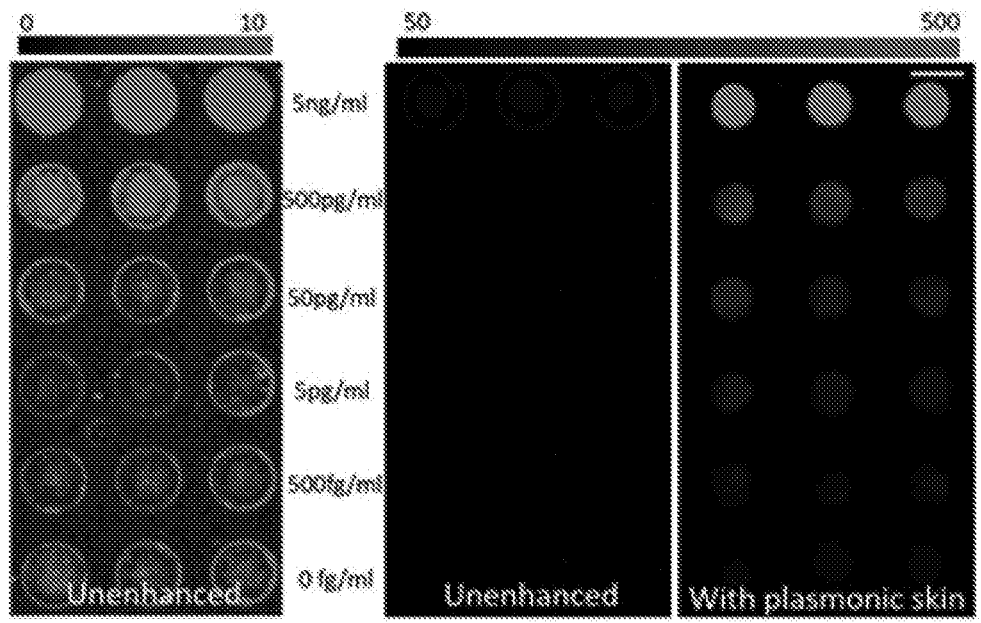
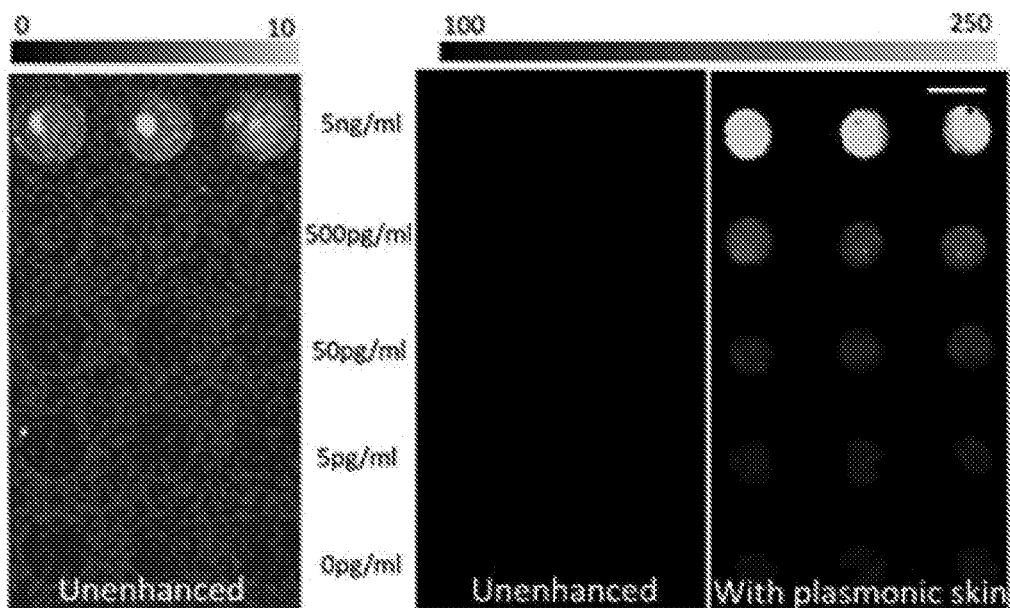
FIG. 16B

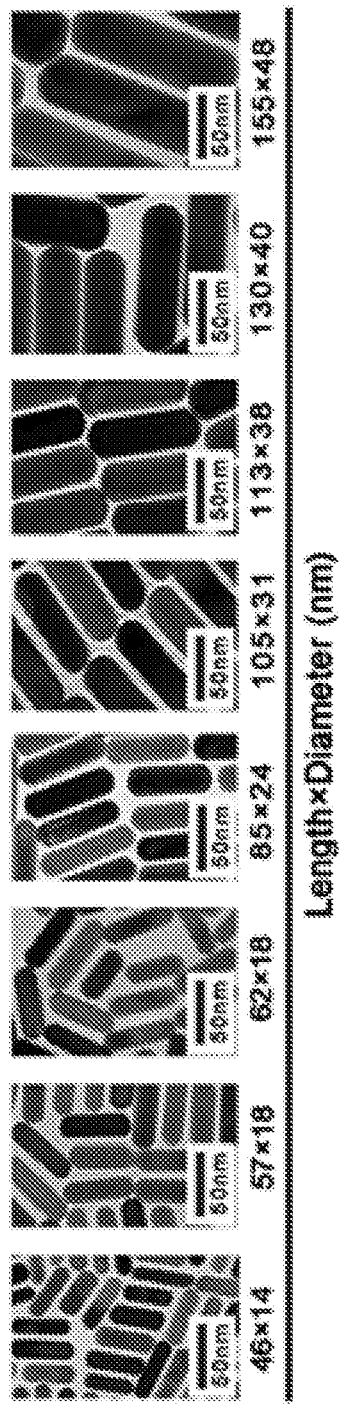
FIG. 32A
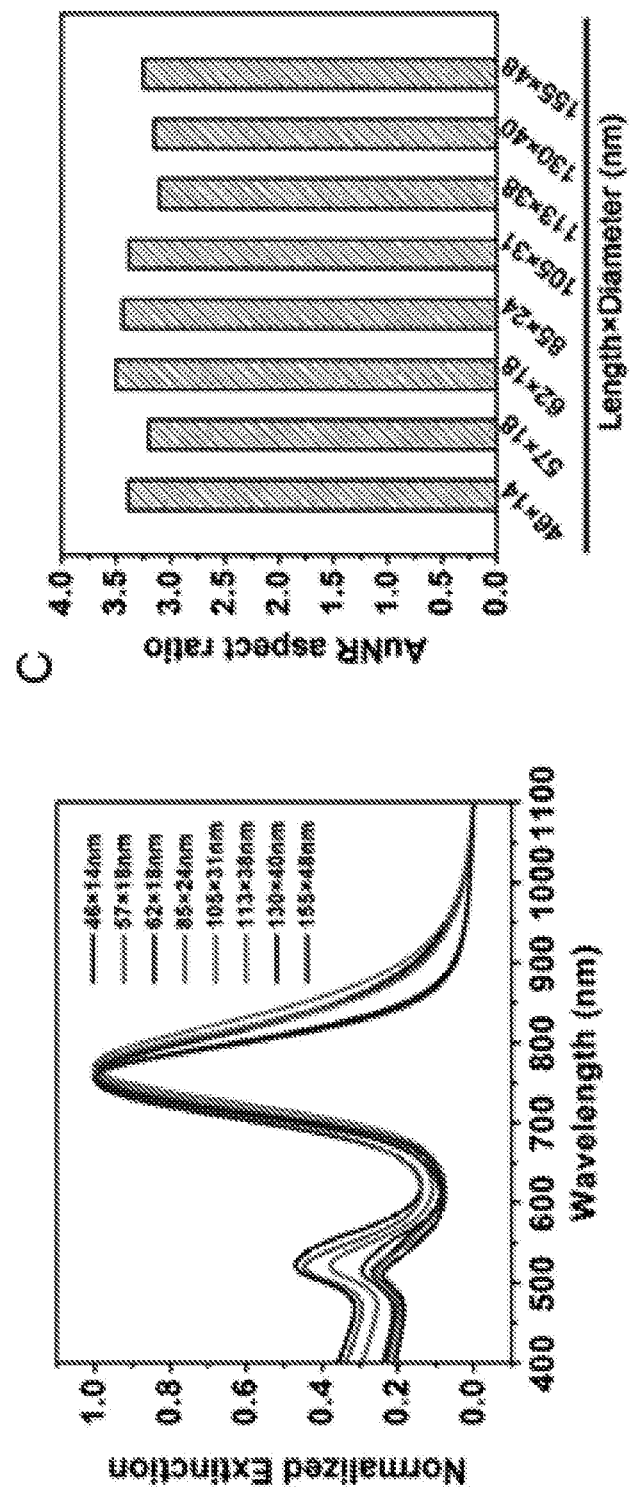
FIG. 32C
FIG. 32B

PLASMONIC PATCH AS A UNIVERSAL FLUORESCENCE ENHANCER

CROSS-REFERENCE TO RELATED APPLICATIONS

This application is a continuation of U.S. patent application Ser. No. 16/765,441, filed on May 19, 2020, which is a US National Stage Entry of International Patent Application No. PCT/US2018/062599, filed Nov. 27, 2018, which claims the benefit of priority to U.S. Provisional Application Ser. No. 62/590,877, filed on Nov. 27, 2017, the entire contents of which are incorporated herein by reference in their entireties.

STATEMENT REGARDING FEDERALLY SPONSORED RESEARCH & DEVELOPMENT

This invention was made with government support under DK100759 and CA141521 awarded by the National Institutes of Health and under CBET 1254399 awarded by the National Science Foundation. The government has certain rights in the invention.

BACKGROUND OF THE DISCLOSURE

The field of this disclosure relates generally to fluorescence enhancement. Specifically, it relates to the use of a novel plasmonic patch comprising plasmonic nanoparticles attached to a flexible substrate to enhance the fluorescence of a sample. Also disclosed herein are methods that use this novel plasmonic patch to enhance the fluorescence signal in various biological assays.

Previous plasmon-enhanced fluorescence assays rely on engineering the bioassay surface to be plasmonically active through either deposition of metal islands or adsorption of plasmonic nanostructures. These methods naturally require the utilization of special surfaces and possibly significant alterations of the read-out devices and the bioassay protocol. As such, they are not readily applied to a large variety of systems or bioassays.

Fluorescent probes and fluorometric approaches have been employed in biomedical research, not only as imaging tools to visualize the location and dynamics of cells, various sub-cellular species and molecular interactions in cells and tissues, but also as labels in fluoroimmunoassays for detection and quantification of molecular biomarkers. Fluorescence-based techniques have radically transformed biology and life sciences by unravelling the genomic, transcriptomic, and proteomic signatures of disease development, progression, and response to therapy. However, "feeble signal" has been a persistent and recurring problem in a battery of detection and imaging techniques that rely on fluorescence. Overcoming this fundamental challenge without the use of specialized reagents, equipment, or significant modifications to well-established procedures has been the subject of extensive research in the field of biomedical optics. For example, there is an urgent need for ultra-sensitive fluoroimmunoassays that are broadly adopted by most biological and clinical laboratories for the detection of target biological molecules of low abundance.

Improving the signal-to-noise ratio of the assays without radically deviating from existing assay protocols will also relax the stringent requirements of high sensitivity and bulky photodetectors, drive down the cost of implementation, eliminate cross-laboratory, cross-platform inconsistency, and propel these technologies to point-of-care, in-field and resource-limited settings. Various techniques, including multiple-fluorophore labels, rolling cycle amplification, and photonic crystal enhancement have been introduced to improve the signal-to-noise ratio of fluorescence-based imaging and sensing techniques. Despite the improved sensitivity, these technologies are not widely adopted in research and clinical settings. Most of these technologies require significant modifications to the existing practices such as additional steps that significantly prolong the overall operation time, specialized and expensive read-out systems, non-traditional data processing and analysis, or temperature-sensitive reagents which require tightly-controlled transport and storage conditions.

Plasmon- or metal-enhanced fluorescence has been recognized as a simple and highly effective approach for enhancing the bioanalytical parameters of fluorescence-based bioassays. Enhancement in the emission of fluorophores in close vicinity to plasmonic nanostructures is attributed to the enhanced electromagnetic field (local excitation field) at the surface of the plasmonic nanostructures and decrease in the fluorescence lifetime due to the coupling between excited fluorophores and surface plasmons of the nanostructures. So far, various plasmonic substrates such as metal nano-islands have been shown to result in moderate fluorescence enhancement. Although these plasmonically active surfaces are attractive, they require the use of pre-fabricated specialized bioassay surfaces, typically a glass slide deposited with metal nanostructures, instead of standard or, sometimes, irreplaceable bioanalytical and bioimaging platforms. The requirement of special bioassay surfaces limits cross-platform and cross-laboratory consistency and seamless integration with widely employed bioanalytical procedures, which largely limits their extensive application in biomedical research and clinical settings. Non-traditional bioconjugation procedures and poor stability of biomolecules (e.g., antibodies) immobilized on metal surfaces impose further challenges in their widespread application. Additionally, these plasmon-enhanced fluorescence assays can achieve lower limits of detection than unenhanced assays, but the upper limits of detection are also lower. This means that the dynamic range of the previously described plasmon-enhanced fluorescence techniques is, at best, only marginally improved. Thus, quantification of high-abundance analytes is being sacrificed for quantification of low-abundance analytes.

Multiplexed microarrays based on fluorescence are employed in expression profiling, drug-target binding assays, and high throughput proteomics. Compared to a single platform such as an enzyme-linked immunosorbent assay (ELISA), this technique allows researchers and clinicians to examine a large number of biomarkers in parallel to achieve patient stratification and monitoring of multifactorial diseases with limited sample volume, thereby minimizing the assay cost and time to perform multiple individual biomarker assays. Moreover, high throughput profiling of biomarkers enables personalized medicine with holistic, molecular fingerprinting of diseases, accommodating greater diagnostic resolution between closely related disease phenotypes. The sensitivity and specificity for diagnosis of kidney disease have been proven to be significantly greater by combining the urinary levels of multiple biomarkers than an individual one. However, despite the availability of various commercialized products, this multiplexed methodology suffers from inferior sensitivity and relatively high limit of detection (LOD) compared to ELISA, which hinders its widespread application.

Thus, there is a need for addressing each of the disadvantages discussed herein, including low sensitivity, high dynamic range, cross-platform compatibility, and ease of use.

BRIEF DESCRIPTION OF THE DISCLOSURE

In a first aspect, disclosed herein is a plasmonic patch for enhancing a fluorescent signal from a fluorescent species. The patch generally comprises: a flexible substrate comprising a first material, a plasmonic nanostructure, and a spacer comprising a second material. The nanostructures are disposed on a first surface of the flexible substrate, the spacer is disposed on the first surface of the flexible substrate and covers the nanostructures; the fluorescent species has an excitation wavelength ($\lambda_{ex}$), the plasmonic nanostructure has a localized surface plasmon resonance (LSPR) wavelength ($\lambda_{LSPR}$), and the difference between the LSPR wavelength and the excitation wavelength is $|\Delta\lambda|$.

In a second aspect, disclosed herein is a method for enhancing a fluorescent signal of a fluorescent species. The method generally comprises: placing a plasmonic patch in proximity to the fluorescent species, exciting the fluorescent species using electromagnetic radiation of a predetermined wavelength thereby generating the fluorescent signal, and detecting said enhanced fluorescent signal. The plasmonic patch generally comprises: a flexible substrate comprising a first material, a plasmonic nanostructure, and a spacer comprising a second material. The nanostructures are disposed on a first surface of the flexible substrate, the spacer is disposed on the first surface of the flexible substrate and covers the nanostructures; the fluorescent species has an excitation wavelength ($\lambda_{ex}$), the plasmonic nanostructure has a localized surface plasmon resonance (LSPR) wavelength ($\lambda_{LSPR}$), and the difference between the LSPR wavelength and the excitation wavelength is $|\Delta\lambda|$.

BRIEF DESCRIPTION OF THE FIGURES

FIGS. 16A and 16B are exemplary embodiments of fluorescence intensity maps of fluoroimmunoassay corresponding to different concentrations of (16A) Kidney Injury Molecule-1 (KIM-1) and (16B) Neutrophil Gelatinase Associated Lipocalin (NGAL), two early stage biomarkers for acute kidney injury (AKI) and chronic kidney disease (CKD) (Left and middle images show the unenhanced assays which correspond to different color scales shown in the figures. Right image shows the plasmonic patch enhanced assay revealing a large enhancement in the fluorescence signal as well as a broadened dynamic range compared to unenhanced assay (scale bar represents 5 mm)) in accordance with the present disclosure.

FIGS. 32A to 32C depict (32A) TEM images of gold nanorods (AuNRs) employed as the nanoantennae on plasmonic patch, showing different length and diameter (nm). (32B) Normalized extinction spectra of the aqueous suspensions of different size AuNRs showing similar LSPR wavelength. (32C) The aspect ratio (length:diameter) of each AuNR.

DETAILED DESCRIPTION OF THE DISCLOSURE

Figure 1:
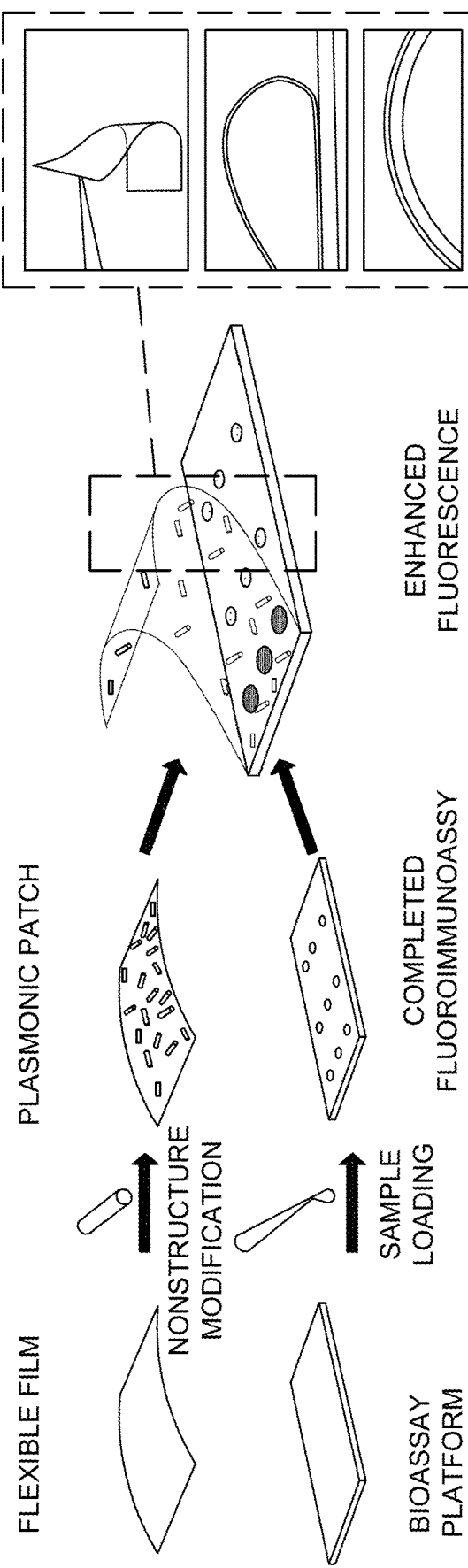
FIG. 1 is an exemplary embodiment of a schematic illustration of the fabrication of plasmonic patch and its application in fluoroimmunoassay through a simple "add-on-top" process, which results in large enhancement in the fluorescence signal. Right inset (top): photograph showing the transfer of a plasmonic patch to a planar surface. Right inset (middle): SEM image demonstrating the flexibility as well as conformability of the plasmonic patch to the surface. Right inset (bottom): SEM image of the cross-section of plasmonic patch showing an average thickness of 30 μm.

In the following specification and the claims, reference will be made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The plasmonic patch disclosed herein overcomes the above-mentioned challenges and provides a path forward for broad application of sensitive, high dynamic range multiplexed microarrays. In one example, the detection of biomarkers related to kidney function, the results illustrate that the plasmonic patch significantly enhances the ability to elucidate low-level kidney function parameters (biomarkers) to provide holistic kidney disease information. Notably, the better performance of the multiplexed microarray emanates from the extremely simple "plasmonic patch transfer" process, which does not alter the established process flow of immuno-microarrays. Additionally, this technique represents an inexpensive and easily implemented approach for the enhancement of fluorescence. This easy-deployable technique is seamlessly applied to a broad range of multiplexed platforms in diagnostics, proteomics, and genetics to address the unmet need for higher signal intensity. The Examples provided herein are only illustrative, not limiting.

Most previous plasmon-enhanced fluorescence assays rely on engineering the bioassay surface to be plasmonically active through either deposition of metal islands or adsorption of plasmonic nanostructures. These methods naturally require the utilization of special surfaces and possibly significant alterations of the read-out devices and the bioassay protocol. Demonstrated herein is a novel method in which the enhancement is achieved by simple transfer of plasmonic patch onto a surface with fluorescent species. This novel approach obviates the need for special bioassay surfaces or tedious bioconjugation procedures and offers excellent tunability of the plasmonic properties (over the entire visible and IR wavelength range) and distance between the metal surface and fluorophores. Notably, the magnitude of fluorescence enhancement using plasmonic surfaces described in the past is highly dependent on the size of the capture antibody, antigen, and detection antibody that exist between the plasmonic nanostructures on the surface and the fluorophores. The enhancement is therefore dictated by the preset "biological spacer", leaving little control over one of the key design parameter for maximum enhancement-spacer layer thickness. On the contrary, as an "add-on-top" layer, the plasmonic patch disclosed herein enables complete control over the distance between plasmonic nanostructures and fluorescent species. The facile control of the spacer thickness provides a tunable fluorescence enhancement despite the variations in the immunofluorescent assays, which is especially important in multiplexed platforms.

In some aspects, the fluoroimmunoassay is read before and after addition of the plasmonic patch. The combined pre- and post-patch addition measurements provide an extraordinary dynamic range in most bioassays. Analytes of low abundance are not detectable without addition of the patch, whereas the signal from high abundance analytes saturates the detector in the presence of the patch. The upper limit of detection of the fluoroimmunoassay remains the same as the unenhanced fluoroimmunoassay because the fluoroimmunoassay is read before adding the patch. The lower limit of detection is decreased because the assay is read after adding the patch. This increases the overall dynamic range of the fluoroimmunoassay by from 2 to 4 orders of magnitude. Thus, reading a fluoroimmunoassay before and after adding the plasmonic patch results in an overall dynamic range of from about 5 to 7 orders of magnitude.

In some embodiments, disclosed herein is a plasmonic patch that is placed on top of a sample to be analyzed to thereby enhance the fluorescence emanating from the sample. The plasmonic patch comprises: a flexible substrate comprising a first material, a plasmonic nanostructure, and a spacer comprising a second material. The nanostructures are disposed on a first surface of the flexible substrate; the spacer is disposed on the first surface of the flexible substrate and covers the nanostructures; the fluorescent species has an excitation wavelength ($\lambda_{ex}$), the plasmonic nanostructure has a localized surface plasmon resonance (LSPR) wavelength ($\lambda_{LSPR}$), and the difference between the LSPR wavelength and the excitation wavelength is $|\Delta\lambda|$. In some embodiments, the plasmonic patch is in the form of a thin film or skin.

As used herein, the term "conformable" refers to a property of the substrate such that when the substrate is placed on top of another surface (e.g., a microtiter plate or glass slide), the shape of the substrate alters or substantially conforms to and takes the shape of the surface on which it is placed. A substantial amount of contact between the substrate and the surface is presumed. In some aspects, the plasmonic patch has a hardness as measured on the Shore 00 scale of less than 90, less than 80, less than 70, less than 60, less than 50, less than 40, less than 30, less than 25, less than 20 or even less than 15. In some aspects, the Shore A hardness is less than 0. In some aspects disclosed herein, the plasmonic patch is conformable and will take the shape of a surface on which it is placed.

As used herein, the term "cover" or "covers" in reference to the relationship between the spacer and the plasmonic nanoparticles refers to the manner in which the material that comprises the spacer covers the plasmonic nanoparticles. In some aspects, the nanoparticles are completely encompassed by the spacer material such that they are not exposed to the atmosphere or outer environment. In some aspects, the nanoparticles are only partially encompassed by the spacer materials and a portion of the surface of the nanoparticle is exposed to the atmosphere and outer environment. In some aspects, only the nanoparticles are covered with a spacer while the flexible substrate is not covered.

The plasmonic patch disclosed herein is useful for enhancing the bioanalytical parameters (sensitivity, LLOD, and dynamic range) of fluoroimmunoassays implemented in a microplate format and an antibody microarray. In some embodiments, the microplate is in the form of a standard 6-well, 12-well, 24-well, 48-well, 96-well, 384-well, or 1536-well plate. In other embodiments, the format of the immunoassay is on a glass slide or other formats as are known in the art. In some embodiments, the plasmonic patch results in more than about a 10-fold, about a 25-fold, about a 50-fold, about a 75-fold, about a 100-fold, about a 150-fold, about a 200-fold, about a 300-fold, about a 400-fold, about a 500-fold, about a 750-fold, about a 1000-fold, about a 2500-fold, about a 5000-fold, about a 7500-fold, or about a 10,000-fold fluorescence intensity enhancement. An increase in the fluorescence intensity enhancement leads to an increase in the assay sensitivity and a lower LOD. In some embodiments, the lower LOD decreases by more than about 10-fold, about 25-fold, about 50-fold, about 75-fold, about 100-fold, about 150-fold, about 200-fold, about 300-fold, about 400-fold, about 500-fold, about 750-fold, about 1000-fold, about 2500-fold, about 5000-fold, about 7500-fold, or about 10,000-fold. Additionally, this increases the overall dynamic range of detection. In some embodiments, the increase in the overall dynamic range is greater than one order of magnitude, two orders of magnitude, three orders of magnitude or even four orders of magnitude.

The improvement in the bioanalytical parameters was found to be consistent across different assay formats, target biomarkers, and fluorophores. Significantly, this method is implemented with existing bioassays without any modification of the standard operating procedures, additional operational training, or modification of the read-out devices. Additionally, in some aspects, the method described herein is used on whole cells, tissues, and/or glass slides. As a part of rigorous validation of the technology, urine samples from patients and healthy volunteers have been analyzed. As opposed to unenhanced fluoroimmunoassay and ELISA, the plasmon-enhanced fluoroimmunoassay enabled the detection and quantification of low concentration biomarkers, and from all patients and healthy volunteers. The added sensitivity of the plasmon-enhanced assay enables the facile quantification of biomarkers of low abundance and provides physiological and pathological information, often missed by the conventional immunoassays.

The first and the second material used to construct the plasmonic patch are the same or different. The material has specific characteristics in order to give optimal results. The first material has a high mechanical flexibility. In some aspects, the second material is less flexible than the first material. In some aspects, the Shore 00 hardness of the second material is greater than the Shore 00 hardness of the first material. In some aspects, the first and/or second material have high optical transparency. Any material exhibiting these characteristics and compatible with the nanostructures is suitable for use herein. Other characteristics of the material are selected based on the specific application and knowledge of the person of skill in the art. In some aspects, the first material and the second material, independently from one another, comprise a polymer. In some aspects, the first material is an elastomeric polymer. In some aspects, the first and the second material are functionalized with siloxane. In some aspects, the first and second material are, independently from one another, selected from the group consisting of polydimethylsiloxane (PDMS), ECOFLEX®, SILBIONE®, polyethylene terephthalate (PET), polyurethane (PU), polyethylene naphthalate (PEN), polyimide (PI), polybutadiene, polyisoprene, (3-aminopropyl)trialkoxysilane, (3-aminopropyl)triaryloxysilane, (3-aminopropyl)triethoxysilane (APTES), (3-aminopropyl)trimethoxysilane (APTMS), trimethoxy(propyl)silane (TMPS), (3-mercaptopropyl)trimethyoxysilane (MPTMS), polyamine, poly(methyl)methacrylate (PMMA), polydopamine, polyvinylpyrrolidinone (PVP), polyvinyl alcohol (PVA), polyolefin, polyamide, polyimide, proteins, silk, cellulose, polyelectrolytes, peptoids and combinations thereof. In some aspects, the first material is PDMS. In some aspects, the first material is ECOFLEX®. Additionally, the spacer may comprise material selected from the group consisting of silicon oxide, aluminum oxide, zinc oxide, titanium oxide, graphene, graphene oxide, $MoS_2$, MXenes, and combinations thereof.

The thickness and refractive index of the spacer is affected by, at least in part, the composition of the second material. In some aspects, the second material is APTES, APTMS, TMPS, MPTMS, or a combination thereof. In some aspects, the second material comprises from about 0 to about 100 wt % of APTES. In some aspects, the second material comprises about 5 wt % APTES, about 10 wt % APTES, about 15 wt % APTES, about 20 wt % APTES, about 25 wt % APTES, about 30 wt % APTES, about 35 wt % APTES, about 40 wt % APTES, about 45 wt % APTES, about 50 wt % APTES, about 55 wt % APTES, about 60 wt % APTES, about 65 wt % APTES, about 70 wt % APTES, about 75 wt % APTES, about 80 wt % APTES, about 85 wt % APTES, about 90 wt % APTES, or about 95 wt % APTES. As used in this context, about means±2.5 wt %.

In some aspects, the second material comprises from about 0 to about 100 wt % of TMPS. In some aspects, the second material comprises about 5 wt % TMPS, about 10 wt % TMPS, about 15 wt % TMPS, about 20 wt % TMPS, about 25 wt % TMPS, about 30 wt % TMPS, about 35 wt % TMPS, about 40 wt % TMPS, about 45 wt % TMPS, about 50 wt % TMPS, about 55 wt % TMPS, about 60 wt % TMPS, about 65 wt % TMPS, about 70 wt % TMPS, about 75 wt % TMPS, about 80 wt % TMPS, about 85 wt % TMPS, about 90 wt % TMPS, or about 95 wt % TMPS. As used in this context, about means±2.5 wt %.

In some aspects, the second material comprises from about 0 to about 100 wt % of MPTMS. In some aspects, the second material comprises about 5 wt % MPTMS, about 10 wt % MPTMS, about 15 wt % MPTMS, about 20 wt %

MPTMS, about 25 wt % MPTMS, about 30 wt % MPTMS, about 35 wt % MPTMS, about 40 wt % MPTMS, about 45 wt % MPTMS, about 50 wt % MPTMS, about 55 wt % MPTMS, about 60 wt % MPTMS, about 65 wt % MPTMS, about 70 wt % MPTMS, about 75 wt % MPTMS, about 80 wt % MPTMS, about 85 wt % MPTMS, about 90 wt % MPTMS, or about 95 wt % MPTMS. As used in this context, about means±2.5 wt %.

Figure 2:
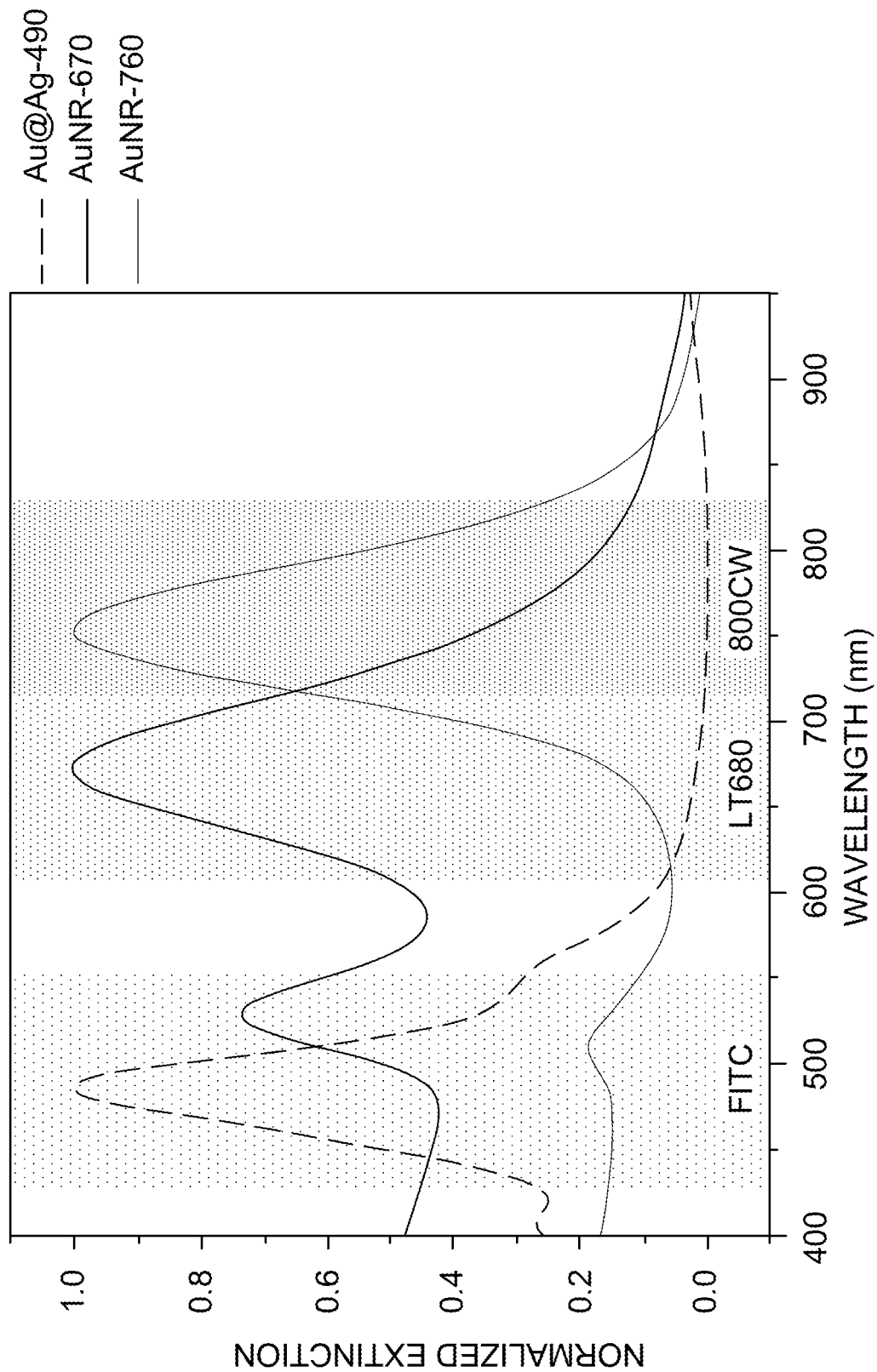
FIG. 2 is an exemplary embodiment of the normalized extinction spectra of the aqueous solutions of three representative plasmonic nanostructures in accordance with the present disclosure (from left to right: Au@Ag-490, AuNR-670, AuNR-760). The extinction bands of Au@Ag-490, AuNR-670, and AuNR-760 exhibit significant overlap with the absorption bands (excitation source) of FITC, LT680, and 800CW, respectively indicated with three different shades.

The nanostructures used herein provide the plasmonic enhancement to the fluorescent signal and are selected based on numerous criteria. One criterion in selecting the nanostructure material to use in the plasmonic patch is the localized surface plasmon resonance wavelength (LSPR wavelength or $\lambda_{LSPR}$). As used herein, the term $\lambda_{LSPR}$ is defined to be any wavelength that excites plasmons in the nanostructures. Different nanostructures have a different $\lambda_{LSPR}$ as illustrated in FIG. 2. Because $\lambda_{LSPR}$ can be selected or tuned in the nanostructures in part by the method in which they are prepared, the $\lambda_{LSPR}$ is selected for a given plasmonic patch based on the excitation wavelength ($\lambda_{ex}$) of the fluorescent species or the emission wavelength of the fluorescent species ($\lambda_{em}$). In some aspects, the $\lambda_{ex}$ or $\lambda_{em}$ is either a local maximum or the global maximum for the fluorescent species.

Additionally, the $\lambda_{LSPR}$ of a nanostructure shifts after incorporation into the plasmonic patch by being encapsulated in the spacer layer and by being placed into proximity of the bioassay surface comprising a fluorescent species. Without being bound by a specific theory, it is thought that the change in the index of refraction of the medium surrounding the plasmonic nanostructure causes the shift in the $\lambda_{LSPR}$. As such, the properties of the second material which comprises the spacer layer that covers and encapsulates the nanostructures will affect the $\lambda_{LSPR}$. Unless clearly stated otherwise, the $\lambda_{LSPR}$ value referenced herein for the nanostructure is after the nanostructure has been incorporated into the plasmonic patch, covered by the spacer layer, and brought into proximity of the bioassay surface.

The difference between the LSPR wavelength and the excitation wavelength is $|\Delta\lambda|$:

$$|\Delta\lambda|=|\lambda_{LSPR}-\lambda_{ex}|$$

and, in some aspects, the smaller $|\Delta\lambda|$ (the absolute value of the difference between $\lambda_{LSPR}$ and $\lambda_{ex}$), the greater the enhancement of the fluorescent signal. In some aspects, $|\Delta\lambda|$ is less than 50 nm, less than 45 nm, less than 40 nm, less than 35 nm, less than 30 nm, less than 25 nm, less than 20 nm, less than 15 nm, less than 10 nm, less than 5 nm, less than 2 nm, or less than 1 nm. In some aspects, the $\lambda_{LSPR}$ and the $\lambda_{ex}$ are the same, meaning $|\Delta\lambda|$ is zero. In this instance, zero is determined based on the accuracy and limitations of the instrumentation.

The specific $\lambda_{LSPR}$ is based upon the $\lambda_{ex}$. This allows for the plasmonic patch to be selectively tuned to match the weak fluorescence signal to which it is applied. In some embodiments, the $\lambda_{LSPR}$ is between about 200 and about 2000 nm, between about 250 and about 1500 nm, between about 300 and about 1000 nm, between about 350 and about 800 nm, between about 400 and about 750 nm. In yet another embodiment, the $\lambda_{LSPR}$ is approximately (meaning ±25 nm) 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, 1100, 1200 nm, 1300 nm, 1400 nm, 1500 nm, 1600 nm, 1700 nm, 1800 nm, 1900 nm, or 2000 nm. Suitable examples of nanostructures include, but are not limited to, nanotubes, nanorods, nanocubes, nanocuboids, nanospheres, bimetallic nanostructures (e.g. Au@Ag coreshell nanocuboids), nanostructures with sharp tips (e.g. nanostars), hollow nanostructures such as nanocages and nanorattles, nanobipyramids, nanoplates, self-assembled nanostructures, bowtie antennae, nanoraspberries, nano islands and combinations thereof. In some aspects, the plasmonic nanostructures are nanorods. In some aspects, the plasmonic nanostructures are nanocubes, nanocuboids or a combination thereof.

Nanorods can be fabricated in a large array of sizes and dimensions. In some aspects, the nanorods have a length of from 25 to 1,000 nm (1 µm). In some aspects, the nanorods have a length of from 40 to 180 nm. In some aspects, the nanorods have a length of from 60 to 160 nm. In some aspects, the nanorods have a length of from 80 to 140 nm. In some aspects, the nanorods have a length of from 100 to 130 nm. In some aspects, the nanorods have a length of about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 250 nm, about 300 nm, about 350 nm, about 400 nm, about 450 nm, about 500 nm, about 600 nm, about 700 nm, about 800 nm, about 900 nm, about 1000 nm, about 1200 nm, about 1400 nm, about 1600 nm, about 1800 nm, about 2000 nm. In the same way that the length of the nanorods may vary, the diameter may also vary. In some aspects, the diameter of the nanorods is from about 4 nm to about 100 nm, from about 5 nm to about 80, from about 20 nm to about 60 nm, or from about 25 nm to about 40 nm. In some aspects, the diameter of the nanorods is about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm.

Nanocubes and nanocuboids can also be fabricated in a large array of sizes, as described in Liu, et al., Chem. Mater., 27, 5261 (2015) which is incorporated by reference for its teachings thereof. In some aspects, the average edge length is from about 25 nm to about 1000 nm (1 µm), from about 40 nm to about 1000 nm, from about 45 nm to about 750 nm, from about 50 nm to about 500, from about 55 nm to about 250 nm, or from about 60 nm to about 200 nm. In some aspects, the average length is about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 65 nm, about 100 nm, about 110 nm, about 120 nm, about 130 nm, about 140 nm, about 150 nm, about 175 nm, about 200 nm, about 300 nm, about 400 nm, about 500 nm about 600 nm, about 700 nm, about 800 nm, about 900 nm, or about 1000 nm.

The plasmonic nanostructures can be fabricated from any plasmonic materials, including, but not limited to, gold, silver, aluminum, copper, semiconductor materials, and combinations thereof. In some aspects, the material is gold. In some aspects, the material is silver. In some aspects, the material is both gold and silver. In still yet another aspect, the material is a silver core encompassed by a gold shell. In still yet another aspect, the material is a gold core encompassed by a silver shell. As used herein, a plasmonic material is one that exhibits oscillations of electrons upon excitation.

The density of the plasmonic nanostructures in the plasmonic patch affects the amount of enhancement of the fluorescent signal from the fluorescent species. In some aspects, in order to provide a more uniform enhancement, the plasmonic nanostructures are distributed in an apparent monolayer. As such, the density is of the nanostructures in the patch is a function of the area rather than the volume. In some aspects, the density of the nanostructures is from about $1/\mu m^2$ to about $150/\mu m^2$, from about $5/\mu m^2$ to about $125/\mu m^2$, about $10/\mu m^2$ to about $100/\mu m^2$, about $20/\mu m^2$ to about $75/\mu m^2$, about $30/\mu m^2$ to about $60/\mu m^2$, or about $40/\mu m^2$ to about $60/\mu m^2$. In some aspects, the density of the nanostructures is about $10/\mu m^2$, about $20/\mu m^2$, about $30/\mu m^2$, about $40/\mu m^2$, about $50/\mu m^2$, about $60/\mu m^2$, about $70/\mu m^2$, about $80/\mu m^2$, about $90/\mu m^2$, about $100/\mu m^2$, about $110/\mu m^2$, about $120/\mu m^2$, about $130/\mu m^2$, about $140/\mu m^2$, about $150/\mu m^2$, about $160/\mu m^2$, about $170/\mu m^2$, about $180/\mu m^2$, about $190/\mu m^2$, or about $200/\mu m^2$.

The plasmonic patch disclosed herein is suitable for use with any assay that uses fluorescence detection of the analytes. Examples of assays that are suitable for use herein include, but are not limited to, antibody/protein microarrays, bead/suspension antibody/protein microarrays, arrays, bead suspension arrays, biosensing, biochip assays, capillary/sensor arrays, cell assays, DNA microarrays/polymerase chain reaction (PCR)-based arrays, energy transfer-based arrays, glycan/lectin arrays, immunoassay/enzyme-linked immunosorbent assay (ELISA)-based arrays, microfluidic chips, reversed-phase protein arrays, protein/immunological assays, chemical compound arrays, and tissue arrays.

Additionally, the plasmonic patch disclosed herein is suitable for enhancing a fluorescent signal from a large variety of different fluorescent sources or species. In addition to the fluorescent assays disclosed elsewhere herein, the plasmonic patch enhances the fluorescent signal from fluorescent proteins, organic dyes, quantum dots and upconversion nanoparticles.

The thickness of the spacer is tunable thereby providing different levels of enhancement of a fluorescent signal in a fluorescent species. In some embodiments, the thickness of the spacer is from about 0.5 nm to about 100 nm or from about 0.5 nm to about 20 nm. In yet other embodiments, the thickness of the spacer is approximately 0.5 nm, 1 nm, 2 nm, 3 nm, 5 nm, 8 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm or 100 nm. Approximately as used here means±10% of the given thickness. The thickness of the spacer is controlled by increasing the concentration and/or the amount of the monomers during preparation. Any polymer that can be deposited uniformly across the plasmonic nanostructures, such as those described elsewhere herein, is used in accordance with the present disclosure. In some aspects, polymer spacers are added in a layer-by-layer process, as in, for example, Feng, et al. (Sci. Reports, 5(7779), 1 (2015)) and Lakowicz, et al. (J. Flouresc., 14(4), 425 (2004)) which are incorporated by reference herein for their teachings thereof. Additionally, inorganic spacers such as silica, alumina and/or zinc oxide are used. In some embodiments, they are deposited on the plasmonic nanostructures using physical or chemical vapor deposition or atomic layer deposition.

In some aspects, the refractive index of the spacer is varied in order to shift the $\lambda_{LSPR}$ of the nanostructures. In some aspects, the refractive index of the spacer is between about 0.8 and 2.0. In some aspects, the refractive index of the spacer is about 1.0, about 1.1, about 1.2, about 1.3, about 1.4, about 1.5, about 1.6, about 1.7, about 1.8, about 1.9, or about 2.0. In this context, about means±0.05.

Elastic modulus is a quantity that measures the resistance of an object to being deformed in an elastic (i.e., non-permanent) manner when stress is applied to the object. It is defined as the slope of the stress-strain curve in the elastic deformation region of the graph. A higher elastic modulus will be more rigid and more resistant to deformation. In some aspects, the flexible substrate that comprises the first material is an elastic polymer. In some aspects, the elastic modulus of the flexible substrate is less than 50 MPa, less than 40 MPa, less than 30 MPa, less than 20 MPa, less than 15 MPa, less than 10 MPa, less than 7.5 MPa, less than 5 MPa, less than 4.5 MPa, less than 4 MPa, less than 3.5 MPa, less than 3 MPa, less than 2.5 MPa, less than 2 MPa, less than 1.5 MPa, or less than 1 MPa. In some aspects, the substrate is conformable, flexible or both.

In some exemplary embodiments, the plasmonic patch further comprises a backing layer. The backing layer is there to increase the rigidity of the patch and help facilitate handling of the patch. In some aspects, the backer layer has a higher Shore 00 hardness than that of the flexible substrate that comprises the first material. When present, the backing layer is disposed on one side of the flexible substrate while the nanostructures and spacer is disposed on the other. In other words, the backing layer, the flexible substrate and the spacer form a three layer system with the flexible substrate in the middle. When present, the backing layer comprises a material selected from the group consisting of glass, plastic, a polymer, aluminum, mylar, RE1SIAR™ (made by 3M™), and combinations thereof.

In some exemplary embodiment, the plasmonic patch further comprises a reflective layer. The reflective layer is present to further enhance the fluorescent signal from the fluorophore. The reflective layer is disposed between the backing layer and the spacer. In some aspects, the reflective layer is disposed directly in contact with the backing layer. In still yet another aspect, the reflective layer is disposed directly between the backing layer and the flexible substrate. In some aspects, the reflective layer comprises a deposited metal such as, for example, aluminum, gold, silver and/or chromium. The reflective layer may be deposited using, for example, sputter coating or vapor deposition. In some aspects, the backer layer is the same as the reflective layer.

In preparing the plasmonic patch, the plasmonic nanostructures are attached to, or embedded in the first material in the flexible substrate. They can be attached to the first material covalently, via hydrophobic interaction, via electrostatic interaction, via polar interaction, via physisorption or a combination thereof. In some aspects, the attachment is covalent. In some aspects, the attachment is via a hydrophobic interaction. In some aspects, the attachment is via an electrostatic interaction. In some aspects, the attachment is via physisorption. In some aspects, the attachment is via polar interactions. In some aspects, the attachment uses a combination of two or more of attachment mechanisms.

In some aspects, the plasmonic nanoparticles are attached to the flexible substrate via electrostatic interaction. As an non-limiting example, the first material is activated using an oxygen plasma treatment and then coated with a polyanion (e.g. polystyrene sulfonate (PSS)) rendering the flexible substrate surface negatively charged. This surface is then coated with nanoparticles by incubating it with a solution containing positively charged nanoparticles, which may result from a synthesis mechanism that require a positively charged detergent.

In some aspects, the plasmonic nanoparticles are attached to the substrate covalently via a bifunctional moiety containing a thiol reacting group. As an example, the first material is activated using an oxygen plasma treatment and reacted with a mercaptosilane (e.g., (3-mercaptopropyl) trimethoxysilane or (3-mercaptopropyl)triethoxysilane). This creates a thiol-functionalized flexible substrate that reacts with noble-metal nanoparticles to create a covalent linkage. In another nonlimiting example, the first material is activated using oxygen plasma followed by a reaction with an aminopropylsilane (e.g., (3-aminopropyl)triethoxysilane or (3-aminopropyl)trimethoxysilane). This creates an amine-functionalized flexible substrate that reacts with noble metal nanoparticles or is further modified with, for example, (3-mercaptopropionic acid NHS ester). The NHS ester reacts to form a covalent bond with the amine leaving an unreacted thiol, which is then covalently bound to the noble-metal nanoparticles.

Also disclosed herein are methods for enhancing the fluorescent signal from a fluorescent species. The method generally comprises: placing a plasmonic patch in proximity to the fluorescent species, exciting the fluorescent species using electromagnetic radiation of a predetermined wavelength thereby generating the fluorescent signal, and detecting said enhanced fluorescent signal. In some aspects, the plasmonic patch is as described elsewhere herein.

As used herein, placing the patch in proximity to the fluorescent species is to be interpreted such that the patch is close enough to the fluorescent species in order to enhance the fluorescent signal emanating therefrom. In some aspects, this distance is greater than 0.5 nm, greater than 1 nm, greater than 2 nm, greater than 3 nm, greater than 5 nm, greater than 7 nm, greater than 10 nm, greater than 12 nm, greater than 15 nm, or greater than 20 nm.

Initiation of a fluorescent signal is often initiated by exposing the fluorophore in the fluorescent species to electromagnetic radiation. The source of the electromagnetic radiation can be from any typical source, including, but not limited to, a tunable laser or an LED. The wavelength of the radiation used to initiate the fluorescent signal is selected based on the excitation spectra of the fluorophore in the fluorescent species. The wavelength of the excitation source can be monochromatic or polychromatic depending on the source of the electromagnetic radiation. For example, a tunable laser would be monochromatic while an LED source would be polychromatic. The excitation spectra of the fluorophore describes the wavelength at which the fluorophore will absorb the radiation thereby initiating the fluorescent signal. The emission spectra of the fluorophore describes the wavelength at which the fluorophore emits the fluorescent signal after excitation. Both the excitation spectra and the emission spectra have a maximum value (i.e., an inflection point). The difference between the excitation maximum and the emission maximum in a fluorophore is called the Stokes shift. In some instances, a fluorophore has two or more maxima where one is the global maxima and the other values are local maxima. In some aspects, the predetermined wavelength used to excite the fluorophore in the fluorescent species is the same as the excitation maximum for the fluorophore. The excitation maximum can be the global or local maximum. For the two wavelengths to be the "same", this is within the experimental error as determined by the capabilities of the radiation source. The instrument that generates the energy of the predetermined wavelength is tuned as closely as possible to the excitation maximum of the fluorophore in the fluorescent species.

In some aspects, the predetermined wavelength is selected so it is not the same as the excitation maxima of the fluorophore in the fluorescent species. In some aspects, the predetermined wavelength is from about 300 nm to about 2000 nm, about 400 nm to about 1000 nm, or about 450 nm to about 800 nm. In some aspects, the predetermined wavelength is about 480 nm, about 488 nm, about 532 nm, about 658 nm, or about 784 nm. In still yet another aspect, the predetermined wavelength is about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1000 nm. In still yet another aspect, the predetermined wavelength is within ±5 nm of the excitation maximum of the fluorophore in the fluorescent species. In still yet another aspect, the predetermined wavelength is within ±10 nm of the excitation maximum of the fluorophore in the fluorescent species. In still yet another aspect, the predetermined wavelength is within ±15 nm of the excitation maximum of the fluorophore in the fluorescent species. In still yet another aspect, the predetermined wavelength is within ±20 nm of the excitation maximum of the fluorophore in the fluorescent species. In still yet another aspect, the predetermined wavelength is within ±25 nm of the excitation maximum of the fluorophore in the fluorescent species. In still yet another aspect, the predetermined wavelength is within ±30 nm of the excitation maximum of the fluorophore in the fluorescent species. In still yet another aspect, the predetermined wavelength is within ±35 nm of the excitation maximum of the fluorophore in the fluorescent species. In still yet another aspect, the predetermined wavelength is within ±40 nm of the excitation maximum of the fluorophore in the fluorescent species. In still yet another aspect, the predetermined wavelength is within ±45 nm of the excitation maximum of the fluorophore in the fluorescent species. In still yet another aspect, the predetermined wavelength is within ±50 nm of the excitation maximum of the fluorophore in the fluorescent species.

In some aspects, the fluorescent species is a fluorescent dye. The dye is any dye that generates a detectable fluorescent signal. Examples include, but are not limited to, cyanine dyes (e.g., CY3, CY5), infrared dyes (e.g., 800CW), and alexa fluor dyes (e.g., alexa 488).

Exemplary embodiments of the plasmonic patch and methods for its use are described above in detail. The plasmonic patch and methods described herein are not limited to the specific embodiments described, but rather, components of apparatus, systems, and/or steps of the methods are utilized independently and separately from other components and/or steps described herein. For example, in some embodiments, the methods are also used in combination with other polymers, nanostructures and bioassays, and are not limited to practice with only the apparatuses, systems, and methods described herein. Rather, the exemplary embodiments are implemented and utilized in connection with many other systems.

Although specific features and applications of various embodiments of the disclosure may be shown in some drawings and not in others, this is for convenience only. In accordance with the principles of the disclosure, any feature illustrated herein may be referenced and/or claimed in combination with any feature.

As various changes could be made in the above embodiments without departing from the scope of the disclosure, it is intended that all matter contained in the above description and shown in the accompanying drawings shall be interpreted as illustrative and not in a limiting sense.

EXAMPLES

Preparation of the Plasmonic Patch

Synthesis of Au@Ag-490. To synthesize Ag nanocubes, Au nanospheres with a diameter of 30 nm were employed as the seed. The 30 nm Au nanospheres were in turn synthesized by a seed-mediated method. First, Au seeds were synthesized by adding 0.6 mL of ice-cold NaBH$_4$ solution (10 mM) into a solution containing 0.25 mL HAuCl$_4$ (10 mM) and 9.75 mL CTAB (0.1 M) under vigorous stirring at room temperature for 10 min. The solution color changed from yellow to brown indicating the formation of Au seed. Next, 0.25 mL of the seed solution was added to a growth solution containing 10 mL of CTAC (cetyltrimethylammonium chloride, 0.2 M) and 7.5 mL of ascorbic acid (0.1 M) under stirring. HAuCl$_4$ (10 mL, 0.5 mM) was added to the growth solution as a single addition, resulting in the formation of Au nanospheres with a diameter of 10 nm. The 10 nm Au nanospheres were centrifuged at 13,000 rpm for 30 minutes. For further growth of Au nanoparticles to a diameter of 30 nm, a growth solution comprised of 30 mL CTAC (0.1 M) and 1.95 mL ascorbic acid (10 mM) was prepared. To the resulting solution, 1.2 mL of 10 nm Au nanospheres (extinction 1.0) was added under stirring. A total 30 mL solution of HAuCl$_4$ (0.5 mM) was added into the above mixture at the rate of 0.5 ml/min under stirring. After the reaction was completed, the solution containing 30 nm Au nanospheres was centrifuged at 8000 rpm for 10 min and redispersed into nanopure water to achieve a final extinction ~1.2.

As-synthesized 30 nm Au nanospheres (1.5 mL) and 13.5 mL of CTAC (20 mM) were mixed under stirring at 60° C. for 20 min. Subsequently, 1.5 mL of AgNO$_3$ (2 mM), 3.75 mL of CTAC (20 mM), and 0.7 mL of ascorbic acid (100 mM) were added under stirring at 60° C., and the solution was left under stirring for 4 h. After 4 h, the Au@Ag-490 nanocubes were centrifuged (8000 rpm) and redispersed into 7.5 mL aqueous solution of CTAC (20 mM) and stored in the dark until use. The average edge length of the Au@Ag-490 nanocubes was measured to be 48±1.4 nm from TEM images.

Synthesis of AuNR. AuNR was prepared by a seed-mediated method. Au seed was synthesized by the method described above. For the synthesis of AuNR-760, the growth solution was prepared by the sequential addition of aqueous HAuCl$_4$ (0.01 M, 2 mL), CTAB (cetyltrimethylammonium bromide, 0.1 M, 38 mL), AgNO$_3$ (0.01 M, 0.4 mL), and ascorbic acid (0.1 M, 0.22 mL) followed by gentle inversion to homogenize the solution. Subsequently, 48 µL of the seed solution was added into the growth solution and left undisturbed in dark for 12 hours. For AuNR-670, the growth solution contained HAuCl$_4$ (0.01 M, 2 mL), CTAB (0.1M, 40 mL), AgNO$_3$ (0.01 M, 0.4 mL), HCl (1.0 M, 0.8 mL), and ascorbic acid (0.1 M, 0.32 mL). After the seed solution was diluted 50 times with nanopure water, 10 µL of the diluted seed solution was injected into the above growth solution and left undisturbed in the dark for 12 hours. The obtained AuNR solutions were then subjected to anisotropic oxidation by adding H$_2$O$_2$ (30 wt %). The oxidation process was monitored by measuring the extinction spectra of the AuNR solution. When the longitudinal LSPR wavelength reached the desired value, the AuNRs were washed by two cycles of centrifugation with 0.1M CTAB and finally redispersed in nanopore water. The final extinction of AuNR-670 and AuNR-760 was adjusted to be ~1.5.

Fabrication of plasmonic patch. Sylgard 184 (Dow Corning) polydimethylsiloxane (PDMS) elastomer was mixed at a 10:1 (base to curing agent) ratio. The prepolymer (0.1 g) was spin coated at 3000 rpm for 30 seconds on a polystyrene petri dish with a diameter of 3.5 cm. PDMS was then cured at 70° C. for 15 hours. Once cured, PDMS was treated with oxygen plasma for 3 mins and was immersed into 0.2% aqueous poly(styrene sulfonate) (PSS) solution for 20 mins. PSS treatment rendered a negative charge on the surface of PDMS film, which facilitates the absorption of positively charged plasmonic nanoparticles through electrostatic interaction. For adsorbing the plasmonic nanostructures onto the modified PDMS surface, nanoparticle solution (1 mL) was centrifuged and redispersed into a specific volume of nanopure water (1.5 mL nanopure water for AuNR and 2 mL for Au@Ag-490). The PSS treated PDMS was incubated with the plasmonic nanoparticles for 15 hours in the dark. Subsequently, PDMS was rinsed with nanopure water and dried with nitrogen, leaving a surface with uniformly adsorbed plasmonic nanoparticles.

Figure 34:
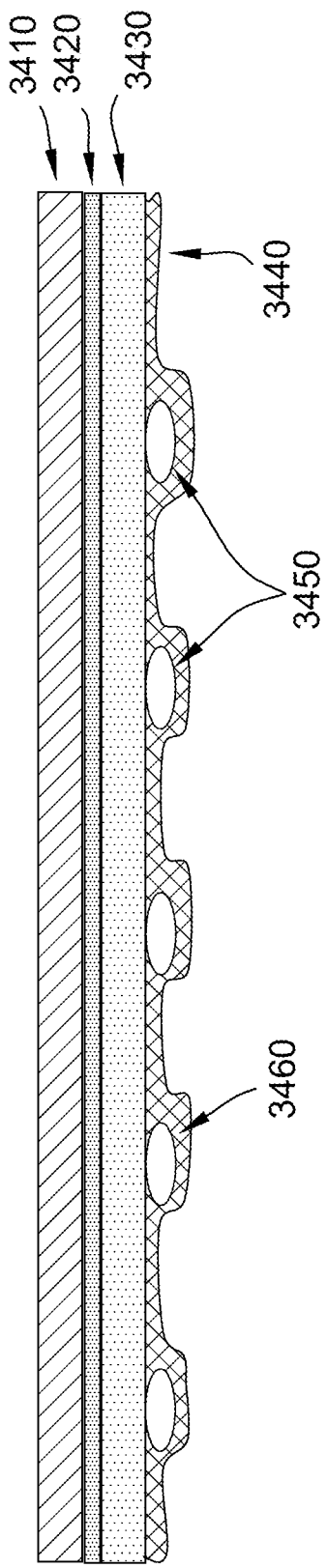
FIG. 34 illustrates one exemplary embodiment of the plasmonic patch that comprises a rigid backer and a reflective layer in addition to the flexible substrate, spacer layer and plasmonic nanoparticles.

FIG. 34 illustrates one embodiment of the plasmonic patch disclosed herein. This embodiment comprises a rigid backing layer or backer 3410 and reflective layer 3420 in addition to the flexible substrate 3430, spacer layer 3440 and plasmonic nanoparticles 3450. It also illustrates the thickness of the spacer 3460.

Covalent linking of nanorods to PDMS. The cured PDMS substrate is treated with oxygen plasma for at least 3 minutes. The surface is covered with an 8% (v/v) solution of (3-mercaptopropyl)trimethoxysilane dissolved in ethanol and incubated for one hour at room temperature. The solution is removed and the surface is washed with ethanol three times. For adsorbing the plasmonic nanostructures onto the modified PDMS surface, the nanoparticle solution (1 mL) was centrifuged and redispersed into nanopure water (1.5 mL nanopure water for AuNR and 2 mL for Au@Ag-490). The modified PDMS was incubated with the plasmonic nanoparticles for 15 hours in the dark. Subsequently, the PDMS substrate was rinsed with nanopure water and dried with nitrogen, thereby creating a surface with uniformly adsorbed plasmonic nanoparticles.

Polymer spacer on plasmonic patch. APTMS (8 µL) and TMPS (0 to 8 µL) were added into 3 mL of phosphate buffered saline (1×PBS). The plasmonic patch was incubated in the above solution for 2 hours. After 2 hours, the plasmonic patch was rinsed with PBS and nanopure water followed by drying with nitrogen gas. For the plasmonic patch of AuNR-760, 0.25 µL TMPS and 8 µL of APTMS were added to 3 mL of PBS for 2 hours incubation. The film of AuNR-670 was modified with APTMS (8 µl APTMS in 3 mL PBS for 2 hours incubation). These spacer conditions were used in the following experiments.

Figure 30A:
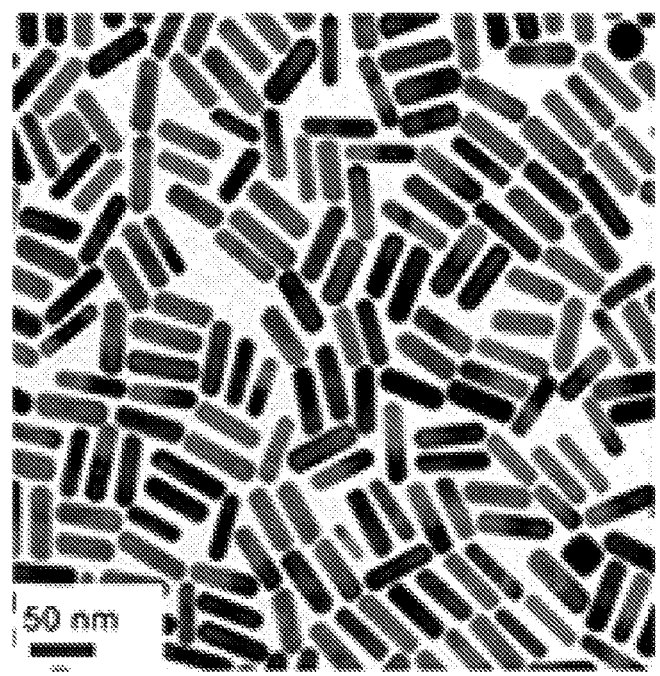
FIGS. 30A to 30G depict (102A) TEM image of AuNR-758. (30B) Extinction spectra of plasmonic patches comprised of different densities of AuNR-758 after being transferred to 96 well plate. (30C) SEM images of the plasmonic patch surface revealing the uniform distribution of AuNR-758 with increasing density. (30D and 30F) Fluorescence maps without and with patch showing a progressive increase in the fluorescence intensity with increasing AuNR density (30E and 30G) Plot showing the fluorescence enhancement factor of the plasmonic patches as function of the density of AuNR.
Figure 30B:
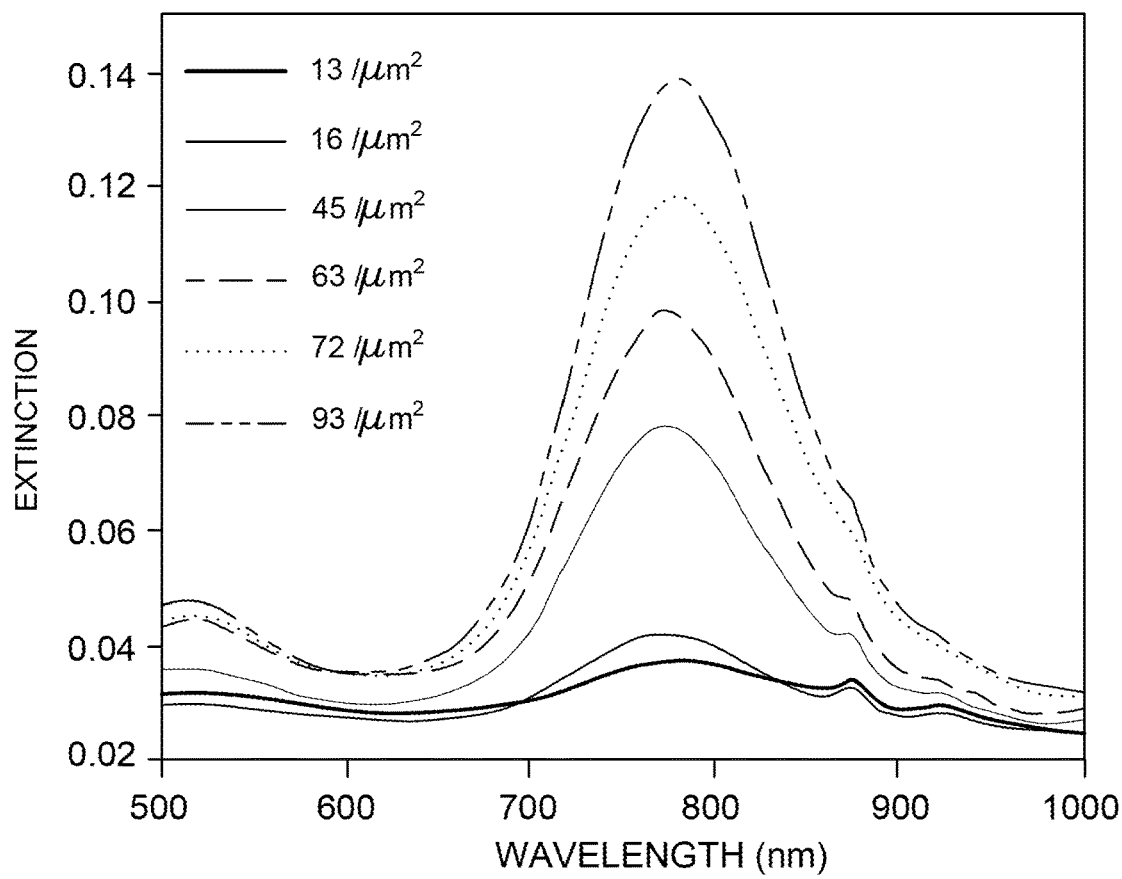
Figure 30C:
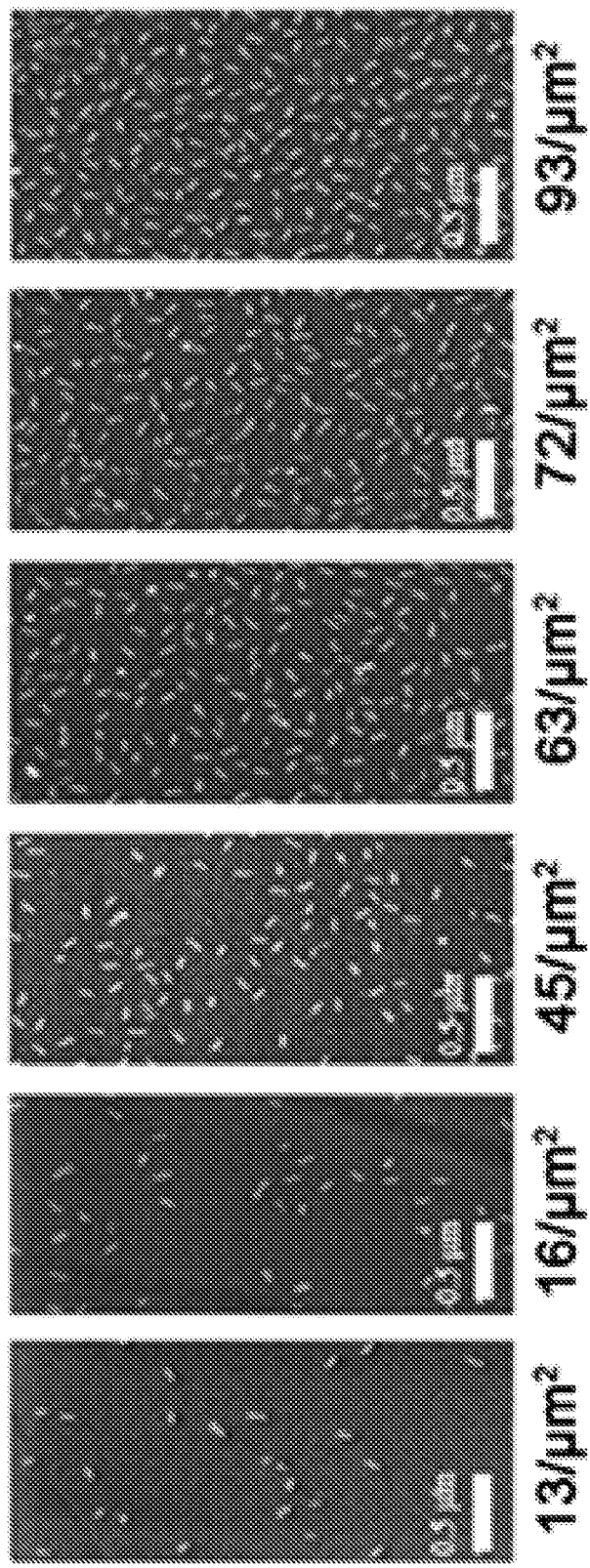
Figure 30D:
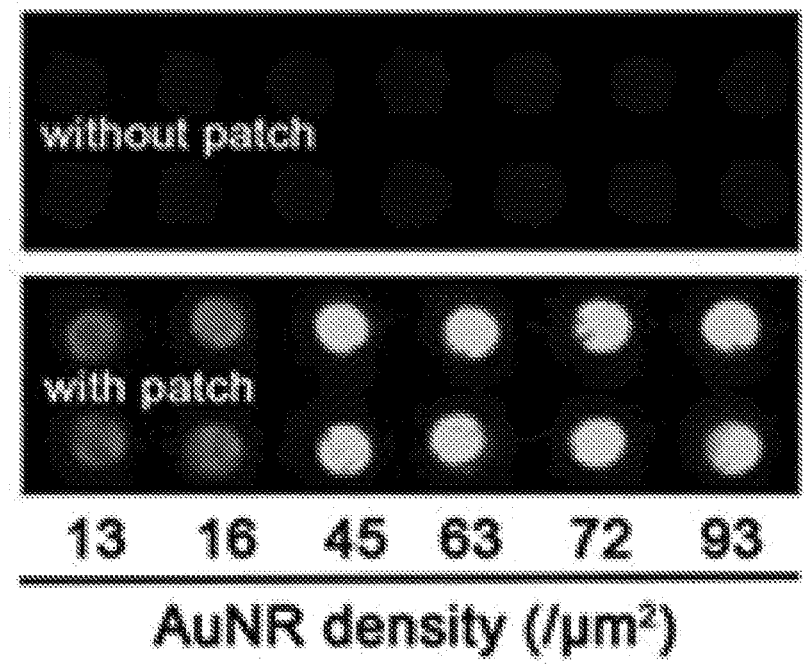
Figure 30E:
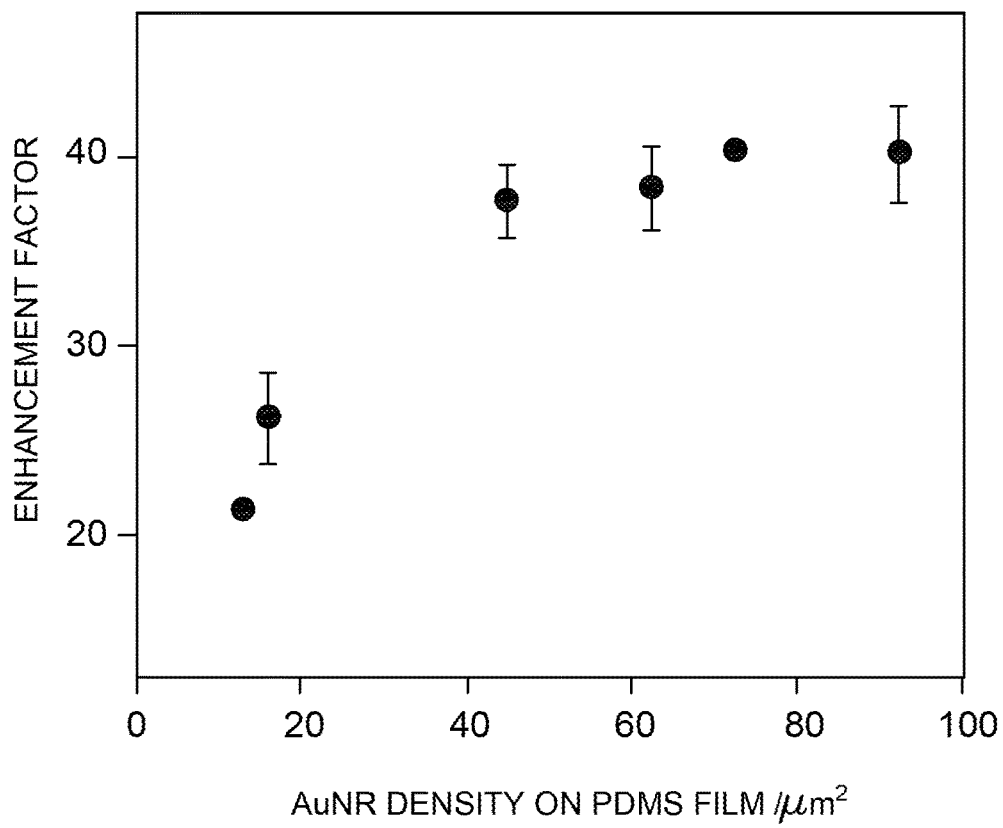
Figure 30F:
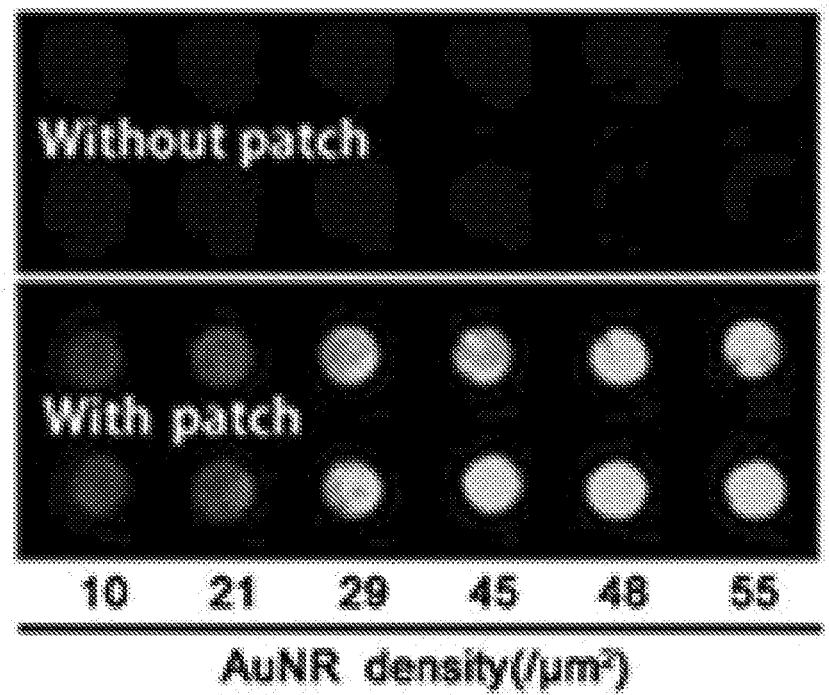
Figure 30G:
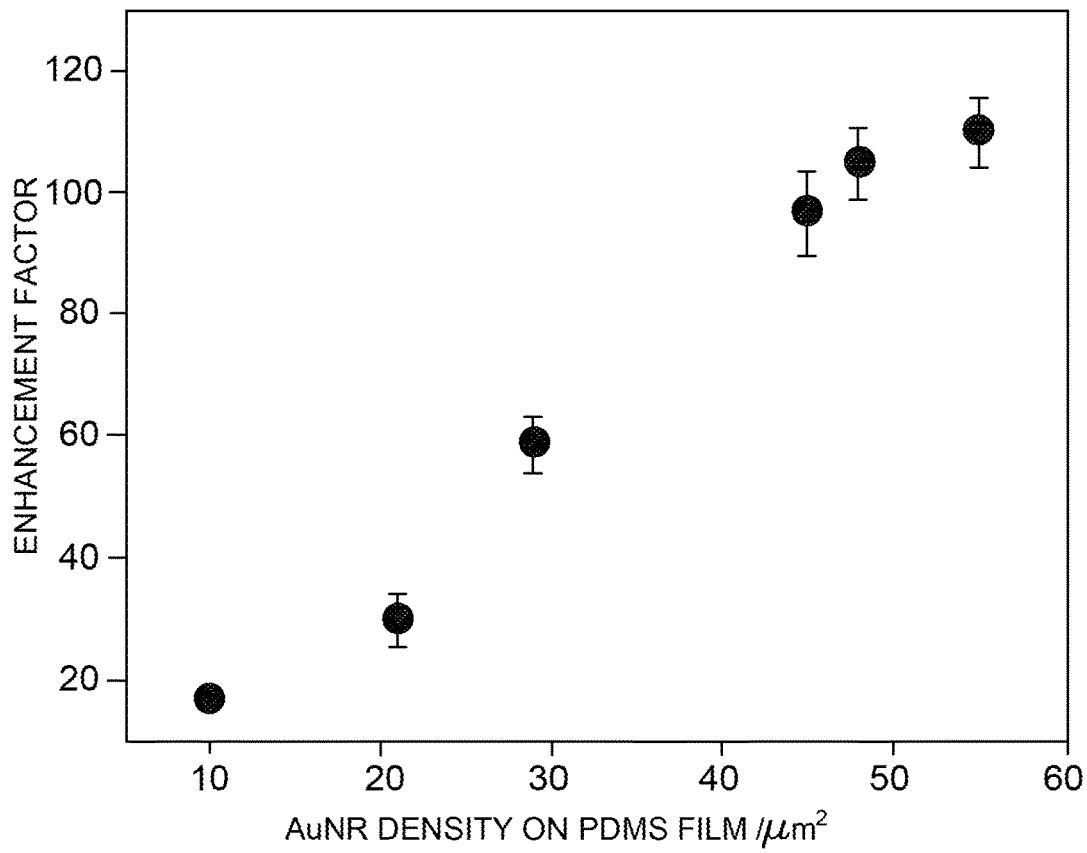

Fabrication of plasmonic patches having different densities of AuNR-758 nanorods. The influence of the density of the plasmonic nanostructures on the fluorescence enhancement efficiency was tested. AuNR-758 were utilized to probe the effect of density (FIG. 30A). To obtain plasmonic patches with varying density of nanostructures, the PDMS films was exposed to AuNR solutions of varying concentrations. The extinction spectra and SEM images obtained from these plasmonic patches illustrate the variation in the density of the nanostructures, directly corresponding to the concentration of AuNR solution (FIG. 30B, 30C). SEM images of the plasmonic patches revealed AuNR densities on these plasmonic patches to be 13±2/µm$^2$, 16±2/µm$^2$, 45±3/µm$^2$, 62±4/µm$^2$, 72±4/µm$^2$ and 93±4/µm$^2$ (FIG. 30C). The color of plasmonic patches and extinction intensity of the LSPR band intensified gradually in a density-dependent manner (FIG. 30B). To quantify the fluorescence enhancement efficiency, the plasmonic patches with varying AuNR density were transferred onto the bottom of polystyrene wells (in a 96-well plate) coated with 800CW (tagged to streptavidin). The plasmonic patches exhibited a density dependent-fluorescence enhancement, with higher density of plasmonic nanostructures resulting in higher enhancement (FIG. 30D, 30E). The enhancement rapidly increased up to a density of ~45/μm² and remained virtually unchanged for higher densities.

Figure 31A:
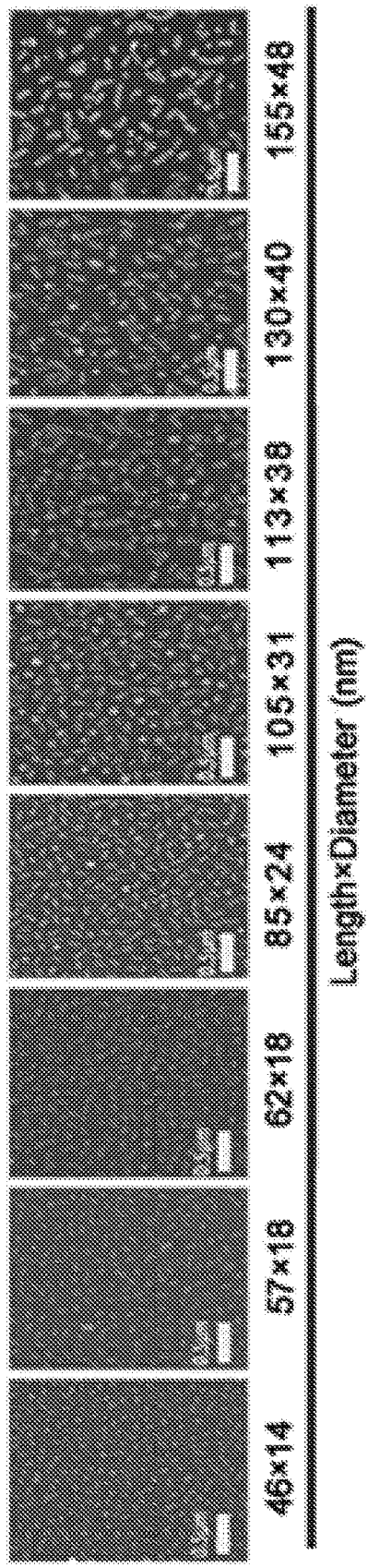
FIGS. 31A to 31D depict (31A) SEM images of the top surfaces of plasmonic patches modified with AuNR of various size (length/diameter). The densities of AuNRs were controlled to be similar between different plasmonic patches. (31B) Fluorescence map showing the enhancement of emission of 800CW using AuNR of different size. (31C) Plot showing the fluorescence enhancement factors using these AuNRs. (31D) LSPR wavelength of plasmonic patch after being transferred to 96-well plate (recorded by plate reader), showing a slight red shift compared to the LSPR wavelength measured in aqueous solutions.
Figure 31D:
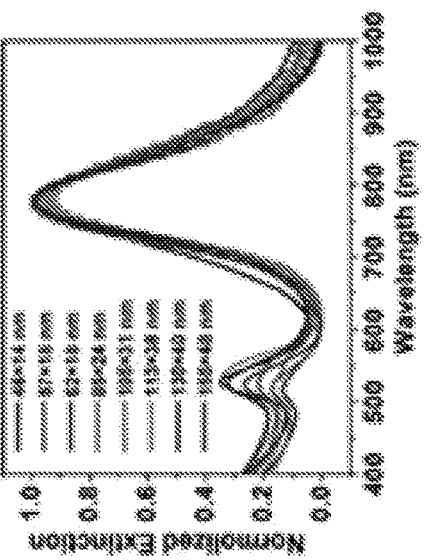
Figure 31C:
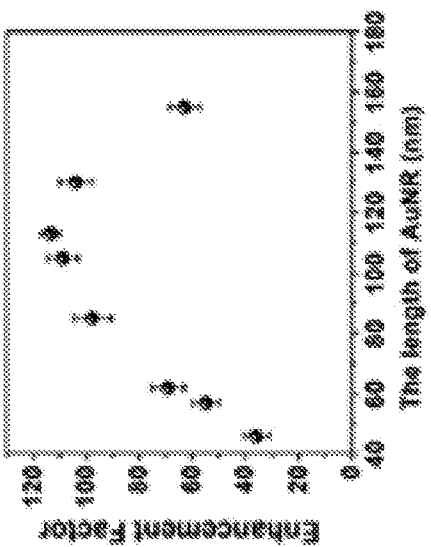
Figure 31B:
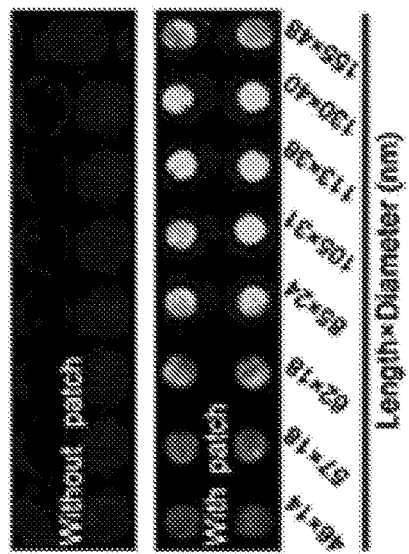

Fabrication of plasmonic patch having different size nanorods. Using the procedures described above, different size nanorods were prepared (FIGS. 31A and 32A) and incorporated into the plasmonic patch at a constant density of nanorods. Extinction coefficients were normalized (FIG. 32B) such that the AuNRs exhibited a similar LSPR after incorporation into the PDMS film (FIG. 31D). As illustrated in FIGS. 31B and 31C, the size of the AuNRs affects the enhancement of the fluorescent signal with a maximum enhancement for AuNRs measuring about 113 nm by 38 nm.

Fluorescence Enhancement Using the Plasmonic Patch.

Aldehyde activation of silicon and glass substrates. Glass and silicon substrates were cleaned using Piranha solution (3:1 concentrated sulfuric acid to 30% hydrogen peroxide solution) followed by thorough rinsing with nanopure water and drying with nitrogen gas. A mixture of 0.25 mL of (3-aminopropyl)triethoxysilane (APTES) and 0.25 mL of nanopure water was added into 4.5 mL pure ethanol followed by mixing. Cleaned silicon and glass substrates were incubated in the APTES solution for 2 hours. The substrates were subsequently rinsed with nanopure water and ethanol followed by drying under nitrogen gas. APTES-modified substrates were incubated in 2.5% glutaraldehyde (GA) solution (PBS, pH=7.4) for 2 hours. The substrates were rinsed with PBS followed by nanopure water to remove excess GA. The aldehyde activated substrates react with primary amines of the protein to form Schiff's base linkage.

Plasmonic patch enhanced fluorescence. 96-well plate (polystyrene), nitrocellulose membrane (average pore size of 0.22 μm), aldehyde activated glass and silicon substrates were incubated in 800CW labeled anti-mouse IgG (10 ng/mL in PBS) in the dark for 8 hours. The substrates were then rinsed with PBS and nanopure water. Plasmonic patch with AuNR-760 was cut into a round shape with a diameter of 4 mm. For the silicon substrate, the film was directly applied on top of the wet surface, and the sample was scanned after 20 mins. For the other substrates, a reflective flexible film (PET film Novele IF-220 (Novacentrix)) coated with 50 nm of gold layer using thermo-evaporator) was added on the top of plasmonic patch. Bottom reading, or epifluorescence, mode was adopted for these substrates due to their optical transparency, and the reflective film increased the signal by about 2-fold. All the fluorescent signals were obtained by LICOR Odyssey CLx imager.

ELISA. Duoset ELISA from R&D systems (DY1750B, DY1757) were employed for the quantification of Neutrophil Gelatinase Associated Lipocalin (NGAL) and Kidney Injury Molecule-1 (KIM1), respectively. 96-well plastic plates were first coated with capture antibodies (For NGAL: 2 μg/mL in PBS; for KIM1: 4 μg/mL in PBS) through overnight incubation at room temperature, followed by blocking with 300 μL reagent diluent (PBS containing 1% BSA, 0.2 μm filtered). After three times washing with PSBT (0.05% Tween 20 in PBS), 100 μL of serial diluted standard samples as well as patients' urine samples (10-fold dilution for KIM1, 40-fold dilution for NGAL) were added into different wells (all dilutions using reagent diluent). The plate was covered with an adhesive strip and incubated at room temperature for 2 hours. After washing three times with PBS, the plate was incubated with biotinylated detection antibodies (For NGAL: 25 ng/mL in reagent diluent; for KIM1: 50 ng/mL in reagent diluent) at room temperature for 2 hours, washed another three times with PBS, incubated with HRP labeled streptavidin (200-fold dilution using reagent diluent) for 20 mins, and washed three times with PBS. 100 μL of substrate solution (1:1 mixture of Color Reagent A ($H_2O_2$) and Color Reagent B (Tetramethylbenzidine) (R&D Systems, Catalog #DY999)) was added to each well and the reaction was stopped by adding 50 μL of $H_2SO_4$ (2 N) (R&D Systems, Catalog #DY994) after 20 mins. Optical density of each well was determined using a microplate reader set to 450 nm.

Fluorescence-linked immunosorbent assay with plasmonic patch. Fluorescence-linked immunosorbent assay was first implemented using 96-well plates with glass bottom (Cellvis). The glass surface of each well was treated to achieve aldehyde functionality using the method described above. Subsequent procedures were identical with ELISA until the streptavidin binding step. Instead of HRP-labeled streptavidin, 100 μL of dye-labeled streptavidin (800CW or LT680 (LICOR)) was diluted to a final concentration of 50 ng/mL using reagent diluent and added to each well followed by a 20-min incubation. Plasmonic patch was subsequently transferred to each well of the 96-well plate using the method introduced above. The LICOR Odyssey CLx scanner was used to scan the 96-well plate using 800 nm channel (intensity of 3.0, resolution of 84 μm, scanning height of 2 mm) and 700 nm channel (intensity of 3.5, resolution of 84 μm, scanning height of 2 mm). For the fluorescence-linked immunosorbent assay performed using plastic bottom 96-well plates, the procedure remained the same except the omission of surface modification steps. While scanning, the height was set to 4 mm for the plastic 96-well plate. All the fluorescent signals were analyzed by calculating the average intensity of the center (2 mm diameter) within each well.

Fluorescence enhancement on protein microarray. Commercialized protein microarray chip kits were purchased from RayBiotech (Custom G-Series Antibody Array, AAX-CUST-G). Antibodies were printed on a glass slide with four subarrays available per slide. The slide was blocked by blocking buffer for 30 mins. Urine samples were diluted twice using blocking buffer and 90 μL of the diluted samples was added to each sub-well of the microarray chip followed by a two-hour incubation at room temperature. The chip was then washed thoroughly with wash buffer. Seventy microliters of biotin-conjugated anti-cytokines was added to each subarray and the chip was incubated at room temperature. After two hours, the chip was washed, and 70 μL of streptavidin-800CW (100 ng/mL in blocking buffer, LICOR) was added and the plate was incubated in the dark for 20 mins. The chip was washed thoroughly with wash buffer then nanopure water and dried under nitrogen gas. The glass chip was scanned by LICOR Odyssey CLx scanner using 800 nm channel (intensity of 2, resolution of 21 μm, scanning height of 1 mm). Plasmonic patch of AuNR-760 was cut into 1×1 cm² and applied on the top of each subarray followed by attachment of gold coated reflective film of the same size. The chip was rescanned using the same settings. Median background signal was adopted for analyzing the spot intensity.

Figure 3:
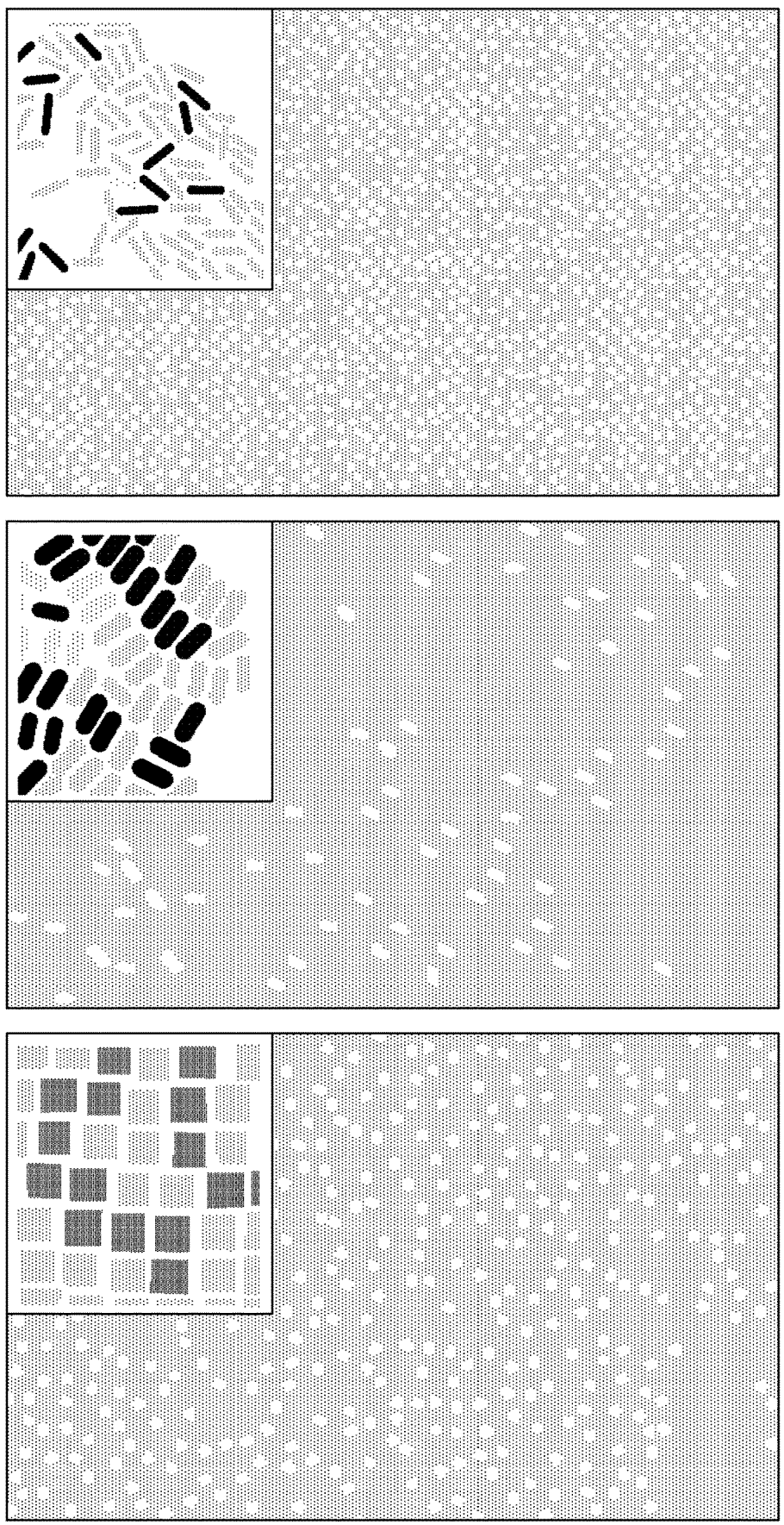
FIG. 3 depicts exemplary embodiments of SEM images of a plasmonic patch surface revealing the uniform distribution of plasmonic nanostructures on a polymer film (from left to right: Au@Ag-490, AuNR-670, AuNR-760) in accordance with the present disclosure. Insets show the representative TEM images of the corresponding plasmonic nanostructures.
Figure 4:
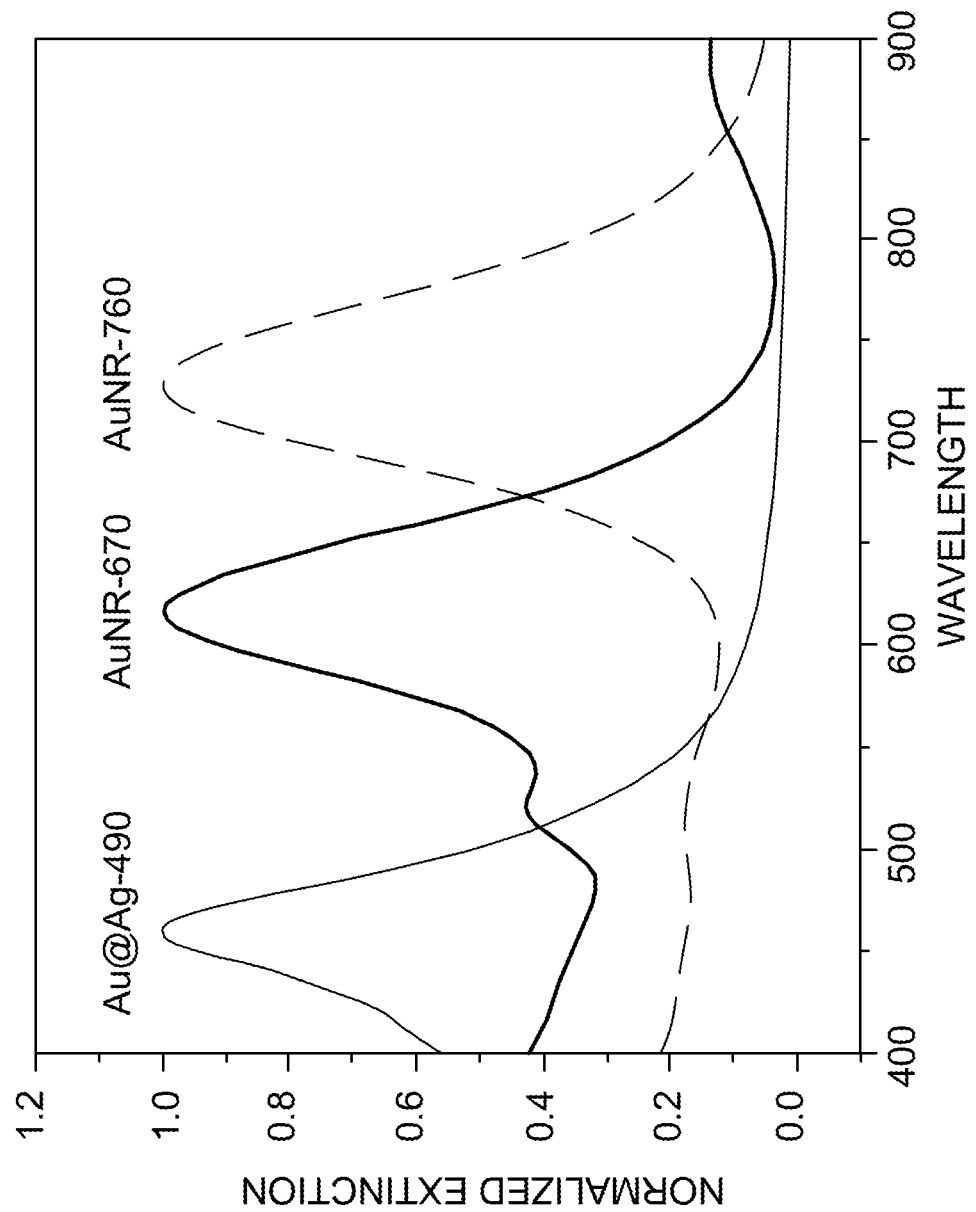
FIG. 4 is an exemplary embodiment of an extinction spectra of plasmonic patches adsorbed with distinct plasmonic nanostructures (measured in air) in accordance with the present disclosure.
Figure 5:
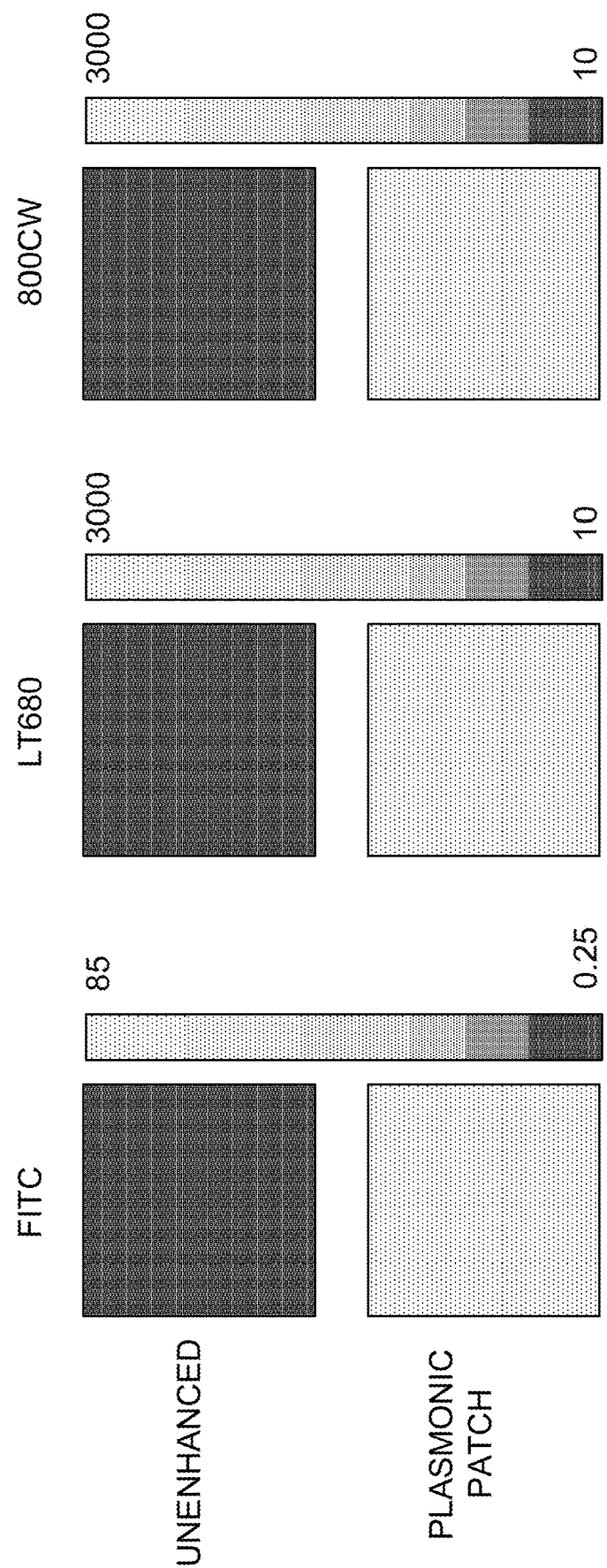
FIG. 5 is an exemplary embodiment of a fluorescence map of three fluorophores adsorbed on silicon substrate in the presence and absence of plasmonic patch in accordance with the present disclosure.
Figure 6:
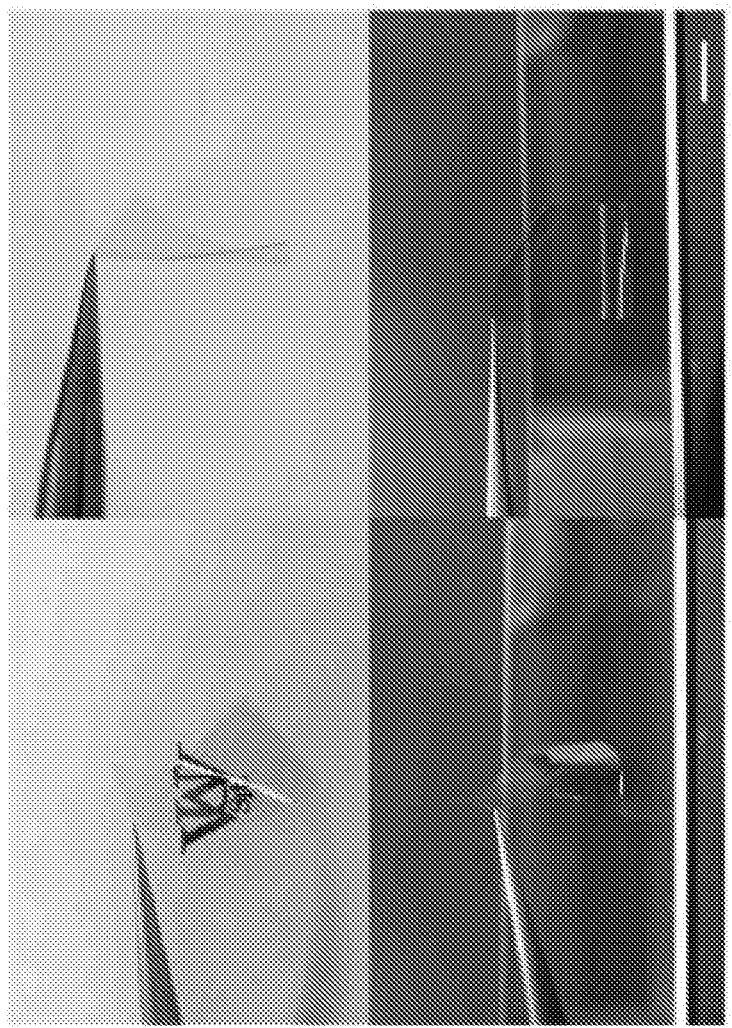
FIG. 6 depicts the transfer process of and ease of handling of plasmonic patch (AuNR-670) using a sharp forceps in accordance with the present disclosure. Scale bar=5 mm.
Figure 7A:
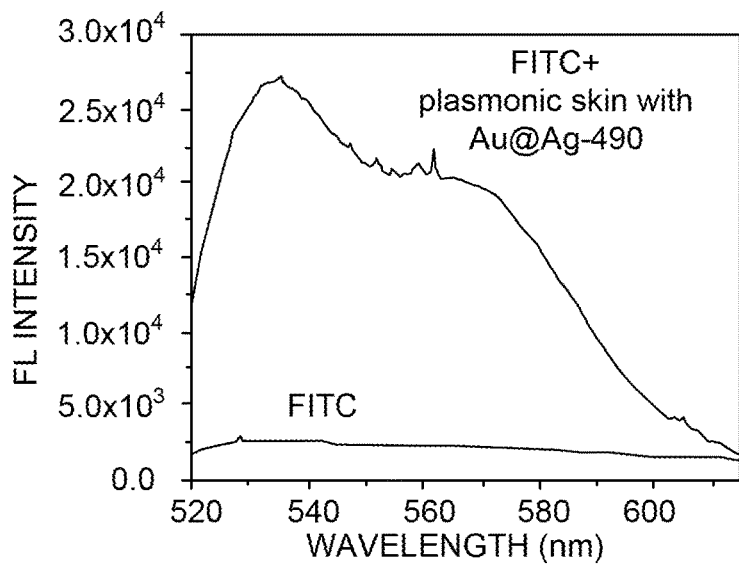
FIGS. 7A, 7B and 7C are exemplary embodiments of fluorescence spectra of (7A) FITC, (7B) LT680, and (7C) 800CW adsorbed on silicon substrate in the presence and absence of plasmonic patch in accordance with the present disclosure.
Figure 7B:
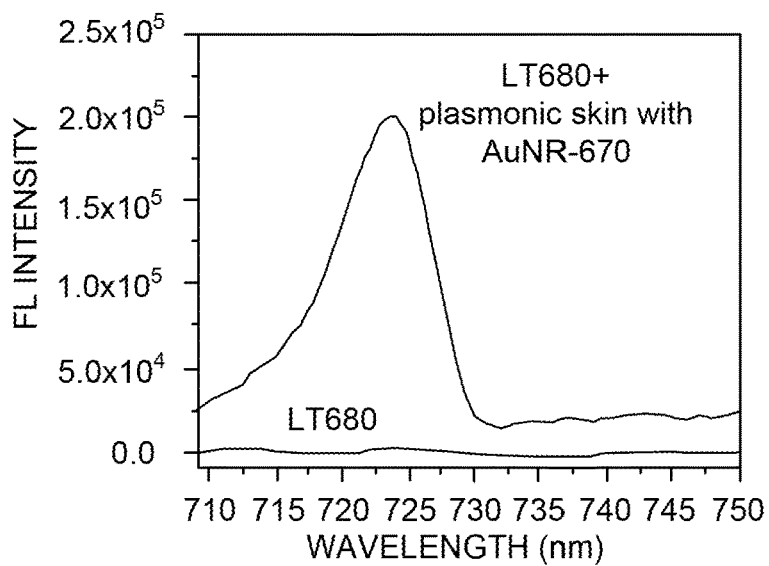
Figure 7C:
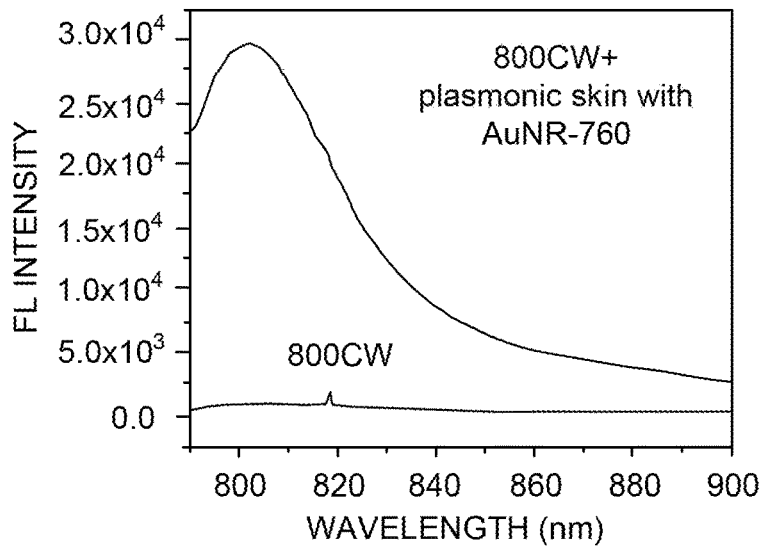
Figure 8:
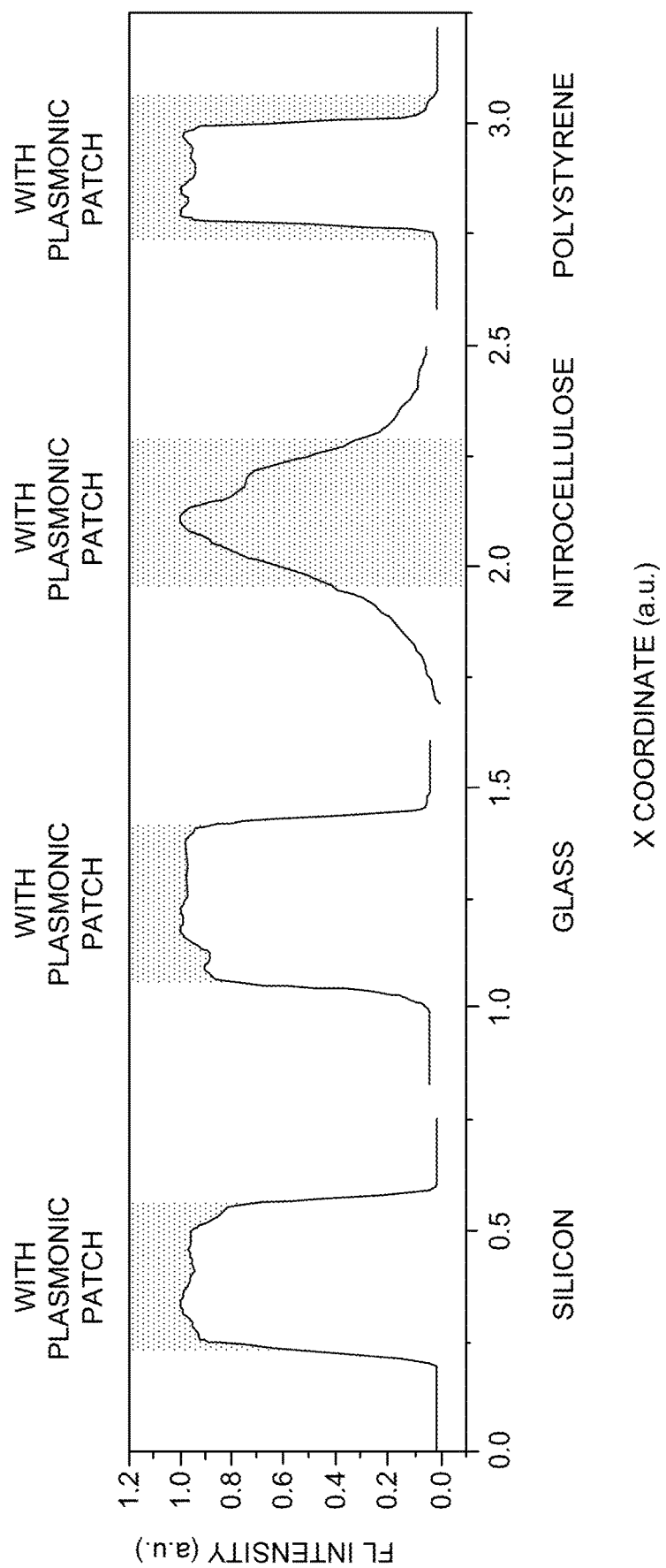
FIG. 8 is an exemplary embodiment of a fluorescence enhancement of plasmonic patch of 800CW uniformly adsorbed on silicon, glass, nitrocellulose, and polystyrene surfaces in accordance with the present disclosure. Circular plasmonic patch with AuNR-760 (with a diameter of 4 mm) is applied on each surface coated with 800CW. Fluorescent intensity profile across the plasmonic patch reveals strong enhancement within the plasmonic patch region compared to the area outside the film (75 times for silicon, 24 times for glass, 9 times for nitrocellulose, and 80 times for polystyrene).

Plasmonic patch material characterization. A thin polydimethylsiloxane (PDMS) layer (~30 μm thick) is employed as the "film" material owing to its high mechanical flexibility (elastic modulus ~1 Mpa) (FIG. 1), optical transparency (>95% transmittance within the wavelength range of 400 to 900 nm), excellent processability, and low cost. The elastomeric nature of PDMS enables conformal contact (down to atomic level) of the film with diverse surfaces, which helps to improve the fluorescence enhancement as the enhanced electromagnetic field of the plasmonic nanostructures is limited to a short distance. The plasmonic patch is tailored for a specific fluorophore by maximizing the overlap between the localized surface plasmon resonance (LSPR) of the nanostructures and the optical absorption (excitation source) of the fluorophore to achieve the highest enhancement. As representative examples, three different films were fabricated using three different nanostructures: (i) gold core-silver shell nanocubes (Au@Ag nanocubes) with LSPR wavelength at 490 nm (Au@Ag-490 henceforth); gold nanorods (AuNR) with longitudinal LSPR wavelength at (ii) 670 nm (AuNR-670 henceforth) and (iii) 760 nm (AuNR-760 henceforth) (FIG. 2). SEM images indicate a highly uniform distribution of the plasmonic nanostructures on the PDMS film with no sign of aggregation or patchiness (FIG. 3), which ensures a nanoscale conformal contact between the plasmonic patch and surface of interest. Extinction spectra obtained from the plasmonic patches further validate the absence of aggregates (FIG. 4). The flexible plasmonic patches exhibit distinct and uniform color corresponding to the LSPR wavelength of the nanostructures. The three films described above were designed for fluorescein isothiocyanate (FITC) (Au@Ag-490), LT680 (AuNR-670), and 800CW (AuNR-760) as a representative fluorophore. Transfer of the corresponding plasmonic patches to silicon surfaces coated with FITC, LT680, and 800CW resulted in a uniform enhancement of fluorescence from these surfaces (FIG. 5). Additionally, the transfer process is easy, and does not require special training for users to implement (FIG. 6). The fluorescence intensity in the presence of plasmonic patch was found to ~50-fold higher compared to that obtained from an unenhanced surface under identical illumination conditions (FIG. 7). Apart from silicon, the plasmonic patch was also applied to glass, nitrocellulose, and polystyrene (common material for microtiter plates) surfaces, which are extensively employed in various fluorescence-based detection, quantitative sensing and imaging techniques. The excellent conformity of the plasmonic patch with all of the above materials resulted in large fluorescence enhancement of the dye deposited on these surfaces. The intensity cross-section profiles from these different materials demonstrated ~80-fold enhancement in the fluorescence from the regions with plasmonic patch (center) compared to unenhanced regions (periphery) (FIG. 8).

Distance-dependent fluorescence enhancement and spacer layer. It is known that the evanescent nature of the enhanced electromagnetic field at the surface of the plasmonic nanostructures results in a highly distance-dependent enhancement of Raman scattering and fluorescence at the surface of the plasmonic nanostructures. When fluorophores are brought in direct contact (or in extreme proximity) with plasmonic nanostructures, non-radiative energy transfer between the fluorophore and metal surface results in fluorescence quenching. On the other hand, increasing the distance between the fluorophores and metal nanostructures results in a decrease in the enhancement due to the decay in the electromagnetic field from the surface of the nanostructures. Taken together, an optimal distance between the metal surface and fluorophore is tuned to optimize the fluorescent enhancement for each individual assay.

Figure 9:
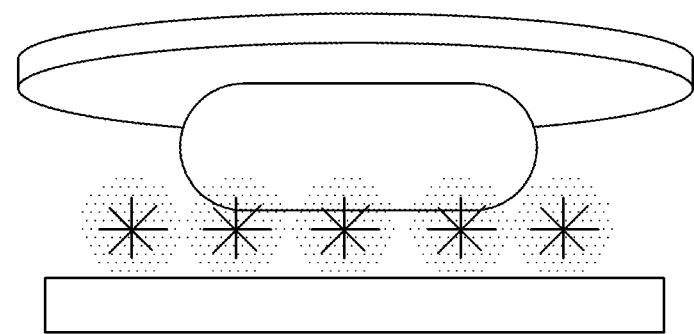
FIG. 9 is an exemplary embodiment of a schematic illustration showing a plasmonic patch with a polymer layer, acting as the spacer between fluorophores and plasmonic nanostructures in accordance with the present disclosure. Spacer thickness is adjusted to achieve different amounts of enhancement efficiency.
Figure 9:
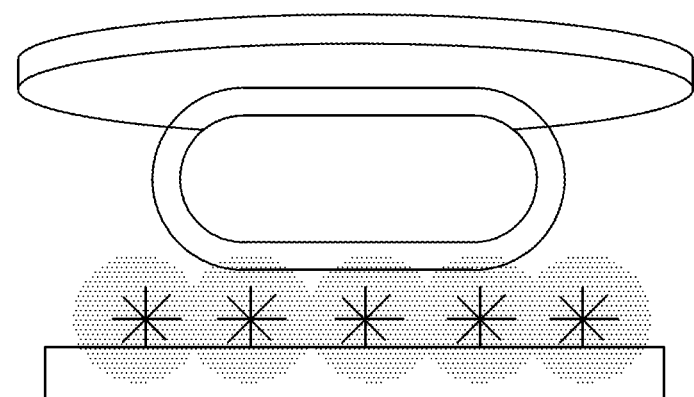
Figure 9:
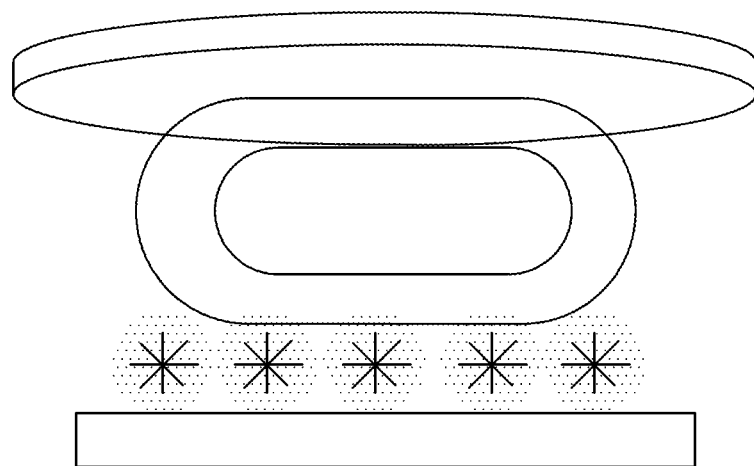
Figure 10:
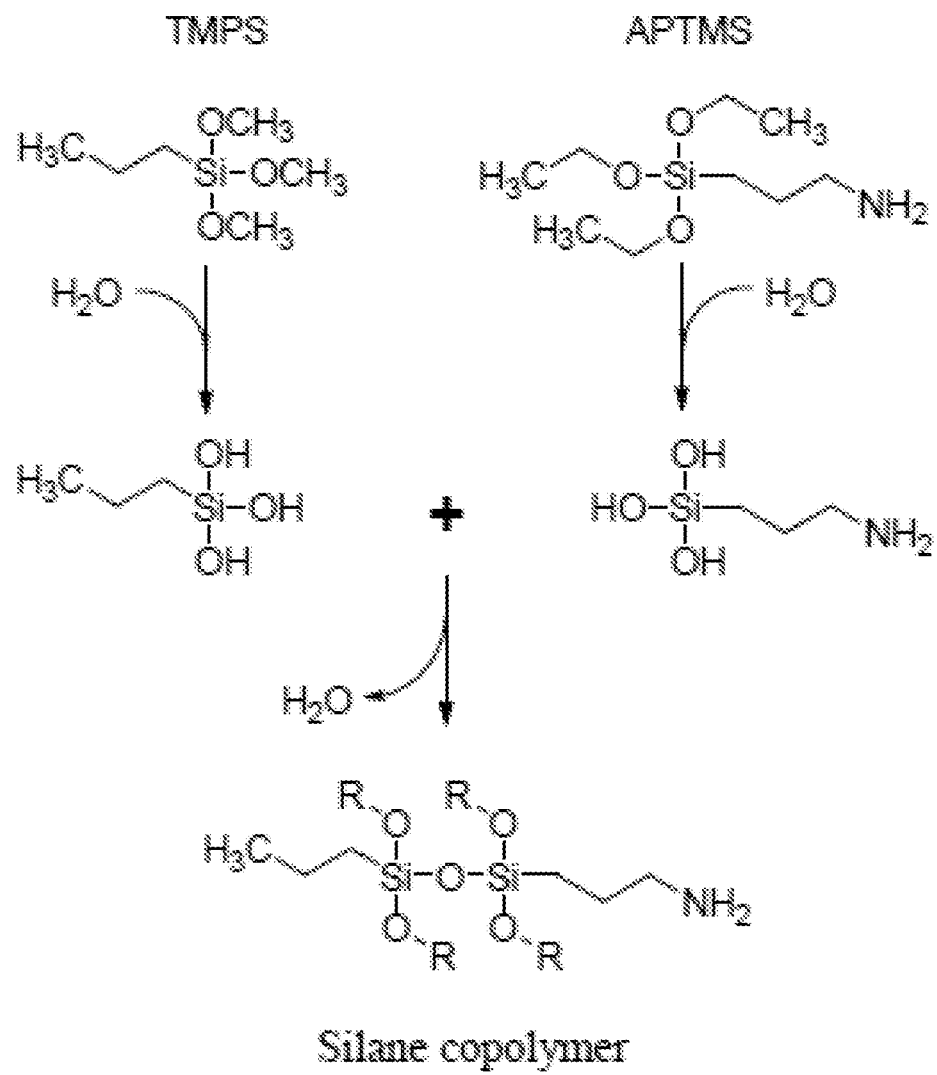
FIG. 10 is an exemplary embodiment of a schematic illustration showing the copolymerization of TMPS and APTMS, which is employed as a spacer layer on plasmonic patch, in accordance with the present disclosure.
Figure 11A:
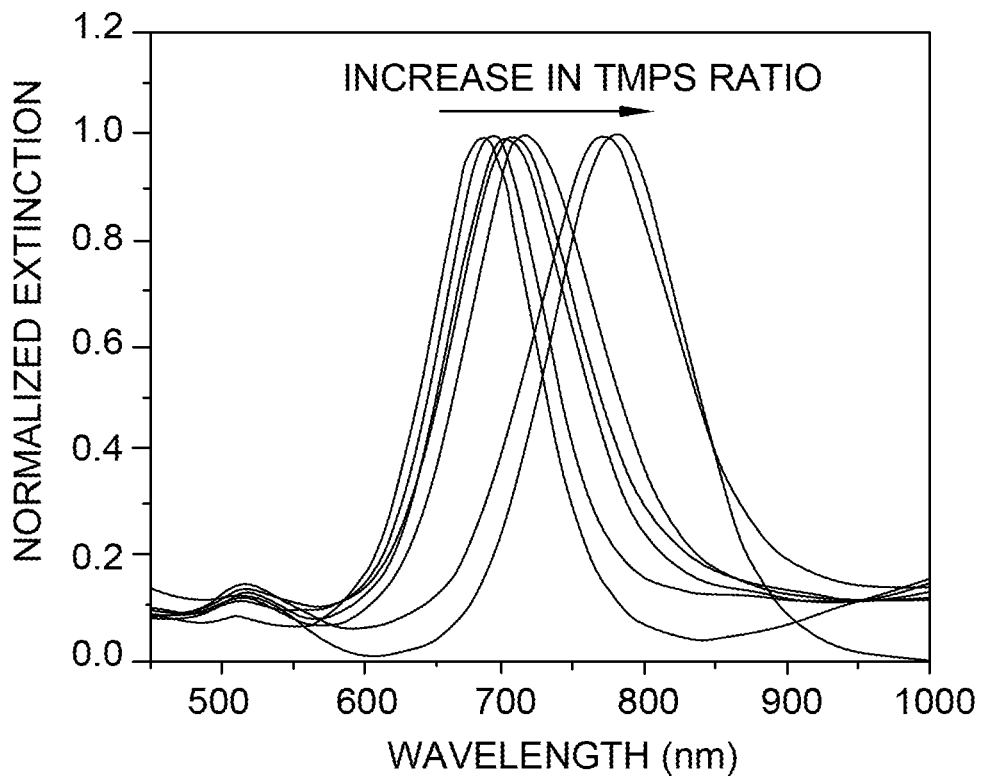
FIGS. 11A and 11B are exemplary embodiments of: a (11A) LSPR wavelength of pristine AuNR and AuNR coated with siloxane copolymer; TMPS/APTMS (μL/μL) employed in the polymerization process from left to right: 0:0, 0:8, 0.25:8, 0.5:8, 1:8, 4:8, and 8:8; and, a (11B) Red-shift in LSPR wavelength (compared to pristine AuNR) as a function of amount of TMPS employed during polymerization (with APTMS amount set to 8 μL) in accordance with the present disclosure.
Figure 11B:
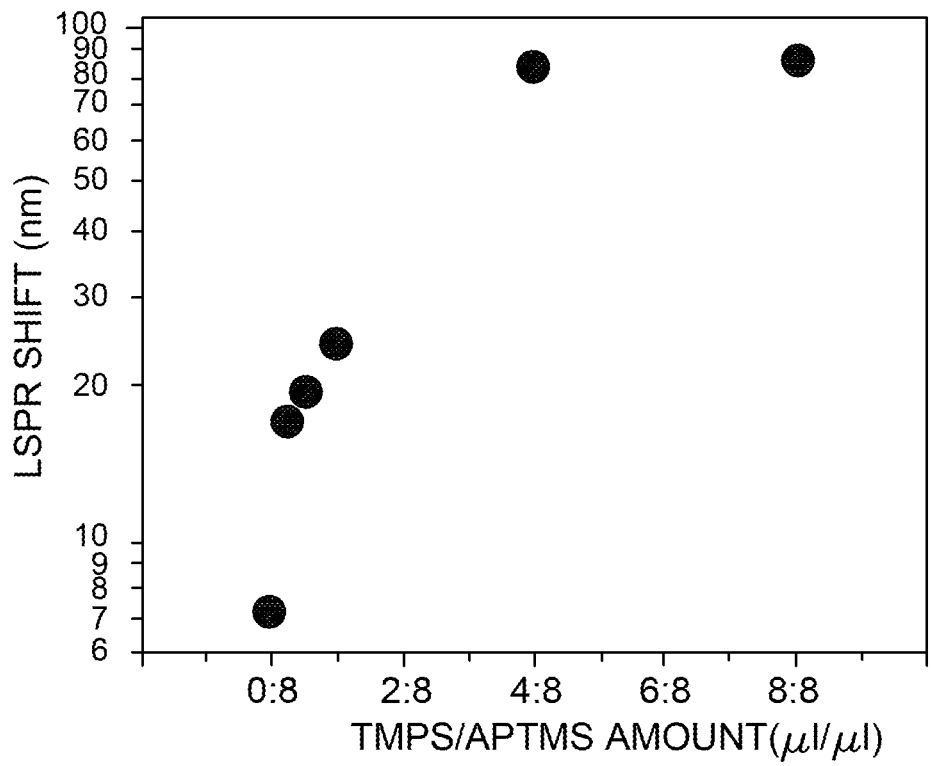
Figure 12:
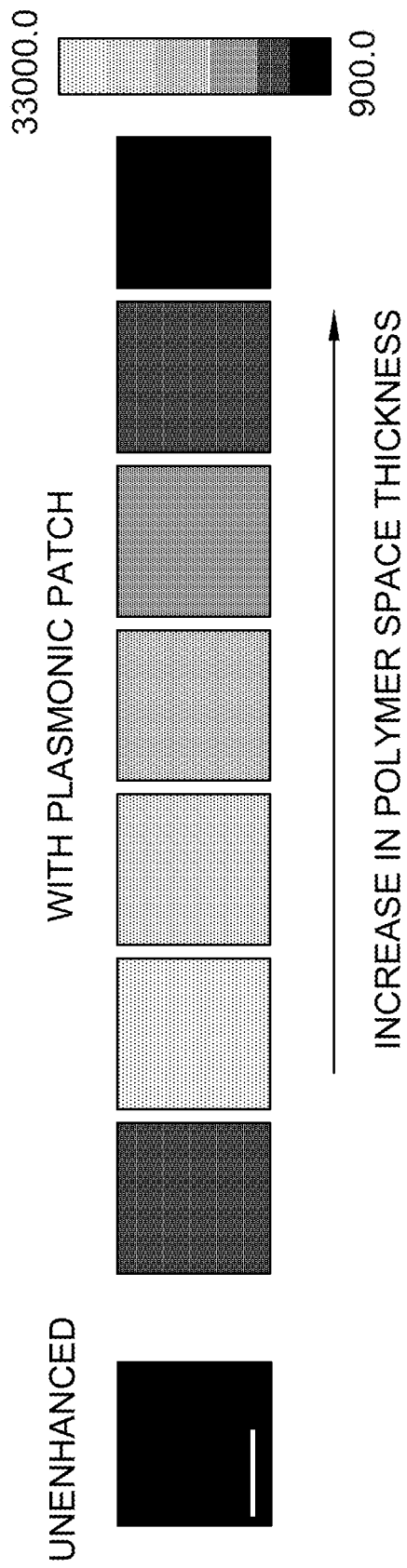
FIG. 12 is an exemplary embodiment of a fluorescence map of 800CW in the presence of plasmonic patch with increasing spacer layer thickness (TMPS and APTMS volume ratio is 0:0, 0:8, 0.25:8, 0.5:8, 1:8, 4:8, 8:8 from left to right) in accordance with the present disclosure.
Figure 13:
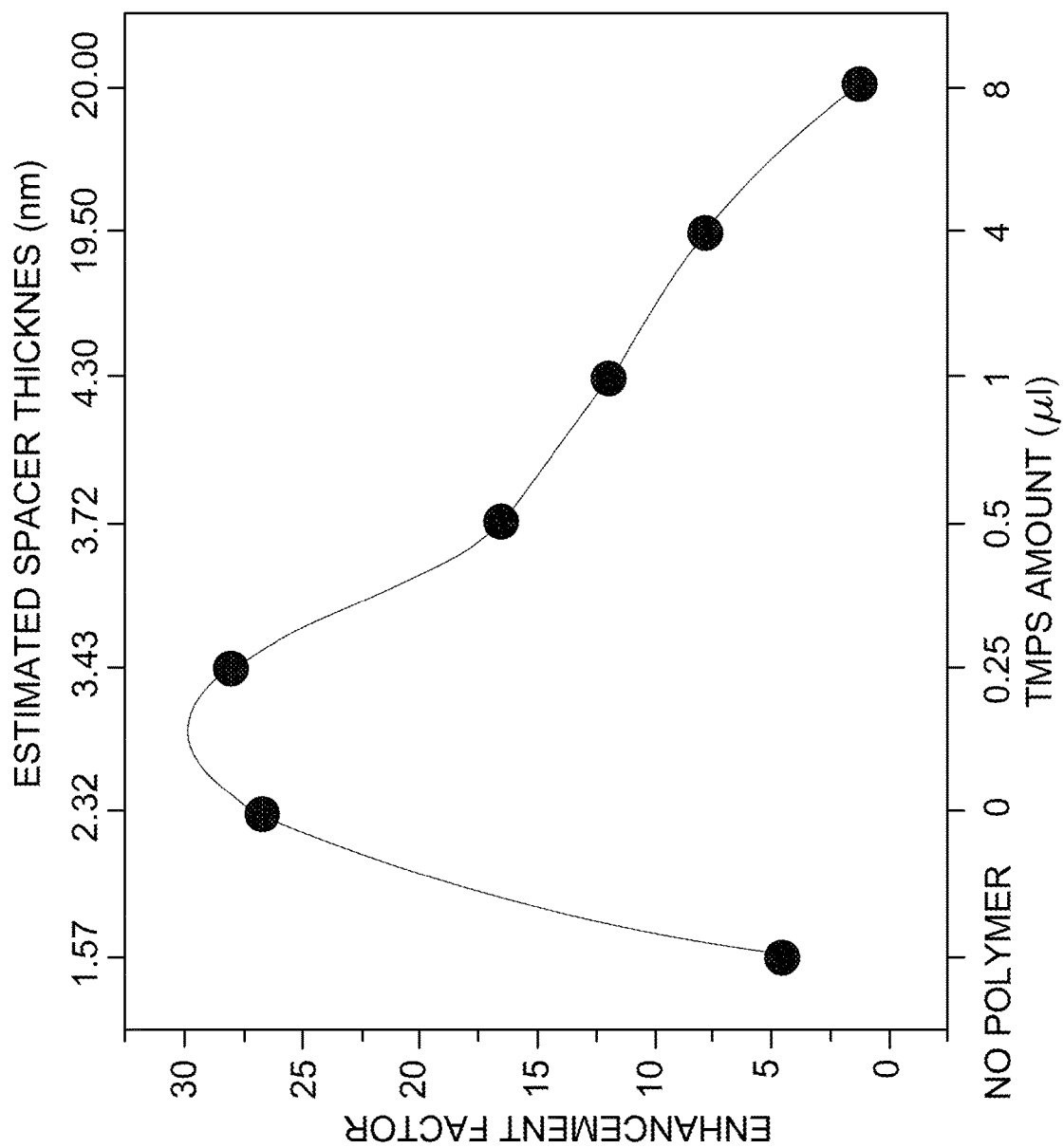
FIG. 13 is an exemplary embodiment of a fluorescence enhancement factor as a function of spacer thickness (TMPS to APTMS ratio in polymerization process) in accordance with the present disclosure.
Figure 14:
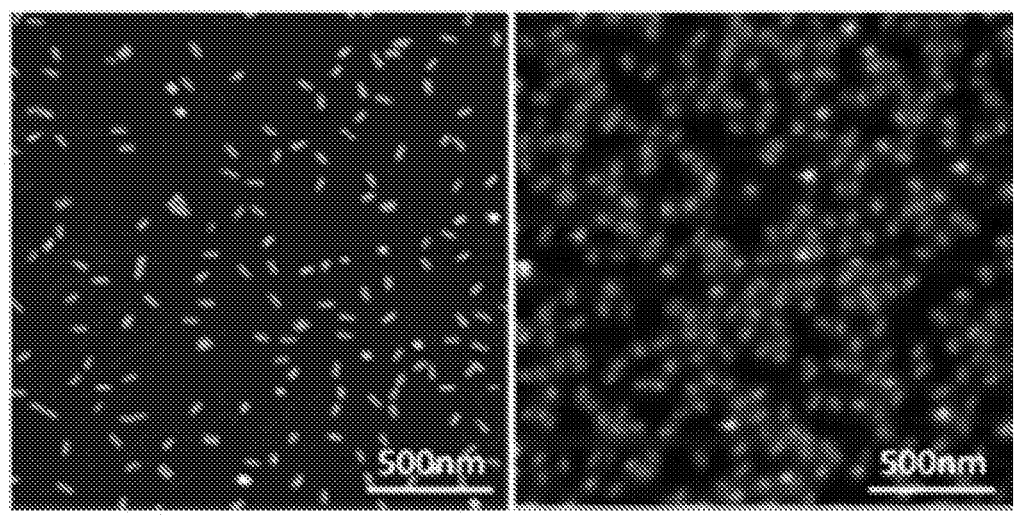
FIG. 14 is an exemplary embodiment of AFM images of pristine Au nanorods (left) and Au nanorods with polymer spacer (right) (TMPS and APTMS volume ratio of 4:8) in accordance with the present disclosure.

In one example, optimization of the distance between plasmonic nanostructures and fluorophores was done. A polysiloxane copolymer film was formed on the surface of the plasmonic patch as a spacer layer (FIG. 9). Trimethoxypropylsilane (TMPS) and (3-aminopropyl) trimethoxysilane (APTMS) were copolymerized onto the plasmonic patch comprised of AuNR-760. The two monomers underwent hydrolysis and condensation yielding an amorphous copolymer layer (FIG. 10). Increasing the thickness of the spacer layer results in a gradual red shift of the longitudinal LSPR wavelength of AuNR owing to the increase in the refractive index of the medium surrounding the nanostructures (FIG. 11). With increase in the spacer layer thickness, a steep increase in the fluorescence enhancement efficacy of 800CW followed by relatively shallow reduction was observed (FIGS. 12 and 13). Atomic force microscopy (AFM) images depicted the morphology change of the plasmonic patch after the formation of polysiloxane layer, which further confirmed the uniform deposition of polymer spacer onto the AuNR (FIG. 14). Plasmonic patches with an optimal spacer layer thickness were tested herein.

Figure 15:
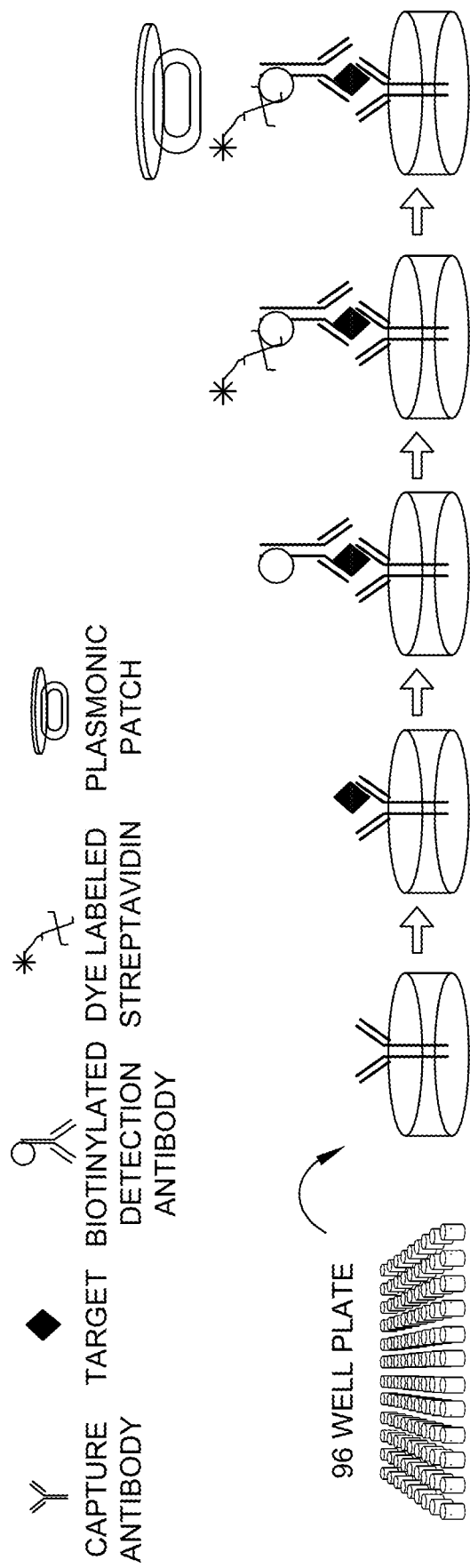
FIG. 15 is an exemplary embodiment of a schematic showing the concept of plasmonic patch enhanced fluoroimmunoassay implemented in a glass bottom 96-well plate, demonstrating the wide applicability of the plasmonic patch in accordance with the present disclosure.
Figure 20:
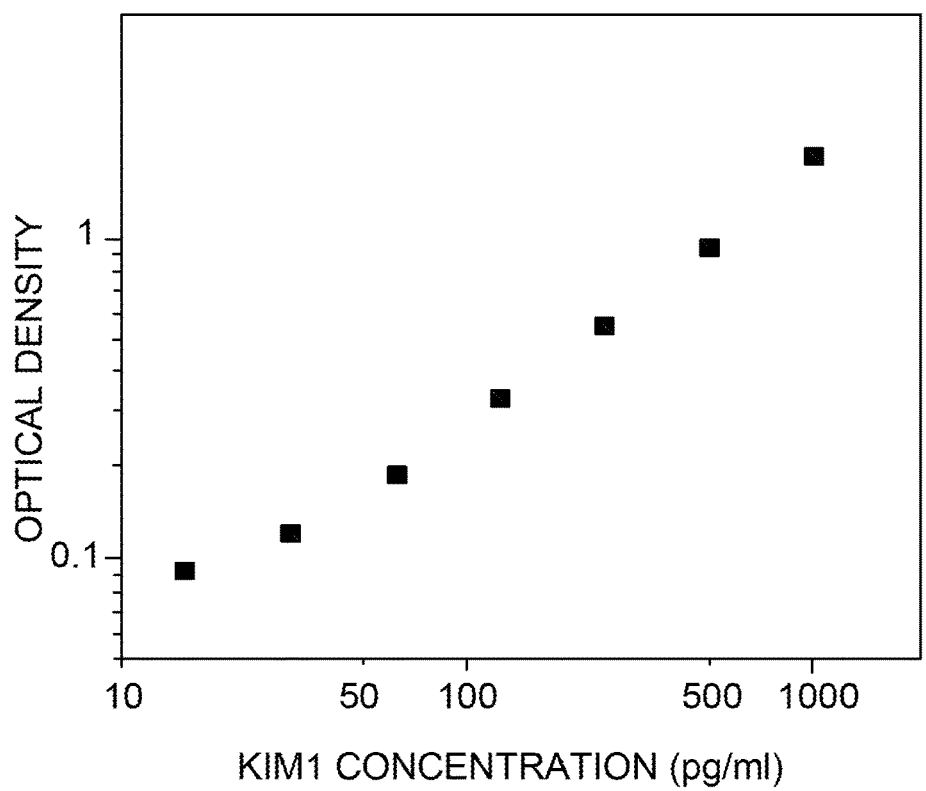
FIG. 20 is an exemplary embodiment of a KIM-1 concentration-response curve obtained by ELISA in accordance with the present disclosure. The LOD is determined to be 15.6 pg/ml.

Plasmonic patch enhanced fluoroimmunoassays. A typical sandwich fluoroimmuno-assay involves the following major steps (i) capture of the target antigen by an immobilized antibody; (ii) binding of the biotinylated detection antibody to the captured antigen; and (iii) binding of a fluorescently-labeled streptavidin (FIG. 15). To test the universality and ease of use of the plasmonic patch disclosed herein, a fluoroimmunoassay in a heterogeneous, solid phase format by using a 96-well microtiter plate was implemented. This is a standard assay format extensively employed in bioanalytical research and clinical diagnostics (FIG. 20).

Figure 17:
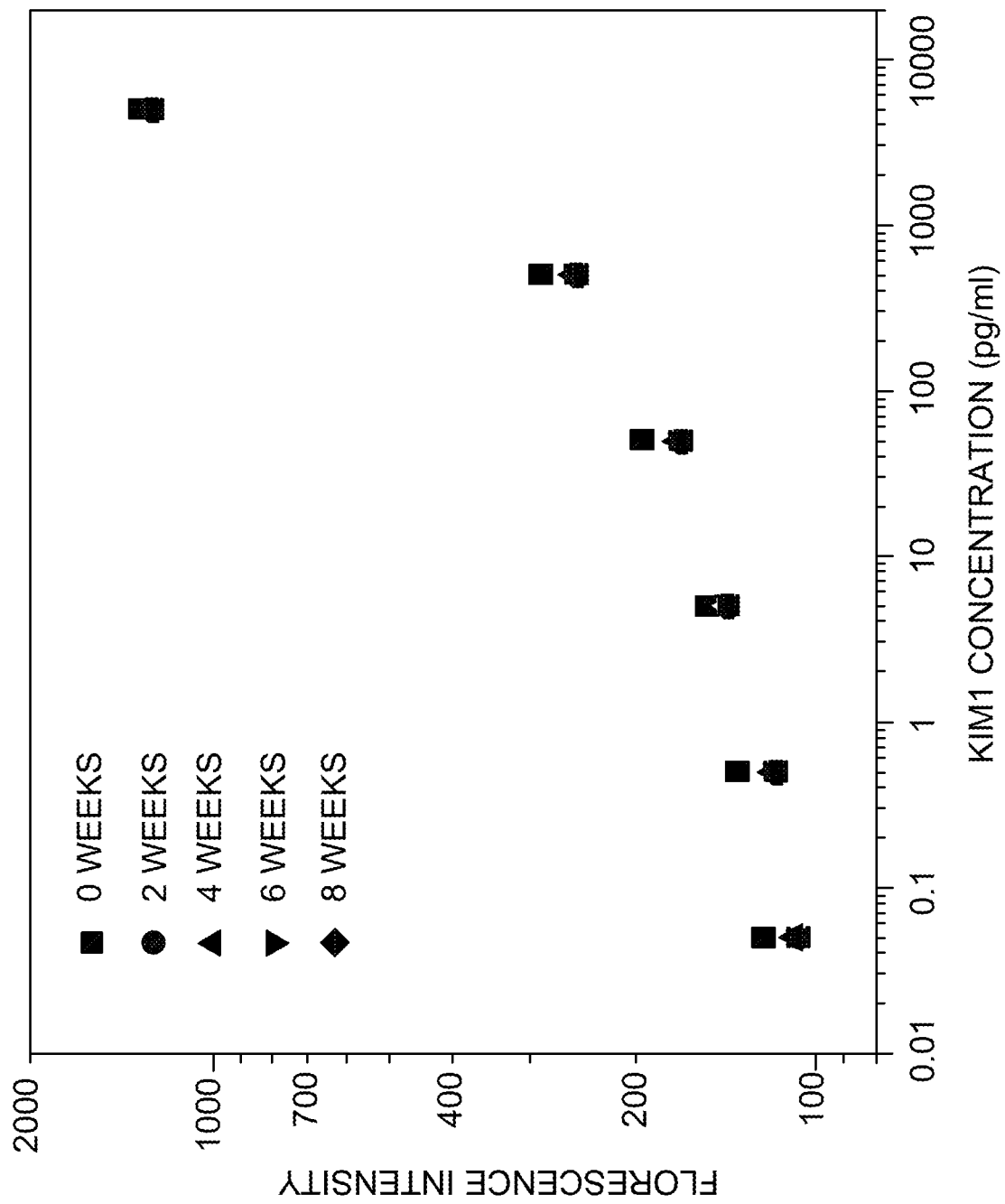
FIG. 17 is an exemplary embodiment of a fluorescence intensity of a plasmonic patch enhanced fluoroimmunoassay after being stored with the plasmonic patch for 2, 4, 6, and 8 weeks in accordance with the present disclosure. Unlike colorimetric ELISA that shows rapid degradation in the optical intensity, plasmonic patch-enhanced fluoroimmunoassay exhibits a stable signal with no compromise in the LOD for up to 8 weeks.
Figure 18A:
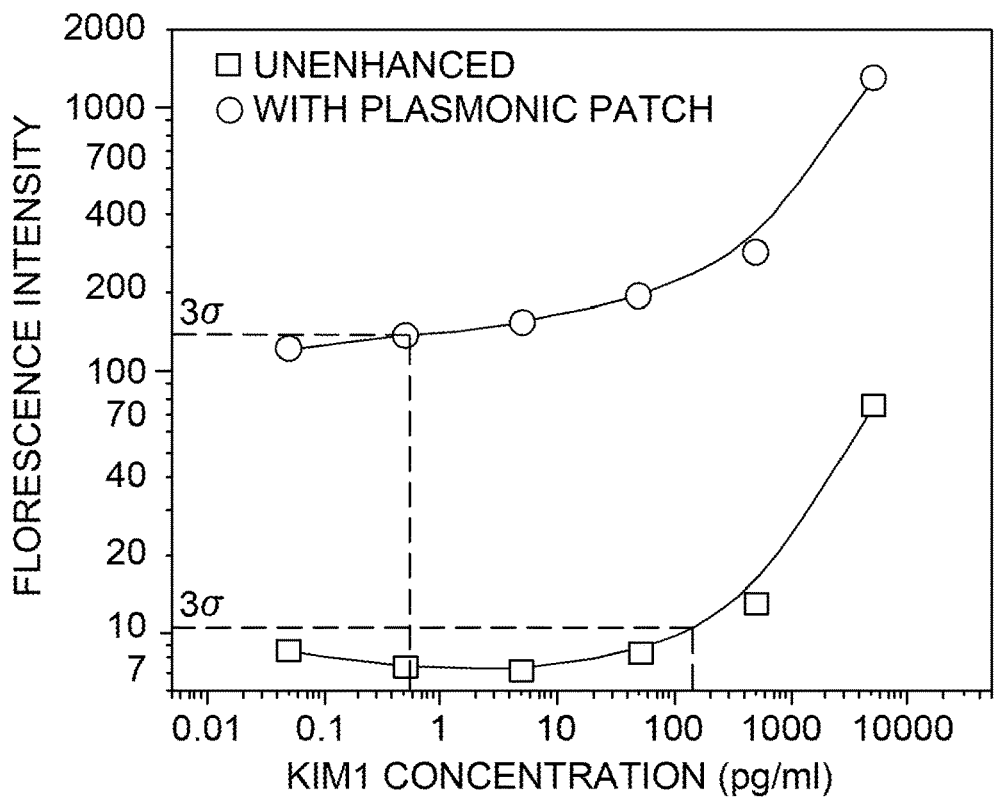
FIGS. 18A and 18B are exemplary embodiments of plots showing the fluorescence intensities corresponding to different concentrations of (18A) KIM-1 and (18B) NGAL in accordance with the present disclosure. The limits of detection identified in the plots show ~300-fold and ~100-fold improvement for KIM-1 and NGAL, respectively, compared to the unenhanced assay.
Figure 18B:
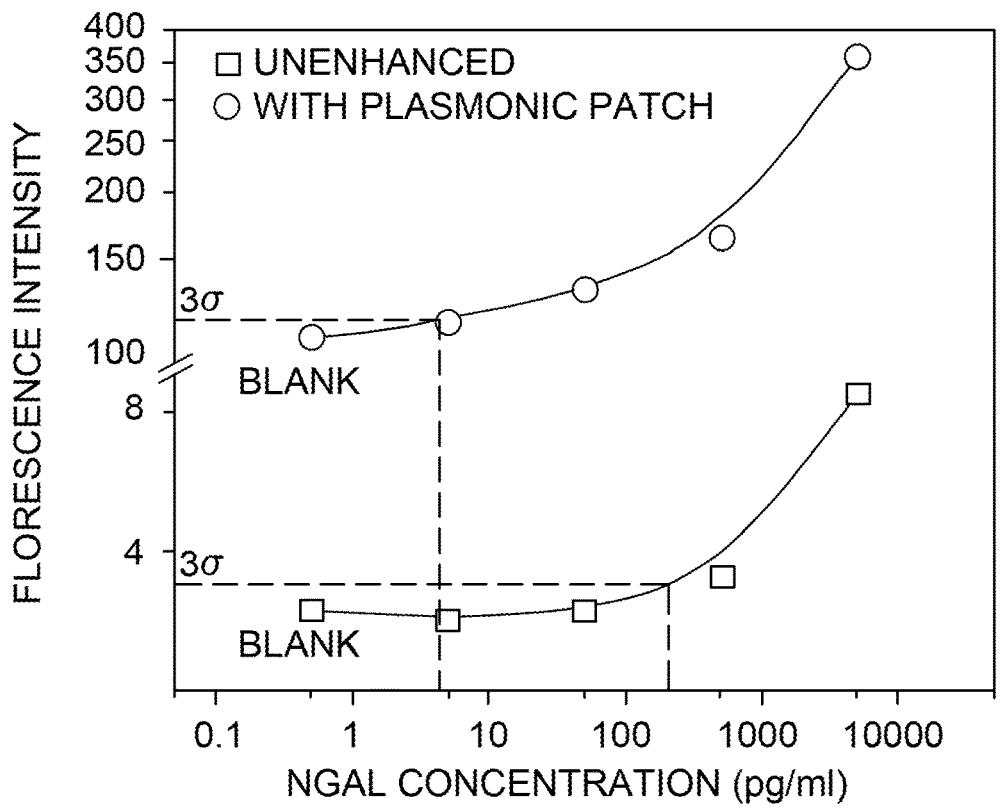
Figure 19A:
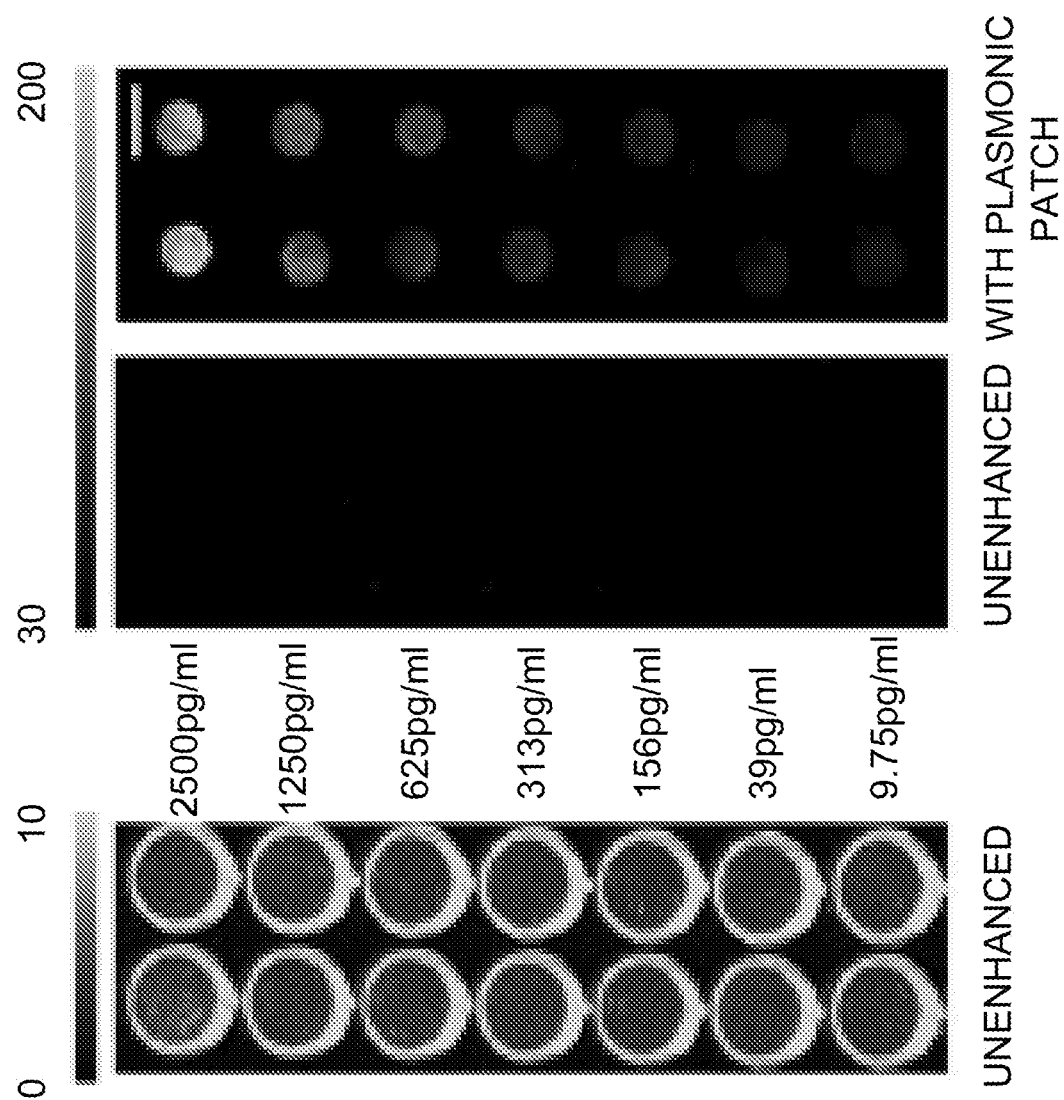
FIGS. 19A and 19B are exemplary embodiments of: (19A) fluorescence intensity maps of NGAL fluoroimmunoassay implemented on a common 96-well plate with a polystyrene bottom (left and middle images show the unenhanced assays which correspond to different color scales shown in the images, right image shows the plasmonic patch enhanced assay revealing a large enhancement in the fluorescence signal (scale bar represents 5 mm)); and, (19B) a plot showing the calibration curve for plasmonic patch enhanced fluoroimmunoassay implemented on 96-well plate with a polystyrene bottom in accordance with the present disclosure.
Figure 19B:
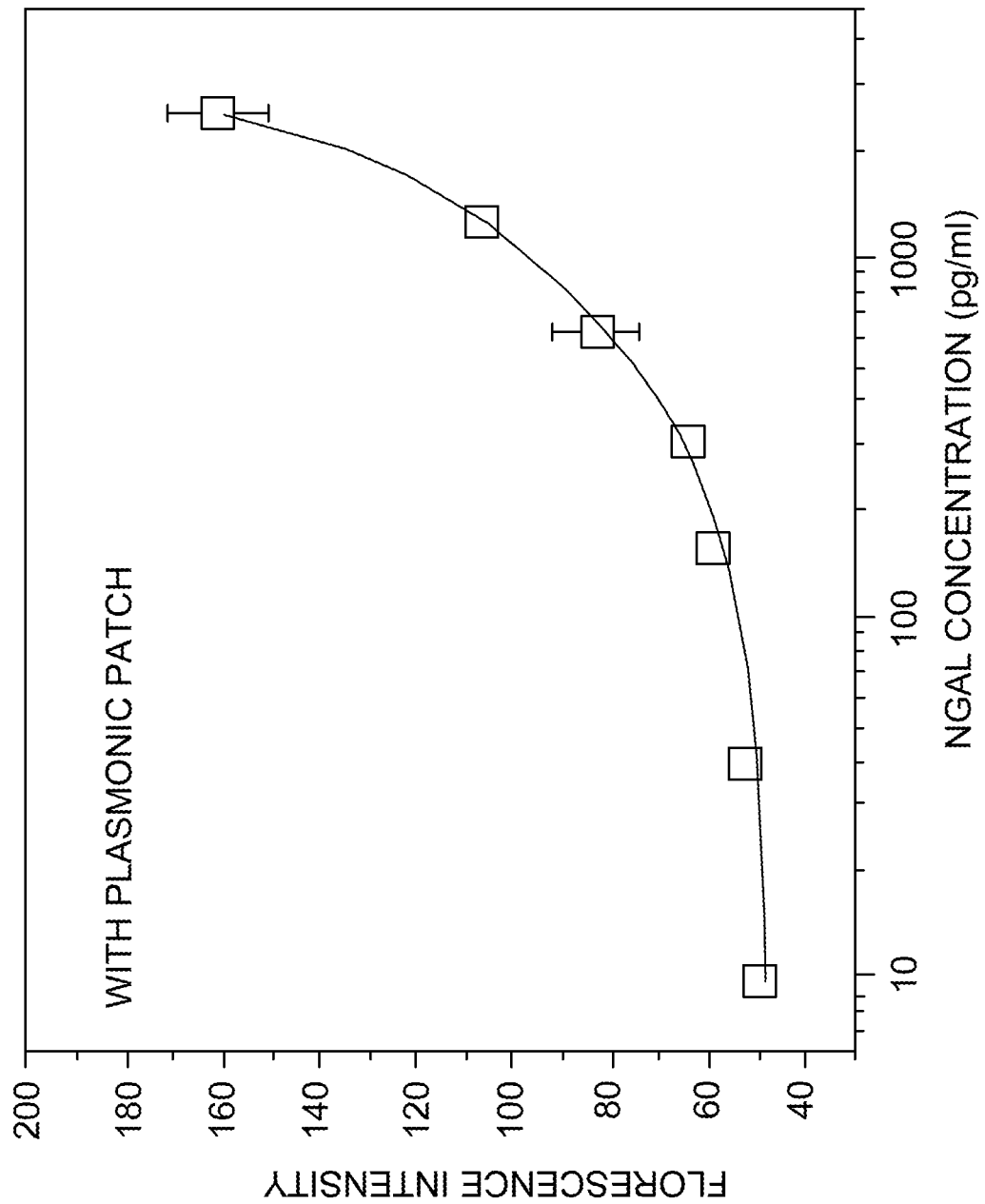

KIM-1 and NGAL Fluoroimmunoassay. Two early stage biomarkers for acute kidney injury (AKI) and chronic kidney disease (CKD) were examined, kidney injury molecule-1 (KIM-1) and neutrophil gelatinase-associated lipocalin (NGAL), as representative examples for probing the efficacy of the plasmonic patch in improving bioanalytical parameters of fluoroimmunoassays. The assays were implemented on a 96-well plate with a glass bottom. In the KIM-1 immunoassay, LT680 was the fluorescence tag, and the plasmonic patch comprised AuNR-670. To probe the enhancement in sensitivity and LOD, serial dilutions of KIM-1 of known concentrations (5 ng/mL to 500 fg/ml) in phosphate buffered saline (PBS) with 1% bovine serum albumin (BSA) were employed as standards. Fluorescence images obtained after applying the plasmonic patch revealed a large enhancement in fluorescent intensity compared to that obtained before applying the plasmonic patch (FIG. 16). The fluorescence signal from the unenhanced (pristine) spots was detectable only for the two highest concentrations (5 and 0.5 ng/ml) (FIG. 16, left and middle images). On the other hand, fluorescence signal with plasmonic patch could be detected down to 500 fg/mL (FIG. 16). The concentration-response plot revealed a 36-fold enhancement in the fluorescence intensity with plasmonic patch compared to the unenhanced signal (FIG. 16). The LOD ($3\sigma$) of the unenhanced and plasmon-enhanced KIM-1 assays were determined to be 140 pg/mL and 0.5 pg/mL, respectively, which represents a 280-fold improvement in the LOD. Consequently, the enhanced KIM-1 assay exhibited three orders of magnitude higher dynamic range compared to the unenhanced assay. The fluorescence signal after application of plasmonic patch exhibited excellent stability even after eight weeks storage in the dark (FIG. 17). To demonstrate the broad applicability of plasmon-enhanced fluoroimmunoassay, NGAL was tested as another representative example. 800CW (conjugated to streptavidin) was the fluorescence label to demonstrate the tunability of the plasmonic patch. Following the transfer of the plasmonic patch, a fluorescence enhancement up to 103 times and a ~100-fold lower LOD compared to the unenhanced NGAL assay was observed (FIG. 18). Consistently, the NGAL assay implemented on common 96-well plate with a plastic bottom (instead of glass bottom) also exhibited large fluorescence enhancement in the presence of plasmonic patch (FIG. 19), which further validates the plasmonic patch as a substrate material-agnostic technology.

Enzyme-linked immunosorbent assay (ELISA) is widely employed in clinical and research settings and often considered a "gold standard" for protein biomarker detection and quantification. The performance of the plasmon-enhanced fluoroimmunoassay with ELISA using KIM-1 as a representative biomarker was tested. The LLOD of plasmon-enhanced fluoroimmunoassay was found to be ~30-fold lower (0.5 pg/ml) compared to that of ELISA (15.6 pg/ml) (FIGS. 16 and 20). Notably, the dynamic range of the enhanced fluoroimmunoassay spanned five log orders of KIM-1 concentration, while the dynamic range of ELISA was only 2.5 log orders of KIM-1 concentration (FIGS. 16 and 20). The higher dynamic range of the enhanced fluoroimmunoassay is expected to enable the quantification of a wider range of biomarker concentrations in human urine samples as described below.

Figure 21A:
FIGS. 21A and 21B are exemplary embodiments of fluorescence intensity maps of: (21A) KIM1 (10-fold dilution); and, (21B) NGAL (40-fold dilution) immunoassay for urine samples from eight patients and three self-described healthy volunteers in accordance with the present disclosure. Top: Unenhanced fluorescence map. Bottom: Plasmonic patch enhanced fluorescence map. Scale bar=5 mm.
Figure 21B:
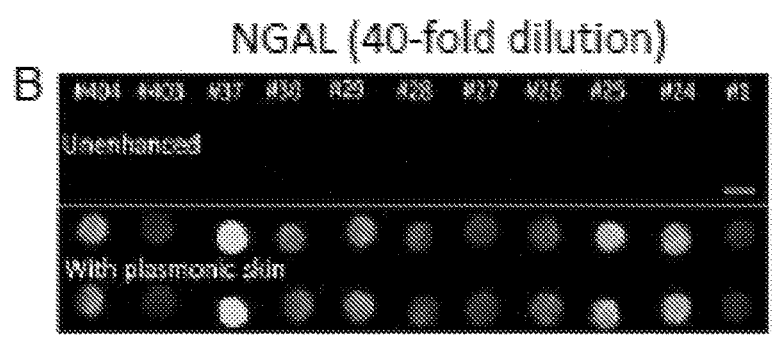
Figure 22A:
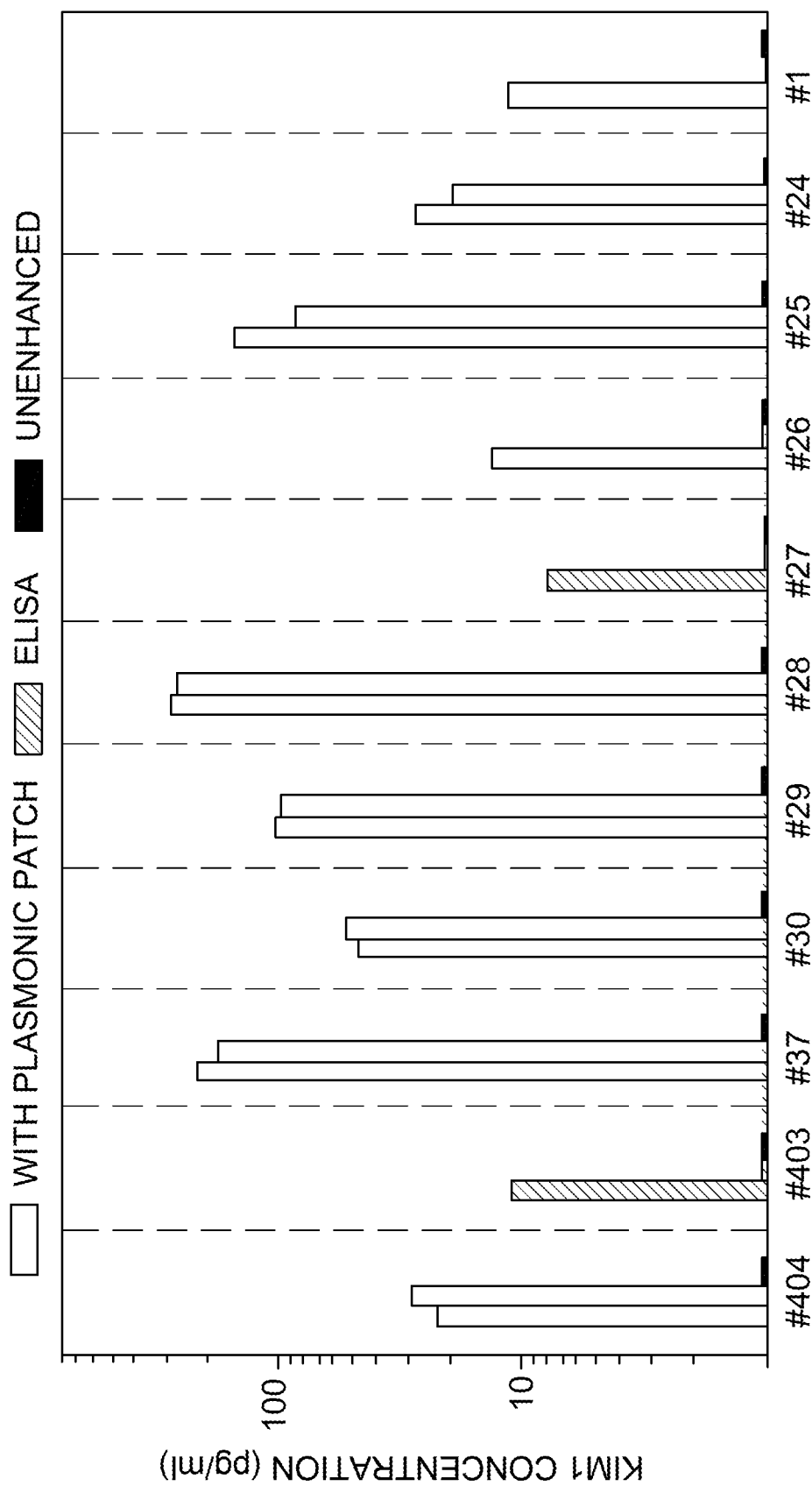
FIG. 22 depicts exemplary embodiments of graphs of the KIM-1 (22A) and NGAL (22B_concentrations in the urine samples (diluted 10-fold for KIM-1 and 40-fold for NGAL) as determined by unenhanced fluorescence assay, plasmon-enhanced fluorescence assay, and ELISA in accordance with the present disclosure.
Figure 22B:
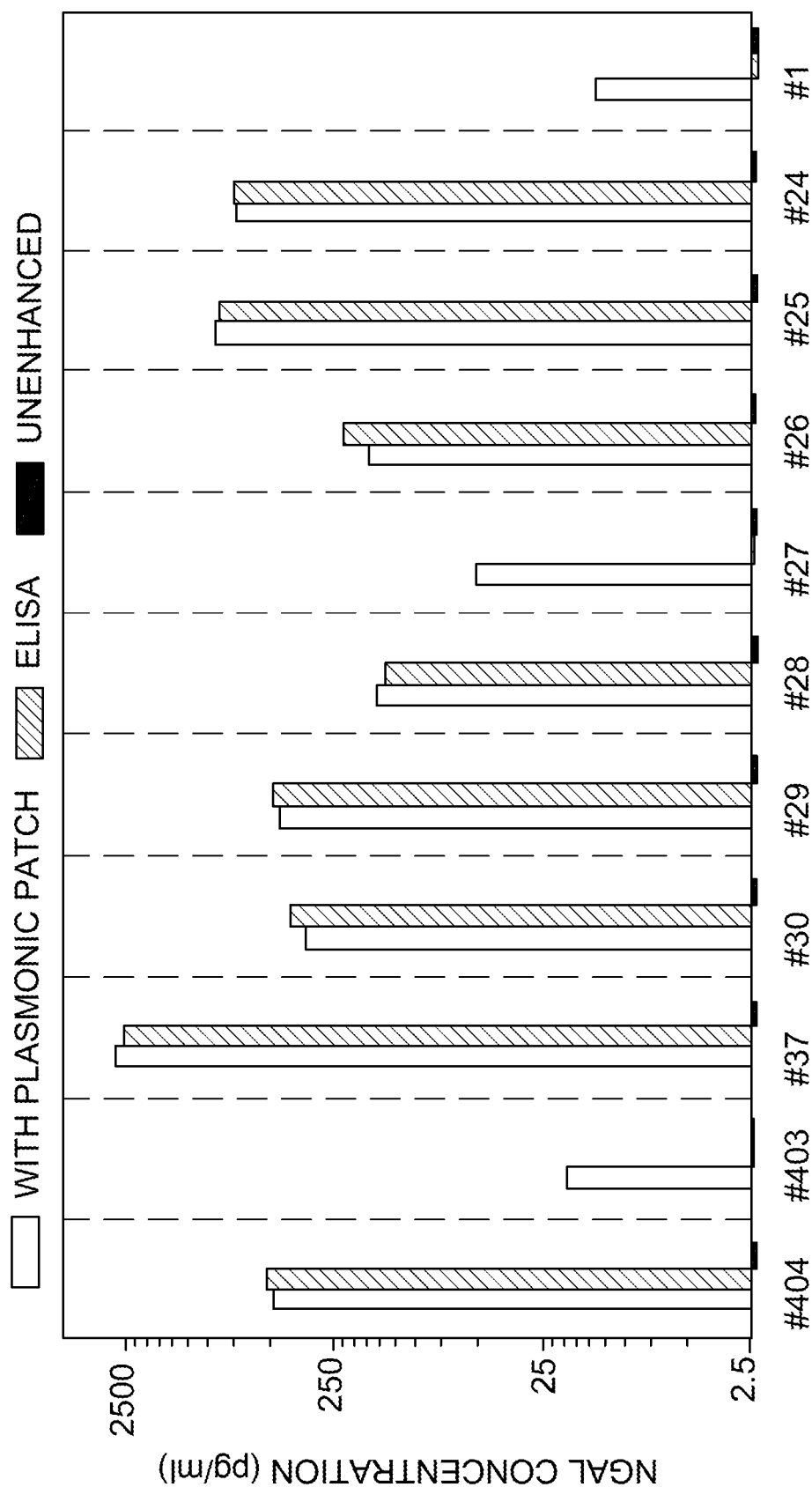
Figure 23A:
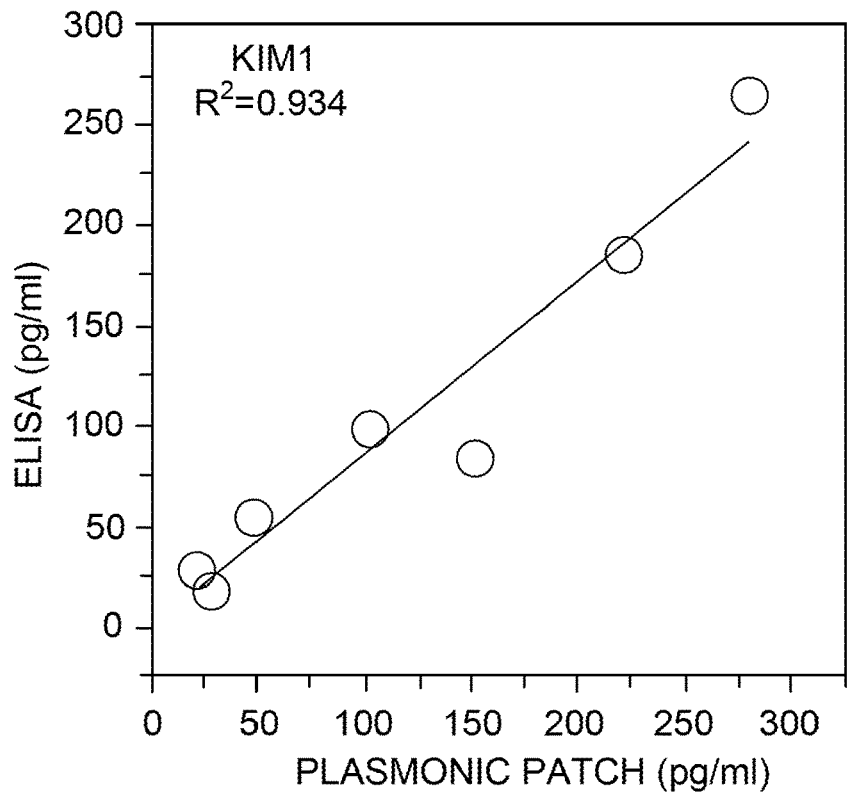
FIG. 23 depicts exemplary embodiments of graphs showing the correlation between the concentration of (23A) KIM-1 and (23B) NGAL determined using ELISA and plasmonic patch enhanced fluorescence assay in accordance with the present disclosure.
Figure 23B:
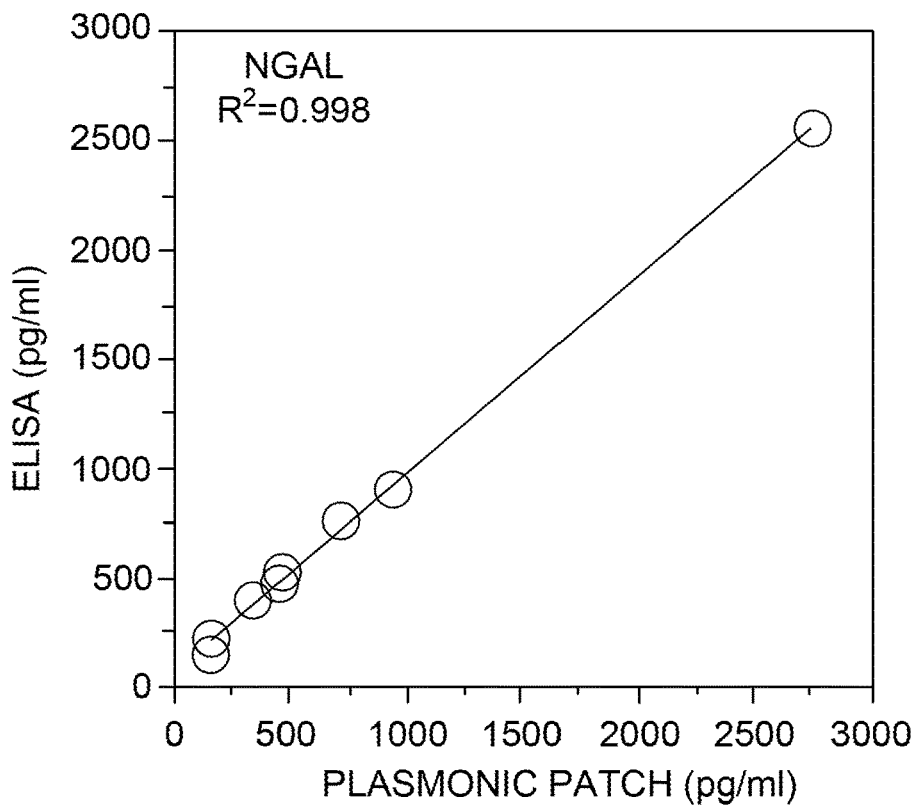

Following the successful demonstration of the plasmonic patch enhanced fluoroimmunoassay, urine samples from patients and self-described healthy volunteers were analyzed to determine the concentrations of KIM-1 and NGAL. In order to demonstrate the wide applicability of the technique, both glass (KIM-1) and plastic (NGAL) bottom 96-well plates were used. The urine samples were diluted with 1% BSA in PBS to minimize confounding from inter-individual differences in urine pH and solute content. For KIM-1 (10-fold dilution) and NGAL (40-fold dilution), the plasmon-enhanced fluoroimmunoassay exhibited a dramatic increase in the fluorescence compared to the unenhanced fluoroimmunoassay (FIG. 21 (KIM-1) and (NGAL)). The enhanced fluorescence signal was employed to quantify the biomarker concentration in the urine samples. Standard ELISA was also used to determine KIM-1 and NGAL concentrations in the human urine samples. The concentration of the biomarker in urine determined by the above three assays (unenhanced and enhanced fluoroimmunoassays, and ELISA) is compared in FIG. 22. The unenhanced fluoroimmunoassay was not able to detect KIM-1 (FIG. 22A) or NGAL (FIG. 22B) in any of the human urine samples. In stark contrast, plasmon-enhanced fluoroimmunoassay was able to quantify both KIM-1 and NGAL concentrations in all human urine samples, some of which were even lower than the LOD of ELISA. For the samples that were quantifiable using both ELISA and enhanced fluoroimmunoassay, the concentration of the biomarker determined using the enhanced fluoroimmunoassay showed excellent agreement with that determined using "gold standard" ELISA for both KIM-1 ($r^2$=0.934) and NGAL ($r^2$=0.998) (FIGS. 23A and 23B).

Biomarker concentrations in the human urine samples were determined by accounting for the dilutions in each of the assays, and the results are tabulated in Table 1. The standard metric of kidney function is the estimated Glomerular Filtration Rate (eGFR), determined from serum creatinine concentration. eGFR decreases below 90 (mL/min) as the kidney function declines. The two urine biomarkers can provide diagnostic kidney disease information beyond that of eGFR. NGAL and KIM-1 concentrations in healthy humans are <20 ng/mL and <1 ng/mL, respectively. In acute kidney injury, NGAL exceeds 100 ng/mL. Taking patient #24 and #37 as examples, while their eGFR levels (153 mL/min and 90 mL/min) are within the normal range, NGAL and KIM-1 concentrations were significantly higher, indicating a high risk of chronic kidney disease (#24) and acute kidney injury (#37). Notably, for diabetics, their eGFR levels tend to increase to 150 mL/min followed by a significant decrease (down to 30 mL/min) with time. The higher eGFR of patient #24 and #37 and slightly elevated KIM-1 and NGAL concentrations may be due to the patient being diabetic, which is a risk factor for chronic kidney disease (Table 1).

TABLE 1

| Patient # | Age | Sex | Diabetes | eGFR | KIM-1 | NGAL |
|---|---|---|---|---|---|---|
| 1 | 26 | F | − | — | 118 | 0.56 |
| 24 | 31 | F | + | 153 | 280 | 29.30 |
| 25 | 61 | M | + | 87 | 1520 | 38.00 |
| 26 | 80 | M | − | — | 136 | 6.80 |
| 27 | 65 | M | − | 131 | 80 | 2.10 |
| 28 | 52 | F | + | — | 2800 | 6.40 |
| 29 | 66 | F | + | 66 | 1030 | 18.30 |
| 30 | 59 | M | − | 76 | 480 | 13.70 |
| 37 | 68 | F | + | 90 | 2220 | 110.00 |
| 403 | 63 | M | − | — | 110 | 0.78 |
| 404 | 56 | F | − | — | 220 | 18.81 |

Figure 24:
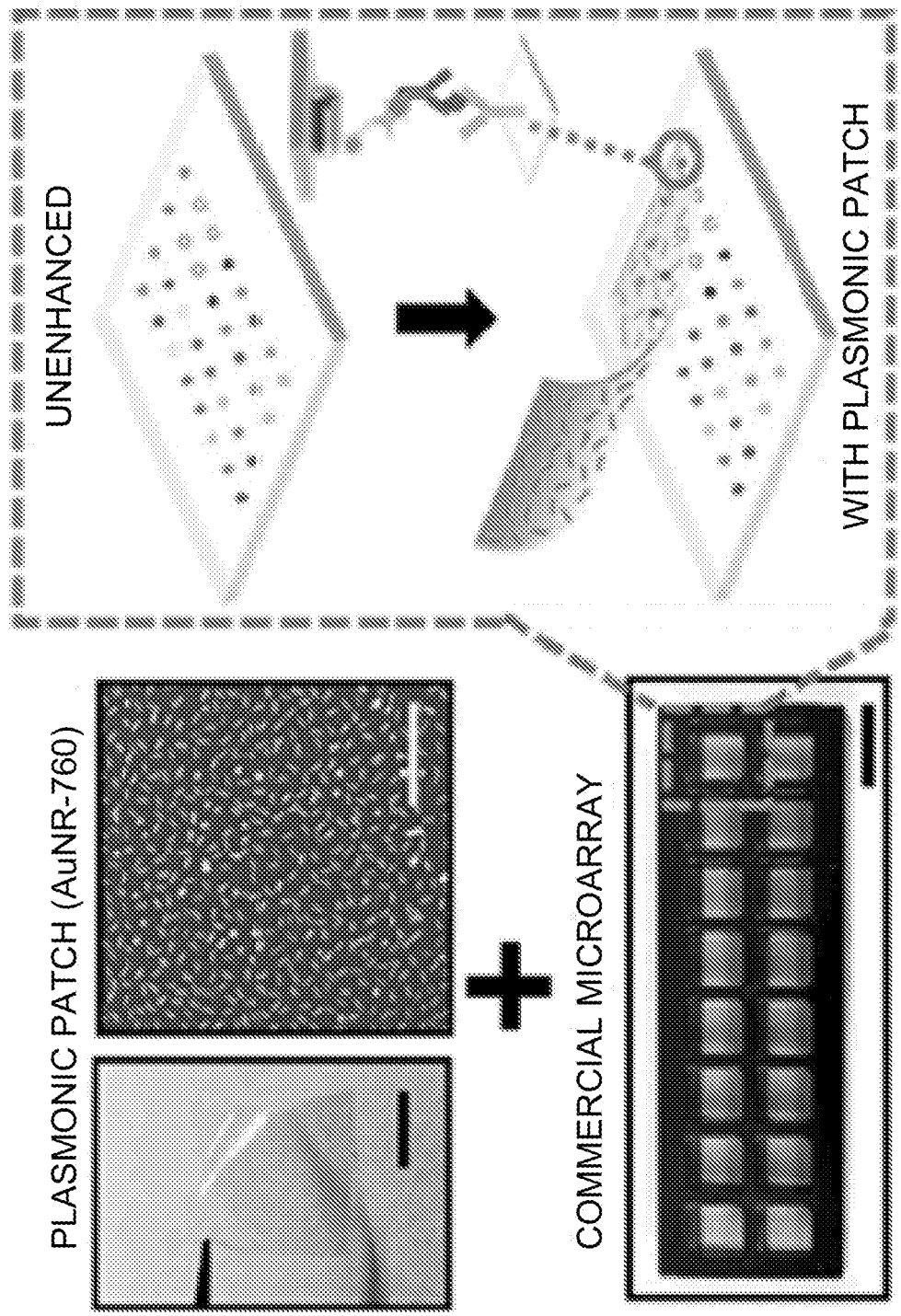
FIG. 24 illustrates an exemplary embodiment of an application of plasmonic patch to enhance the bioanalytical parameters of a protein microarray in accordance with the present disclosure. Left: Photograph depicting the plasmonic patch employed for enhancing the fluorescence of protein microarray (scale bar represents 5 mm), SEM image demonstrating the uniform absorption of AuNR-760 on the PDMS surface (scale bar represents 500 nm), and photograph of commercial protein microarray substrate with 16 sub-wells for simultaneous analysis of multiple samples (scale bar represents 1 cm). Right: Schematic showing the concept of plasmonic patch enhanced microarray, which enables a highly sensitive profiling of eight AKI and CKD biomarkers, simultaneously.
Figure 25:
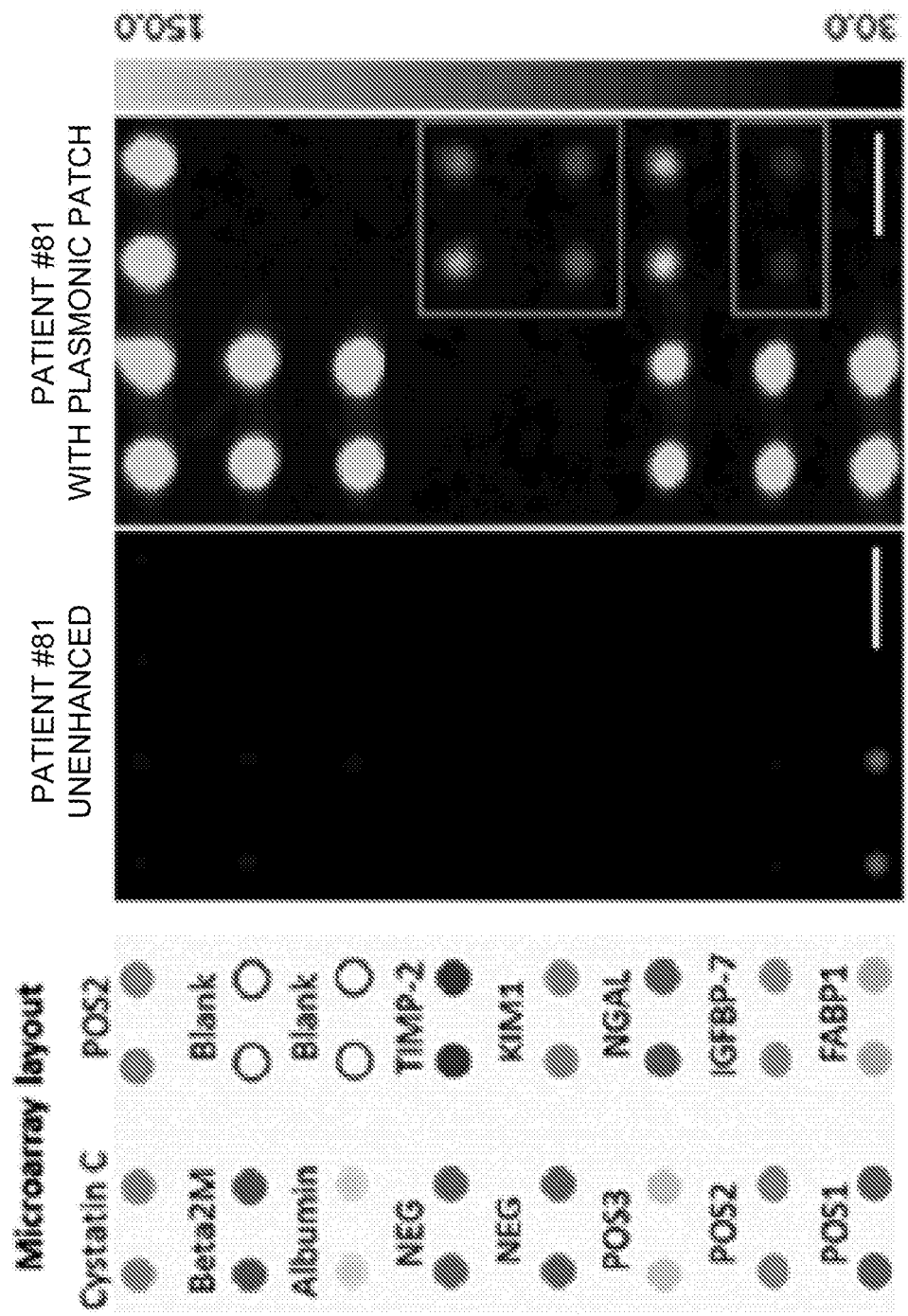
FIG. 25 depicts exemplary embodiments of three schematics illustrating the layout of antibodies printed on the bottom of each sub-well (left), the unenhanced fluorescence intensity map representing the AKI and CKD protein biomarker profile of patient #81 (middle), and a fluorescence map generated after the application of plasmonic patch (scale bar represents 400 μm) (right) in accordance with the present disclosure.

Application of plasmonic patch on a protein microarray. To demonstrate applicability of the plasmonic patch in enhancing the sensitivity of immuno-microarrays, a microarray of antibodies of biomarkers for kidney injury were tested to assess the performance of plasmonic patch in a multiplexed, high throughput biosensing platform (FIG. 24). This microarray comprised eight capture antibodies corresponding to AKI and CKD protein biomarkers, printed in duplicates on a glass slide isolated by a plastic frame, with a feature diameter of 150 μm. Biotinylated IgGs of three gradient concentrations were printed in duplicates as positive controls (FIG. 25, left schematic showing the protein layout on the microarray). Six human urine samples were diluted 2-fold using blocking buffer and added to each sub-well on the slide. The captured biomarker proteins were exposed to a biotinylated detection antibody cocktail followed by exposure to 800CW-labeled streptavidin. A conventional microarray procedure ends here by analyzing the localized fluorescent signal on the respective antibody spot. The enhanced assay demonstrated here involves the addition of a 1×1 $cm^2$ plasmonic patch modified with AuNR-760 on top of each array.

Figure 26:
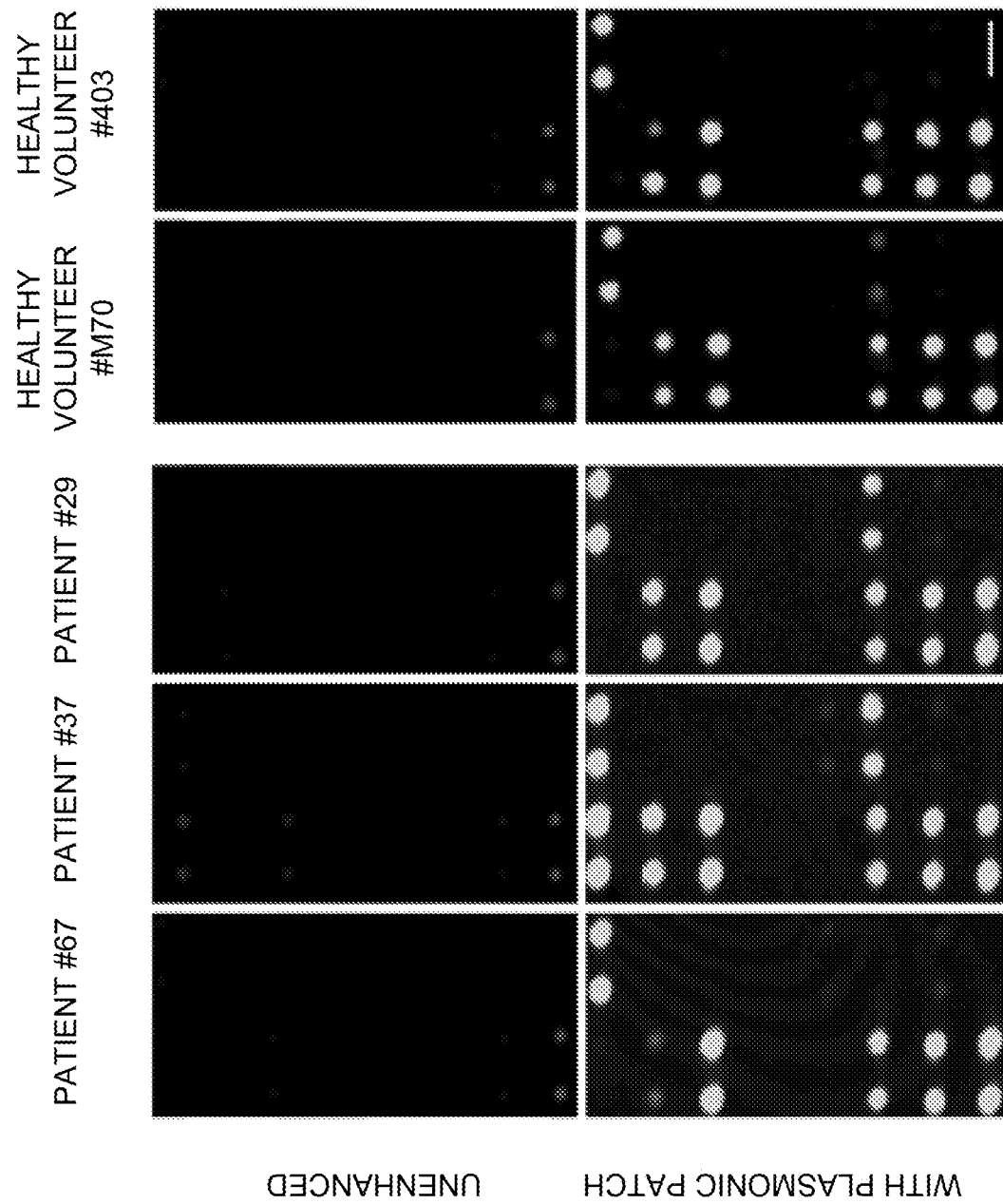
FIG. 26 is an exemplary embodiment of an unenhanced (top) and plasmonic patch enhanced (bottom) fluorescence intensity maps representing the kidney disease biomarker profile of patients and healthy volunteers (scale bar=400 μm) in accordance with the present disclosure.
Figure 27:
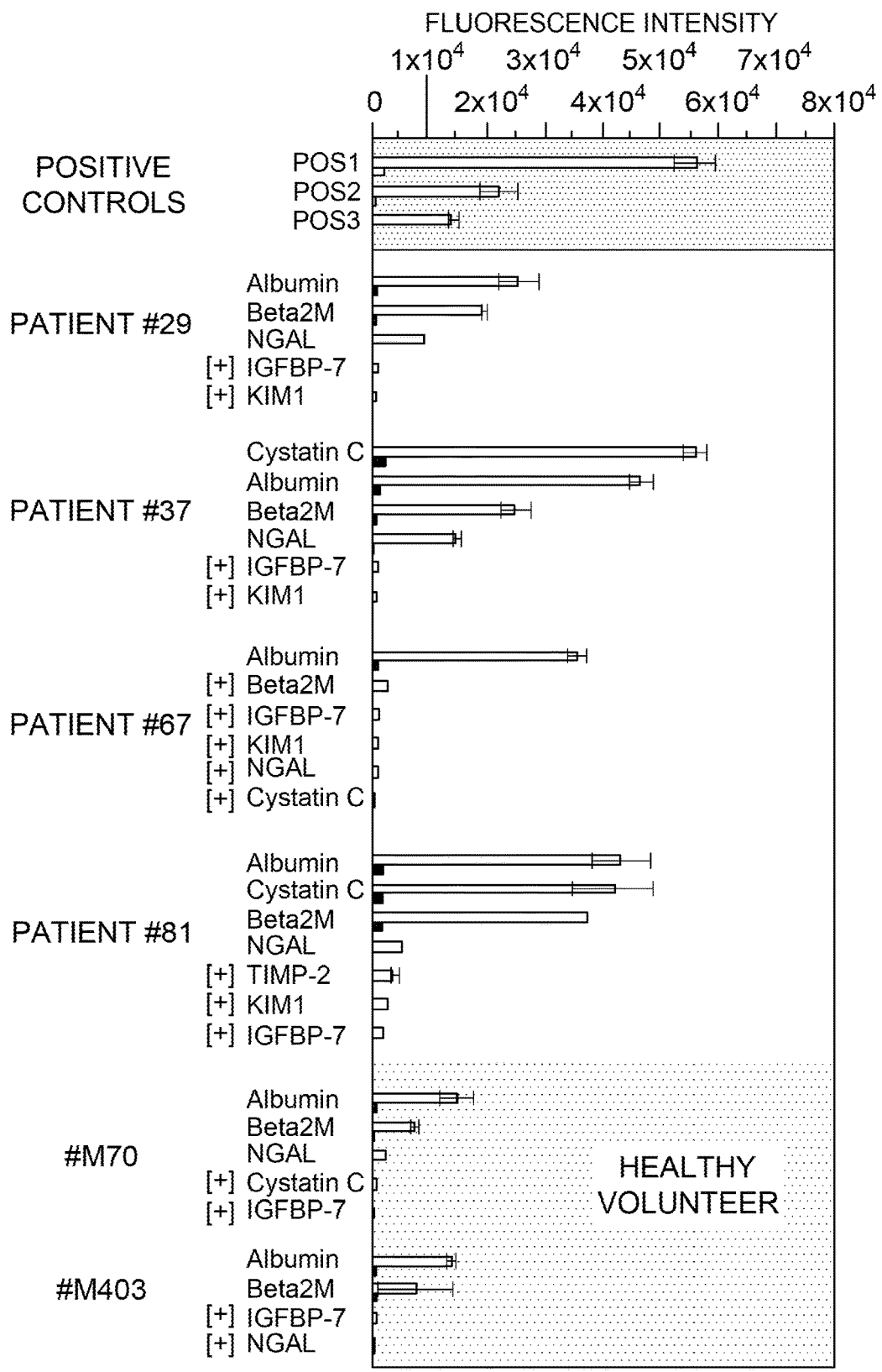
FIG. 27 depicts exemplary embodiments of quantitative measurements of fluorescence intensity corresponding to the concentrations of various biomarkers in the urine samples of four patients and two self-described healthy volunteers in accordance with the present disclosure. The [+] indicates biomarker detected only after the application of the plasmonic patch. POS spots in the microarray represent three distinct Positive Control Signal intensities (POS1>POS2>POS3) of a biomarker unrelated to kidney disease.
Figure 28:
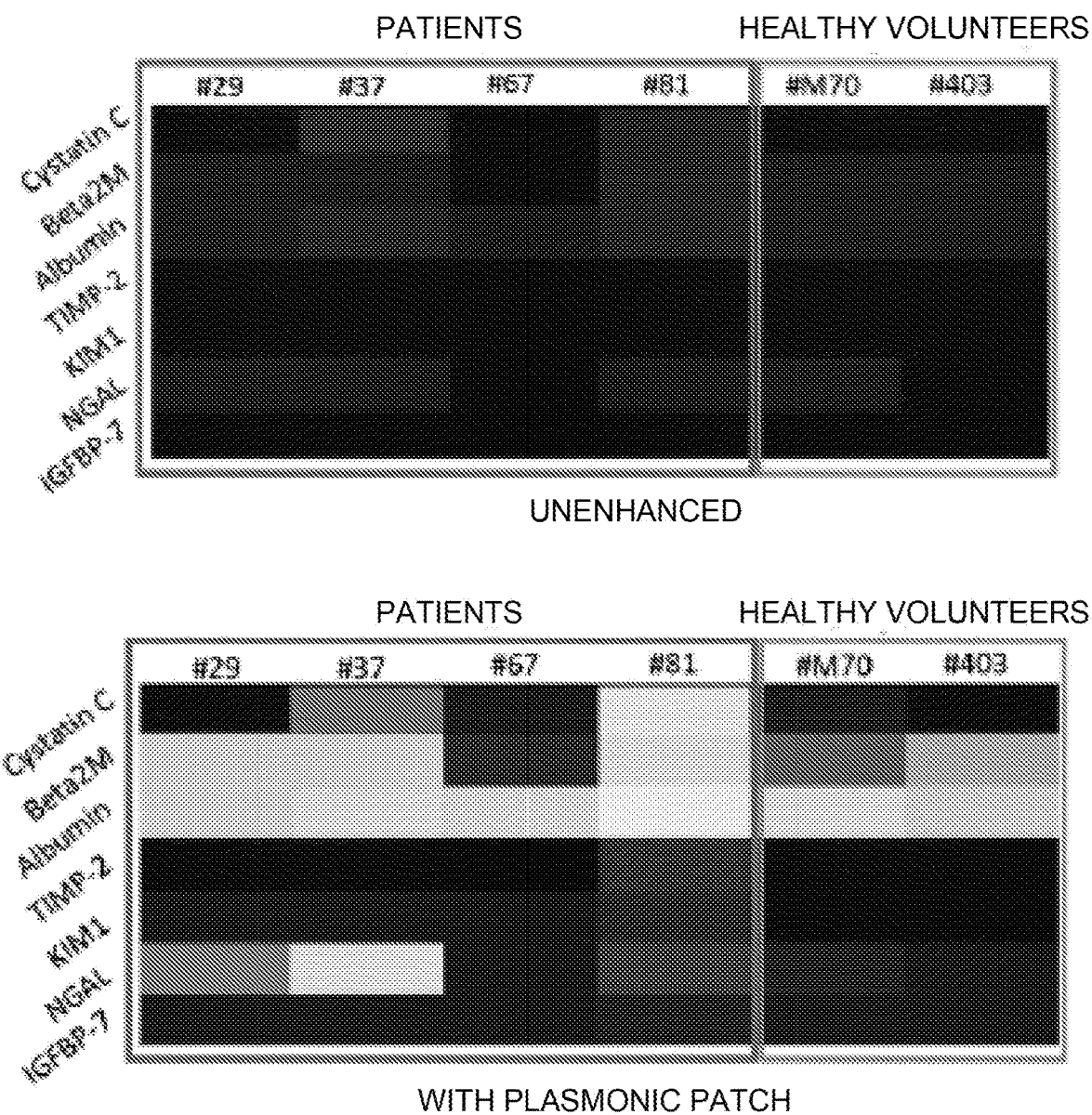
FIG. 28 depicts an exemplary embodiment of a fluorescence intensity heat map corresponding to the concentrations of kidney diseases biomarkers in the urine samples of four patients and two healthy volunteers before (top) and after (bottom) applying the plasmonic patch in accordance with the present disclosure.

The fluorescence map from a single sample (patient #81, FIG. 25, right panels) is informative. Apart from large enhancement of the weak fluorescence of albumin, cystatin C, β2 microglobulin (Beta 2M), and NGAL in the unenhanced microarray, the plasmonic patch enabled the detection and quantification of analytes that were not detected by the conventional method (gray boxes in FIG. 25). These new analytes are tissue inhibitor of metalloproteinases 2 (TIMP-2), KIM-1, and insulin-like growth factor-binding protein 7 (IGFBP-7), which are specific and important biomarkers for early detection of acute kidney injury. In all samples tested, the plasmonic patch enhanced the fluorescence signals of the microarray exposed to urine samples (FIG. 26). Quantitative measurement of antibody spot intensity from the urine of six individuals showed 20 to 137-fold increase in the fluorescence of several analytes, and the ability to detect other analytes only with the enhancement from plasmonic patch (FIG. 27, [+] mark indicating biomarker only detected with plasmonic patch). Comparison between the unenhanced and plasmonic patch enhanced fluorescence heat maps from the six donors further revealed the high signal-to-noise ratio and a broadened dynamic range (FIG. 28).

cTnI Fluoroimmunoassay. The fluoroimmunoassay was implemented using 96-well plates having a plastic bottom.

Briefly, 100 μL of standard solutions with different cTnI concentrations or patient samples were first added into appropriate wells. The plate was sealed and gently shaken for 2.5 hours at room temperature. The solution was discarded, and the wells were washed 4 times with washing solution. Subsequently, 100 μL of biotinylated antibody solution (according to vendor's protocol) was added into each well and incubated for 1 hour at room temperature. Next, 100 μL of dye-labeled (800CW) streptavidin (50 ng/mL) was added to each well followed by 30 min incubation. Finally, the plasmonic patch was transferred onto each well of the 96-well plate, followed by the addition of a reflective layer on the top. A LICOR Odyssey CLx scanner was used to scan the 96-well plate.

Figure 29A:
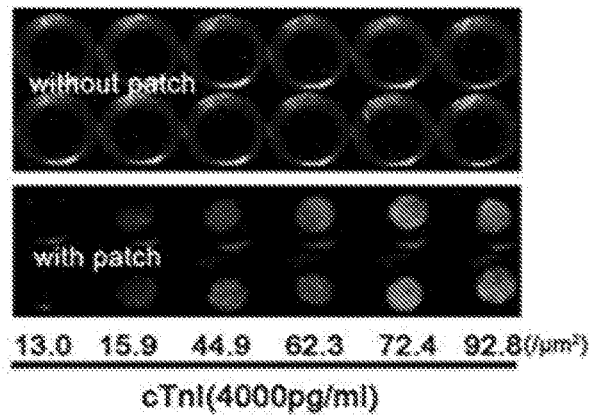
FIGS. 29A to 29D depict (29A) fluorescence maps obtained from sandwich assay wells (cTnI concentration of 4000 pg/mL) without and with patch showing a progressive increase in the fluorescence intensity with increasing AuNR-758 density (29B) Plot showing the fluorescence enhancement factor of plasmonic patches described in (29B). (29C) Fluorescence map (top) and intensity (bottom) of cTnI fluoroimmunoassay on 96-well plate without plasmonic patch. (29D) Fluorescence map (top) and intensity (bottom) of cTnI fluoroimmunoassay on 96-well plate with plasmonic patch, showing a limit-of-detection of 30 pg/mL.
Figure 29B:
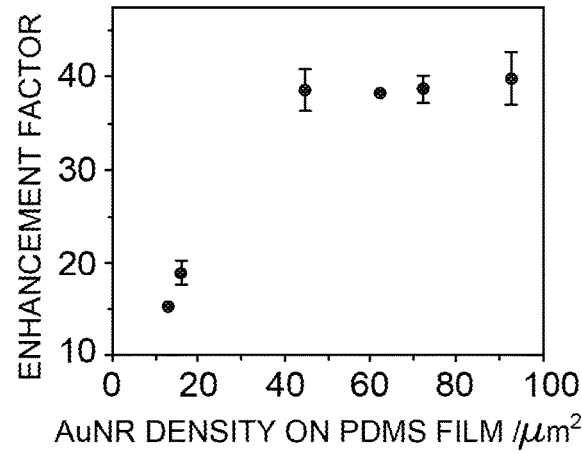
Figure 29C:
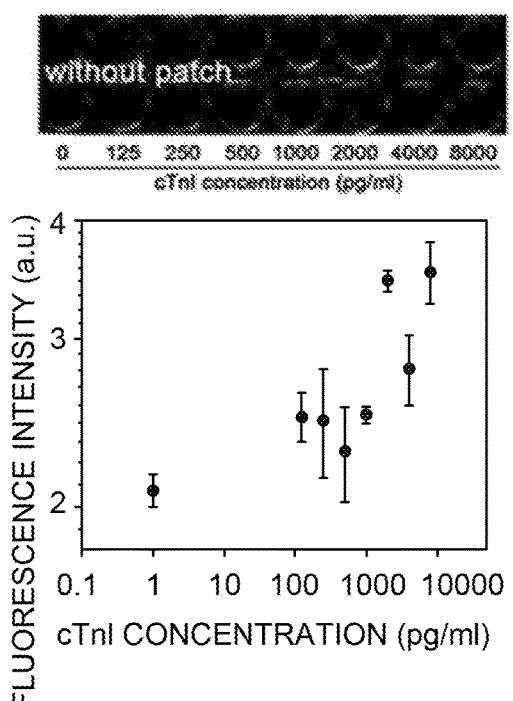
Figure 29D:
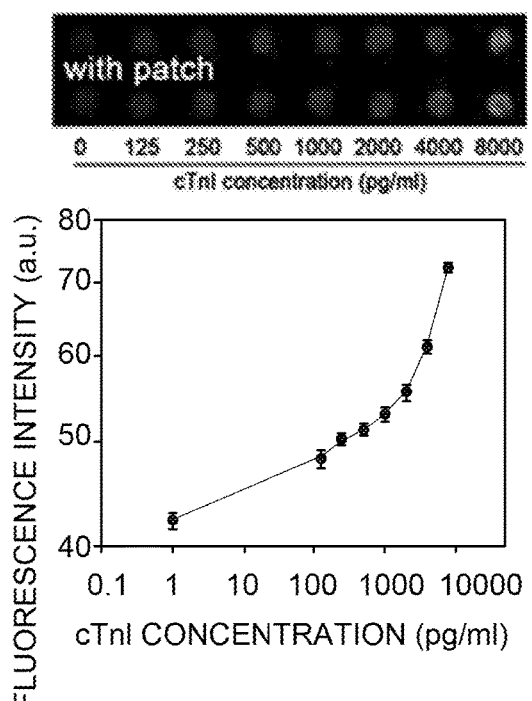

As shown in FIGS. 29A to 29D, the use of the plasmonic patch greatly enhanced the fluorescent signal exhibited by 800CW. In the top half of FIG. 29A, no detectable signal is observed without the plasmonic patch while a greatly enhanced signal is seen in the lower half of FIG. 29A. FIG. 29B illustrates the effect of nanostructure density on the signal enhancement. FIGS. 29C and 29D illustrate that the sensitivity is greatly enhanced to at least as low as 1 pg/mL.

Figure 33A:
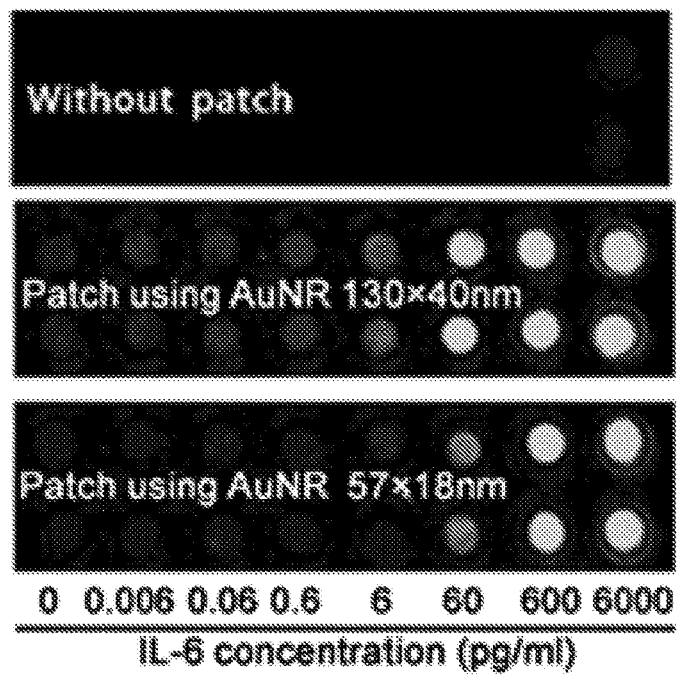
FIGS. 33A and 33B depict (33A) the fluorescence signal of a conventional IL-6 (from 6 fg/mL to 6 ng/mL) fluoroimmunoassay (top) and an exemplary embodiment of the plasmonic patch enhanced IL-6 fluoroimmunoassay (middle: AuNR 130 nm; Bottom: AuNR 57 nm). (33B) Plot showing the fluorescence intensity at different analyte concentration. The limit-of-detection of plasmonic patch enhanced fluoroimmunoassay using AuNR-130 nm is calculated to be 0.01 pg/mL, which is 200-fold lower compared to AuNR-57 nm (2 pg/mL).
Figure 33B:
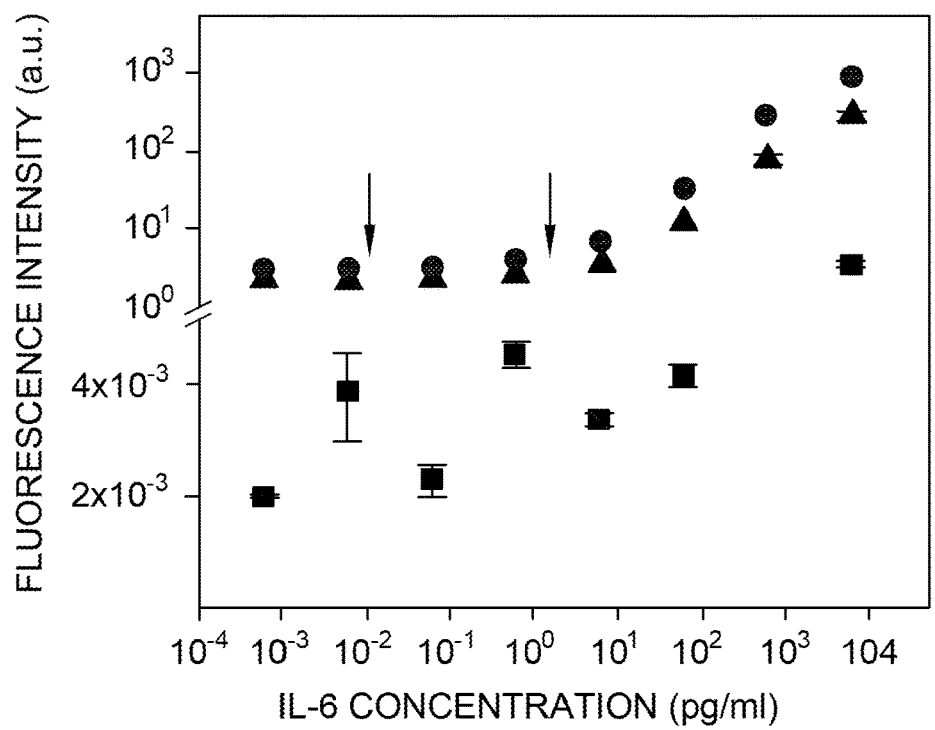

IL-6 Fluoroimmunoassay. Using a modification of the fluoroimmunoassays described above, an IL-6 fluoroimmunoassay was done to determine the LLOD and amount of enhancement of the fluorescent signal generated therein. As shown in FIGS. 33A and 33B, the lower limit of detection was determined to be about 333-fold lower than the same assay without the use of the plasmonic patch. Concentrations as low as 0.006 pg/mL were detected and quantified where the LLOD of this assay when conducted without a plasmonic patch is approximately 2.0 pg/mL.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A plasmonic patch for enhancing a fluorescent signal from a fluorescent species, the patch comprising:
    a flexible substrate comprising a first material,
    a plasmonic nanostructure, and
    a spacer comprising a second material;
    wherein the plasmonic nanostructure is disposed on a first surface of the flexible substrate,
    the spacer is disposed on the first surface of the flexible substrate and covers the plasmonic nanostructure;
    the fluorescent species has an excitation wavelength ($\lambda_{ex}$) and an emission wavelength ($\lambda_{em}$),
    the plasmonic nanostructure has a localized surface plasmon resonance (LSPR) wavelength ($\lambda_{LSPR}$),
    a difference between the LSPR wavelength and the excitation wavelength is $|\Delta\lambda|$; and
    a density of the nanostructures on the flexible substrate is from $1/\mu m^2$ to $200/\mu m^2$.

2. The plasmonic patch according to claim 1, wherein the first material and the second material independent of each other are functionalized with siloxane or selected from the group consisting of an elastomeric polymer, polydimethylsiloxane (PDMS), polyethylene terephthalate (PET), polyurethane (PU), polyethylene naphthalate (PEN), polyimide (PI), polybutadiene, polyisoprene, (3-aminopropyl)trialkoxysilane, (3-aminopropyl)triaryloxysilane, (3-aminopropyl)triethoxysilane (APTES), (3-aminopropyl)trimethoxysilane (APTMS), trimethoxy(propyl)silane (IMPS), (3-mercaptopropyl)trimethoxysilane (MPTMS), polyamine, polymethylmethacrylate (PMMA), polydopamine, polyvinylpyrrolidone (PVP), polyvinyl alcohol (PVA), polyolefin, polyamide, polyimide, proteins, silk, cellulose, polyelectrolytes, peptoids and combinations thereof.

3. The plasmonic patch according to claim 1, wherein the spacer has a thickness of from 0.5 to 20 nm.

4. The plasmonic patch according to claim 1, the patch further comprising:
    a backing layer, wherein the backing layer has a Shore 00 hardness that is greater than a Shore 00 hardness of the first material, and wherein the flexible substrate is disposed between the spacer and the backing layer; and
    a reflective layer, wherein said reflective layer is disposed between the backing layer and the spacer.

5. The plasmonic patch according to claim 4, wherein the backing layer comprises a material selected from the group consisting of glass, plastic, a polymer, aluminum, mylar, and combinations thereof.

6. The plasmonic patch according to claim 1, wherein the plasmonic nanostructure is selected from the group consisting of nanotubes, nanorods, nanocubes, nanospheres, nanostructures with sharp tips, nanostars, hollow nanostructures, nanocages, nanorattles, nanobipyramids, nanoplates, self-assembled nanostructures, bowtie antennae, nano islands, and combinations thereof.

7. The plasmonic patch according to claim 6, wherein the plasmonic nanostructure comprises nanorods having a length of from about 25 nm to about 2000 nm and a diameter of from about 4 nm to about 100 nm.

8. The plasmonic patch according to claim 6, wherein the plasmonic nanostructure comprises nanocubes, nanocuboids, or a combination thereof, wherein the nanocubes and/or nanocuboids have an average edge length of from about 25 nm to about 1000 nm.

9. The plasmonic patch according to claim 1, wherein the plasmonic nanostructure comprises a plasmonic material selected from the group consisting of gold, silver, copper, aluminum, a semiconductor, and combinations thereof.

10. The plasmonic patch according to claim 1, wherein the $|\Delta\lambda|$ is 50 nm or less.

11. A method for enhancing a fluorescent signal of a fluorescent species, the method comprising:
    placing a plasmonic patch in proximity to the fluorescent species,
    exciting the fluorescent species using electromagnetic radiation of a predetermined wavelength thereby generating an enhanced fluorescent signal, and
    detecting said enhanced fluorescent signal;
    wherein the plasmonic patch comprises:
        a flexible substrate comprising a first material,
        a plasmonic nanostructure, and
        a spacer comprising a second material;
        wherein the plasmonic nanostructure is disposed on a first surface of the flexible substrate,
        the spacer is disposed on the first surface of the flexible substrate and covers the plasmonic nanostructure;
        the fluorescent species has an excitation wavelength ($\lambda_{ex}$) and an emission wavelength ($\lambda_{em}$),
        the plasmonic nanostructure has a localized surface plasmon resonance (LSPR) wavelength ($\lambda_{LSPR}$), a difference between the LSPR wavelength and the excitation wavelength is $|\Delta\lambda|$; and a density of the nanostructures on the flexible substrate is from $1/\mu m^2$ to $200/\mu m^2$.

12. The method according to claim 11, wherein the predetermined wavelength is within ±20 nm of the $\lambda_{ex}$.

13. The method according to claim 11, wherein the first material and the second material independent of each other are functionalized with siloxane or selected from the group consisting of polydimethylsiloxane (PDMS), ECOFLEX®, SILBIONE®, polyethylene terephthalate (PET), polyurethane (PU), polyethylene naphthalate (PEN), polyimide (PI), polybutadiene, polyisoprene, (3-aminopropyl)trialkoxysilane, (3-aminopropyl)triaryloxysilane, (3-aminopropyl)triethoxysilane (APTES), (3-aminopropyl)trimethoxysilane (APTMS), trimethoxy(propyl)silane (TMPS), (3-mercaptopropyl)trimethoxysilane (MPTMS), polyamine, polymethylmethacrylate (PMMA), polydopamine, polyvinylpyrrolidone (PVP), polyvinyl alcohol (PVA), polyolefin, polyamide, polyimide, proteins, silk, cellulose, polyelectrolytes, peptoids and combinations thereof.

14. The method according to claim 11, wherein the spacer has a thickness of from 0.5 to 20 nm.

15. The method according to claim 11, the patch further comprising:

a backing layer, wherein the backing layer has a Shore 00 hardness that is greater than a Shore 00 hardness of the first material, and wherein the flexible substrate is disposed between the spacer and the backing layer; and a reflective layer, wherein said reflective layer is disposed between the backing layer and spacer.

16. The method according to claim 11, wherein the plasmonic nanostructure is selected from the group consisting of nanotubes, nanorods, nanocubes, nanospheres, nanostructures with sharp tips, nanostars, hollow nanostructures, nanocages, nanorattles, nanobipyramids, nanoplates, self-assembled nanostructures, bowtie antennae, nano islands, and combinations thereof.

17. The method according to claim 11, wherein the plasmonic nanostructure comprises a plasmonic material selected from the group consisting of gold, silver, copper, aluminum, a semiconductor, and combinations thereof.

18. The method according to claim 11, wherein the $|\Delta\lambda|$ is 50 nm or less.

* * * * *